United States Patent
Inoue et al.

(10) Patent No.: US 6,728,409 B2
(45) Date of Patent: Apr. 27, 2004

(54) APPARATUS FOR AND METHOD OF EMBEDDING AND EXTRACTING DIGITAL INFORMATION AND MEDIUM HAVING PROGRAM FOR CARRYING OUT THE METHOD RECORDED THEREON

(75) Inventors: Hisashi Inoue, Fukuoka (JP); Takashi Katsura, Fukuoka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 8 days.

(21) Appl. No.: 10/243,676

(22) Filed: Sep. 16, 2002

(65) Prior Publication Data

US 2003/0012444 A1 Jan. 16, 2003

Related U.S. Application Data

(62) Division of application No. 09/186,375, filed on Nov. 5, 1998, now Pat. No. 6,477,276.

(30) Foreign Application Priority Data

Nov. 7, 1997 (JP) ............................................. 9-306098
Jul. 10, 1998 (JP) ........................................... 10-196361

(51) Int. Cl.[7] ............................. G06K 9/46; G06K 9/36
(52) U.S. Cl. ........................ 382/232; 382/240; 382/251
(58) Field of Search ............................. 382/232, 203, 382/251, 276, 279, 284, 100; 375/240.1

(56) References Cited

U.S. PATENT DOCUMENTS 5,416,606 A 5/1995 Katayama et al. .......... 358/467

(List continued on next page.)

FOREIGN PATENT DOCUMENTS

EP 0766468 4/1997

(List continued on next page.)

OTHER PUBLICATIONS

Sun Z et al, "Nonuniform Threshold Trellis Coded Quantization for image Transmission Through Noisy Channels", ISCAS '97. Proceedings of the 1997 IEEE International Symposium on Circuits and Systems, Circuits and Systems in the Information Age, Hong Kong, Jun. 9–12, 1997, IEEE International Symposium on Circuits and Systems, New York, NY: IEEE, US, vol. 2, Jun. 9, 1997, pp. 1129–1132.

(List continued on next page.)

*Primary Examiner*—Leo Boudreau
*Assistant Examiner*—Duy M. Dang
(74) *Attorney, Agent, or Firm*—Wenderoth, Lind & Ponack, L.L.P.

(57) ABSTRACT

An apparatus for embedding information in a signal includes a band dividing device, a block divider, a quantization portion, a signal replacement portion, a mean difference addition portion, a mean calculation portion, and a band synthesis portion. The band dividing device divides the signal into transform coefficients over a plurality of frequency bands. The block divider divides one frequency band into a plurality of blocks in accordance with a previously determined block size. The quantization portion calculates for each block, a mean value M of the transform coefficients in the block, and subjects the mean value M to linear quantization, using a previously determined quantization step-size Q to calculate a quantization value. The signal replacement portion replaces the quantization value for each block, on the basis of the quantization value and the value of the information to be embedded. The mean difference addition portion subjects the replaced quantization value, for each block, to inverse linear quantization using the quantization step-size Q to calculate a mean value M', and adds a difference DM between the mean value M' and the mean value M to all the transform coefficients in the block. The mean calculation portion calculates a mean value LM of the transform coefficients in the frequency band after the addition of the difference DM. The band synthesis portion reconstructs a signal in which the information has been embedded using the frequency band after the addition of the difference DM and the other frequency bands.

6 Claims, 34 Drawing Sheets

U.S. PATENT DOCUMENTS

| | | |
|---|---|---|
| 6,175,639 B1 | 1/2001 | Satoh et al. ................ 382/100 |
| 6,185,312 B1 | 2/2001 | Nakamura et al. .......... 382/100 |
| 6,477,276 B1 * | 11/2002 | Inoue et al. ................ 382/232 |

FOREIGN PATENT DOCUMENTS

| | | |
|---|---|---|
| JP | 9-191394 | 7/1997 |
| JP | 10-124673 | 5/1998 |
| JP | 10-191330 | 7/1998 |

OTHER PUBLICATIONS

Ruanaidh J J K O et al, "Phase Watermarking of Digital Images", Proceedings of the International Conference on Image Processing (ICIP) Lausanne, Sep. 16–19, 1996 New York, IEEE, US, vol. 3, Sep. 16, 1996, pp. 239–242.

"Embedding a Signature to Picture Under Wavelet Transformation", Matsuli et al., Journal of the Institute of Electronics, Information and Communication Engineers D–II vol. J79–D–II, No. 6, pp. 1017 to 1024, Jun. 1996.

* cited by examiner

F I G. 8
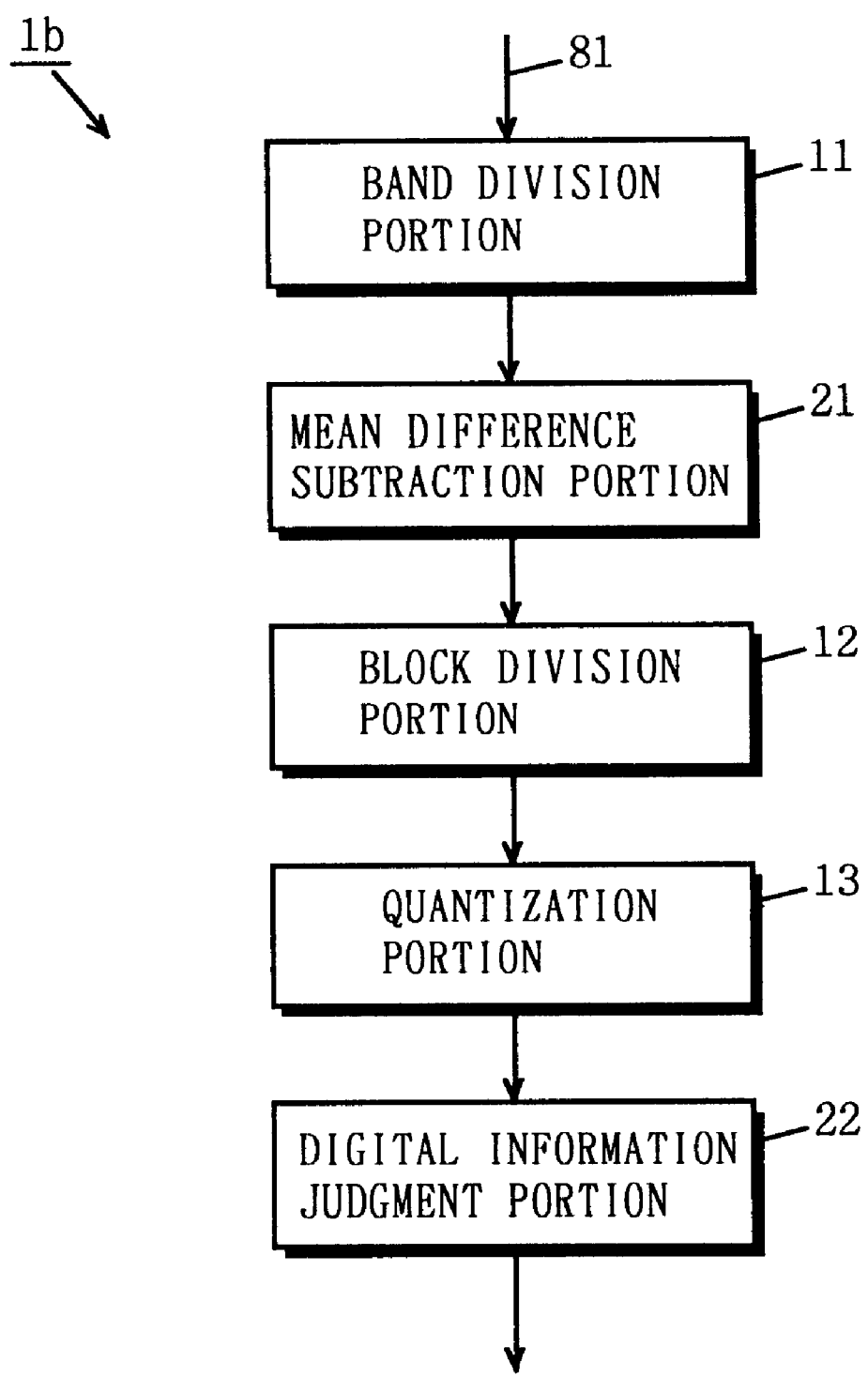

FIG. 21
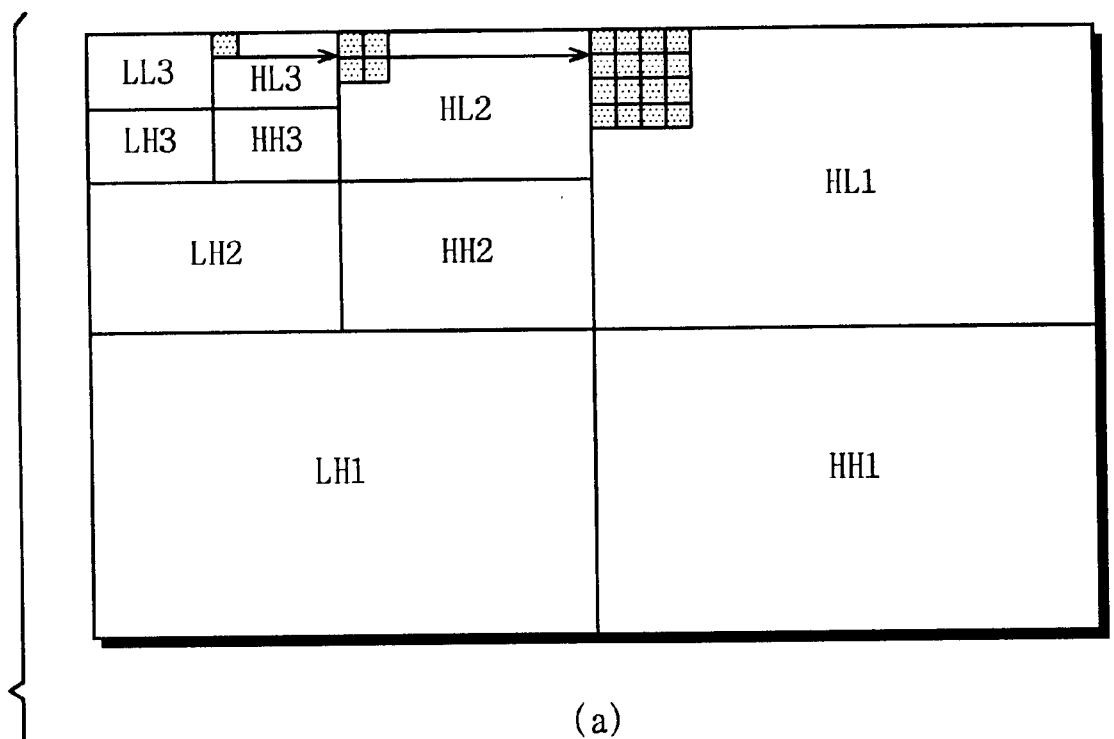
(a)
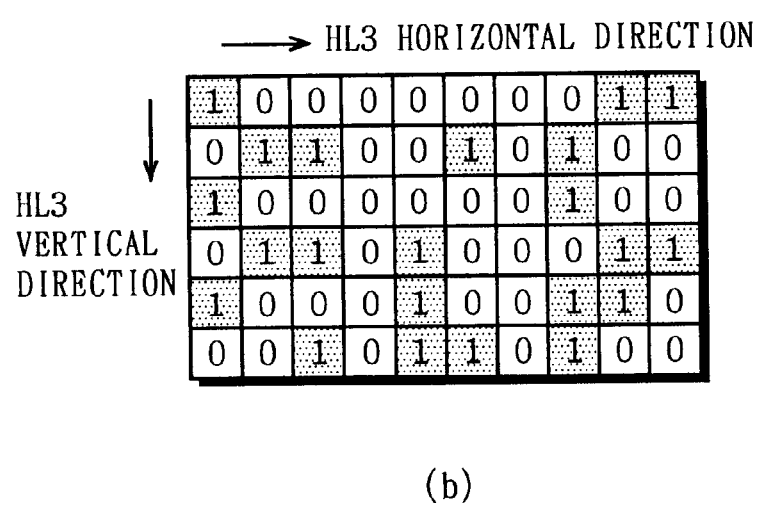
(b)

F I G. 25
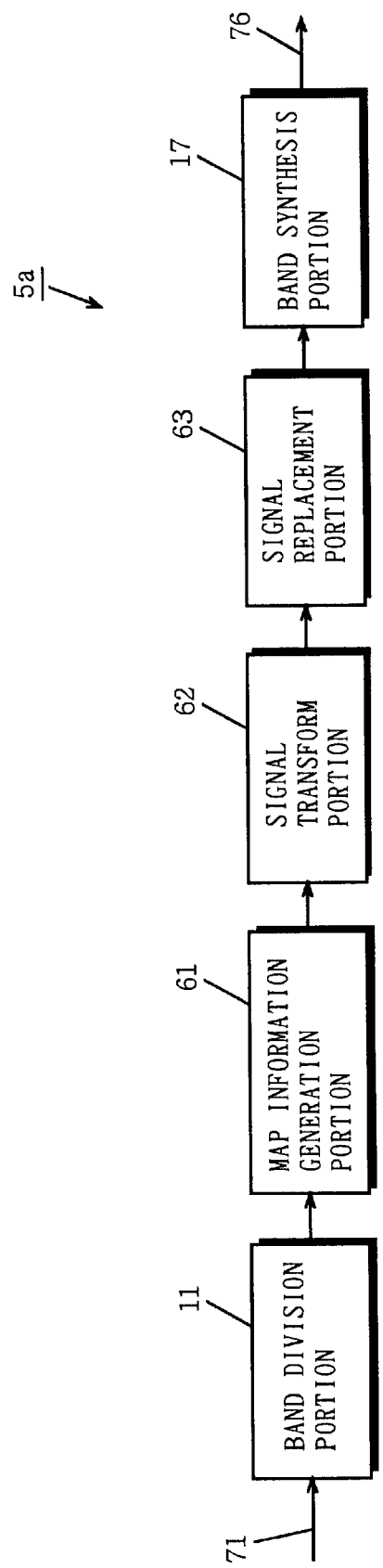

FIG. 27

| SIGN OF TRANSFORM COEFFICIENT IN POSITION REFERRED TO | LOGICAL VALUE OF BIT, IN DIGITAL INFORMATION, TO BE EMBEDDED | TRANSFORM VALUE |
|---|---|---|
| POSITIVE | 1 | +A |
| POSITIVE | 0 | +B |
| NEGATIVE | 1 | −A |
| NEGATIVE | 0 | −B |

APPARATUS FOR AND METHOD OF EMBEDDING AND EXTRACTING DIGITAL INFORMATION AND MEDIUM HAVING PROGRAM FOR CARRYING OUT THE METHOD RECORDED THEREON

This is a Divisional Application of U.S. patent application Ser. No. 09/186,375, filed Nov. 5, 1998, U.S. Pat. No. 6,477,276, the entire disclosure of which is incorporated herein by reference.

BACKGROUND OF THE INVENTION

1. Field of the Invention

The present invention relates generally to an apparatus for, and a method of, embedding and extracting digital information, as well as a medium having a program for carrying out the method recorded thereon. More particularly, the present invention generally relates to an apparatus for, and a method of, embedding, in order to protect the copyright of digital data, digital data such as copyright information (hereinafter referred to as digital information) in an image signal, and extracting the embedded digital information, as well as a medium having a program for carrying out the method recorded thereon.

2. Description of the Background Art

In recent years, information utilizing the Internet has been extensively provided. Particularly, WWW (World Wide Web) has been frequently utilized as an information transmitting and receiving service in which images, voices, and so forth are integrated.

However, digital information, such as an image which is open to the public on a network of the Internet, can be easily copied by many and unspecified users. Therefore, some problems have arisen. For example, an image whose copyright is owned by a third person is secondarily utilized by making unauthorized copying thereof without the permission of the copyright owner. Further, also in expanding the business on the Internet using image-based contents, measures to prevent the unauthorized copying have been a problem. Therefore, the establishment of a technique for protecting the copyright of an image signal has been demanded.

An example of the measures conventionally known is an electronic watermark technique. The digital watermarking is a technique for embedding digital information in image data in a form that cannot be perceived by a human being.

Examples of the conventional electronic watermark technique include an electronic watermark technique using discrete wavelet transform described in an article entitled "Embedding a Signature to Picture under Wavelet Transformation" by Matsui, Onishi, Nakamura et al. (Journal of The Institute of Electronics, Information and Communication Engineers D-II VOL. J79-D-II, No. 6, pp. 1017 to 1024, June 1996) (hereinafter referred to as a technique by Matsui et al.).

The technique by Matsui et al. will be described with reference to FIGS. 33 to 35.

Description is now made of band division by discrete wavelet transform processing.

FIG. 33 is a block diagram showing an example of the structure of a conventional band dividing device 11 for division into three hierarchies. In FIG. 33, the conventional band dividing device 11 comprises first to third band dividing filters 100, 200 and 300 having the same structure. Each of the first to third band dividing filters 100, 200 and 300 divides a received image into four frequency bands, and calculates wavelet transform coefficients (hereinafter merely referred to as transform coefficients) for each of the frequency bands.

It is also possible to obtain transform coefficients even by sub-band division which is equivalent to the band division by discrete wavelet transform, which is not described herein.

The band dividing device 11 inputs a digitized image signal 71 into the first band dividing filter 100. The first band dividing filter 100 divides the image signal 71 into signals in four bands, i.e., an LL1 signal, an LH1 signal, an HL1 signal and an HH1 signal (hereinafter generically referred to as a first hierarchical signal) on the basis of parameters of its horizontal and vertical frequency components. The second band dividing filter 200 receives the LL1 signal in the lowest band in the first hierarchical signal, and further divides the LL1 signal into an LL2 signal, an LH2 signal, an HL2 signal and an HH2 signal in four bands (hereinafter generically referred to as a second hierarchical signal). The third band dividing filter 300 receives the LL2 signal in the lowest band in the second hierarchical signal, and further divides the LL2 signal into an LL3 signal, an LH3 signal, an HL3 signal and an HH3 signal in four bands (hereinafter generically referred to as a third hierarchical signal).

FIG. 34 is a block diagram showing an example of the structure of the first band dividing filter 100. In FIG. 34, the first band dividing filter 100 comprises first to third two-band division portions 101 to 103. The first to third two-band division portions 101 to 103 respectively comprise one-dimensional low-pass filters (LPF) 111 to 113, one-dimensional high-pass filters (HPF) 121 to 123, and sub-samplers 131 to 133 and 141 to 143 for thinning a signal at a ratio of 2:1.

The first two-band division portion 101 receives the image signal 71, and subjects the signal to low-pass filtering and high-pass filtering with respect to its horizontal component by the LPF 111 and the HPF 121, respectively, to output two signals. The signals obtained by the low-pass filtering and the high-pass filtering are respectively thinned at a ratio of 2:1 using the sub-samplers 131 and 141, and are then outputted to the subsequent stage. The second two-band division portion 102 receives the signal from the sub-sampler 131, and filters the signal with respect to its vertical component by the LPF 112 and the HPF 122, respectively, thins the signal at a ratio of 2:1 using the sub-samplers 132 and 142, and then outputs two signals, i.e., an LL signal and an LH signal. On the other hand, the third two-band division portion 103 receives the signal from the sub-sampler 141, and respectively filters the signal with respect to its vertical component by the LPF 113 and the HPF 123, thins the signal at a ratio of 2:1 using the sub-samplers 133 and 143, and then outputs two signals, i.e., an HL signal and an HH signal.

Consequently, four signals, i.e., the LL1 signal which is low in both its horizontal and vertical components, the LH1 signal which is low in its horizontal component and is high in its vertical component, the HL1 signal which is high in its horizontal component and is low in its vertical component, and the HL1 signal which is high in both its horizontal and vertical components, that is, transform coefficients are outputted from the first band-dividing filter 100.

The second and third band dividing filters 200 and 300 also respectively subject received signals to the same processing as described above.

As a result of the band division processing by the first to third band dividing filters 100, 200 and 300, the image signal 71 is divided into 10 band signals, i.e., an LL3 signal, an LH3 signal, an HL3 signal, an HH3 signal, an LH2 signal, an HL2 signal, an HH2 signal, an LH1 signal, an HL1 signal and an HH1 signal. FIG. 35 is a diagram showing representation of the signals by a two-dimensional frequency region.

In FIG. 35, the vertical axis represents a vertical frequency component, which increases as it is directed downward, and the horizontal axis represents a horizontal frequency component, which increases as it is directed rightward. Each of regions in FIG. 35 is data serving as one image, and the area ratio of the regions coincides with the ratio of the respective numbers of data in the band signals. That is, in a case where the number of data in the LL3 signal, the LH3 signal, the HL3 signal and the HH3 signal which are the third hierarchical signal is taken as one, the number of data in the LH2 signal, the HL2 signal and the HH2 signal which are the second hierarchical signal is four, and the number of data in the LH1 signal, the HL1 signal and the HH1 signal which are the first hierarchical signal is 16. Consequently, with respect to one data at the upper left of the LL3 signal, for example, one data at the upper left of each of the LH3 signal, the HL3 signal and the HH3 signal, four data, which are square, at the upper left of each of the LH2 signal, the HL2 signal and the HH2 signal, 16 data, which are square, at the upper left of each of the LH1 signal, the HL1 signal and the HH1 signal represent the same pixel on an original image (portions painted in black in FIG. 35).

Description is now made of a method of embedding digital information after the above-mentioned band division by discrete wavelet transform. The embedding method itself described below is a technique well-known by those skilled in the art. Matsui et al. realize digital watermarking by combining the discrete wavelet transform and the conventional embedding method.

The conventional embedding method utilizes visual characteristics of a human being who easily overlooks noise in a high frequency region and easily detects noise in a low frequency region. That is, in an image signal, energy is concentrated in its low frequency component. Therefore, in output components in the discrete wavelet transform, an LL signal representing a low frequency component of the image signal is an important band component. On the other hand, three types of signals, i.e., an LH signal, an HL signal and an HH signal representing high frequency components, shown in multi-resolution representation (MRR), of the image signal are not so important band components.

With respect to each of the MRR components, i.e., the LH signal, the HL signal and the HH signal, which are not so important, the logical value of the low-order bit (least-significant bit (LSB) if possible) of a wavelet transform coefficient, which is not zero out of wavelet transform coefficients in the MRR component, is transformed in accordance with the value of a bit, in digital information, to be embedded on the basis of previously determined regularity, to perform digital watermarking.

In the technique by Matsui et al., the digital information is embedded in only the MRR components which are high frequency components of an image calculated by the discrete wavelet transform and the low-order bits thereof which hardly affect the change in the image. Therefore, the degradation of the quality of an image reconstructed by the signal in which the digital information has been embedded is so slight as not to be perceived with the eyes of a human being.

In the case of display and distribution, for example, on a network, the signals in the respective frequency bands which have been subjected to the above-mentioned embedding processing are synthesized by a band synthesizing device (in short, performing processing reverse to the discrete wavelet transform), to reconstruct an image signal. Further, in order to extract the embedded digital information from the reconstructed image signal, the discrete wavelet transform is performed to extract the logical values transformed in the embedding processing.

In the above-mentioned technique by Matsui et al., however, the digital information is embedded in the MRR components which are high frequency components of the image, the following problems remain.

(1) By frequency-transforming the image in which the digital information has been embedded, and then rewriting and cutting the high frequency components of the image, the embedded digital information can be removed relatively simply.

(2) Even by subjecting the image in which the digital information has been embedded to low-pass filtering, the high frequency components of the image are reduced, so that the embedded digital information is lost.

(3) Furthermore, in image communication, for example, the image is transmitted upon being compressed. In the case, the high frequency components of the transform coefficients of the image are generally coarsely quantized to perform irreversible compression, so that the effect on the high frequency components of the image is increased. That is, the respective lower-order bits of the transform coefficients in the MRR components of the image are significantly changed, so that the embedded digital information cannot be correctly extracted.

SUMMARY OF THE INVENTION

Therefore, an object of the present invention is to provide an apparatus for, and a method of, embedding and extracting digital information, in which it is possible to reliably extract, by embedding digital information in not only transform coefficients having high frequency components of an image, but also transform coefficients having low frequency components, which degrade the quality of the image at the time of extracting the embedded digital information and further embedding the digital information only in transform coefficients having not the high frequency components but the low frequency components, the embedded digital information, without losing the information against the above-mentioned attack from an unauthorized user, and the quality of the image is hardly degraded at the time of extracting the embedded digital information, and a medium having a program for carrying out the method recorded thereon.

In order to attain the above-mentioned object, the present invention has the following features.

A first aspect is directed to a digital information embedding apparatus for embedding inherent digital information in a digital image signal, comprising a band division means for dividing the digital image signal into transform coefficients over a plurality of frequency bands using either discrete wavelet transform or sub-band division, a block division means for dividing the lowest frequency band out of the plurality of frequency bands obtained by the division into a plurality of blocks in accordance with a previously determined block size, a quantization means for calculating for each of the blocks a mean value M of the transform coefficients in the block, and subjecting the mean value M to linear quantization using a previously determined quantization step-size Q (Q is an integer of not less than one), to calculate a quantization value, a signal replacement means for replacing for each of the blocks, on the basis of the quantization value and the value of the digital information to be embedded which correspond to the block, the quantization value, a mean difference addition means for subjecting for each of the blocks the replaced quantization value to inverse linear quantization using the quantization step-size Q to calculate a mean value M', and adding a difference DM (=M'−M) between the mean value M' and the mean value M to all the transform coefficients in the block, a mean calculation means for calculating a mean value LM of the transform coefficients in the lowest frequency band after the addition of the difference DM, and a band synthesis means for reconstructing a digital image signal in which the digital information has been embedded using the lowest frequency band after the addition of the difference DM and the other frequency bands.

As described in the foregoing, according to the first aspect, the digital information is embedded in the transform coefficients in the lowest frequency band using either the discrete wavelet transform, or the sub-band division. Consequently, it is possible to prevent the embedded digital information from being lost against an attack for unauthorized utilization from a third person.

A second aspect is directed to a digital information embedding apparatus for embedding inherent digital information in a digital image signal, comprising an orthogonal transform means for dividing the digital image signal into a plurality of blocks each composed of a plurality of pixels previously determined, and subjecting, for each of the blocks, the block to orthogonal transform, to calculate transform coefficients, a block selection means for further classifying the plurality of blocks obtained by the division into groups each comprising one or two or more blocks in accordance with a previously determined number of blocks, a quantization means for extracting, for each of the blocks belonging to each of the groups, the transform coefficient having the lowest frequency component (hereinafter referred to as a DC component) out of the transform coefficients in the block and calculating a mean value M of the respective DC components in the blocks, and subjecting the mean value M to linear quantization using a previously determined quantization step-size Q (Q is an integer of not less than one), to calculate a quantization value, a signal replacement means for replacing for each of the groups, on the basis of the quantization value and the value of the digital information to be embedded which correspond to the group, the quantization value, a mean difference addition means for subjecting for each of the groups the replaced quantization value to inverse linear quantization using the quantization step-size Q to calculate a mean value M', and adding a difference DM (=M'−M) between the mean value M' and the mean value M to all the DC components in the blocks belonging to the group, an inverse orthogonal transform means for subjecting the plurality of blocks after the addition of the difference DM to inverse orthogonal transform, to reconstruct a digital image signal in which the digital information has been embedded, and a mean calculation means for calculating a mean value LM of the amplitude values of the pixels in the reconstructed digital image signal.

As described in the foregoing, according to the second aspect, the digital information is embedded only in the lowest frequency component using the orthogonal transform. Consequently, it is possible to prevent the embedded digital information from being lost against an attack for unauthorized utilization from a third person.

A third aspect is characterized in that in the second aspect, the orthogonal transform means performs signal transformation which is any one of discrete cosine transform, Fourier transform and Hadamard transform.

As described in the foregoing, according to the third aspect, the typical system of the signal transformation performed by the orthogonal transform means in the second aspect is specified.

A fourth aspect is directed to a digital information embedding apparatus for embedding inherent digital information in a digital image signal, comprising a block selection means for dividing the digital image signal into a plurality of blocks each composed of a plurality of pixels previously determined, a quantization means for calculating for each of the blocks a mean value M of the pixels composing the block, and subjecting the mean value M to linear quantization using a previously determined quantization step-size Q (Q is an integer of not less than one), to calculate a quantization value, a signal replacement means for replacing for each of the blocks, on the basis of the quantization value and the value of the digital information to be embedded which correspond to the block, the quantization value, a mean difference addition means for subjecting for each of the blocks the replaced quantization value to inverse linear quantization using the quantization step-size Q to calculate a mean value M', and adding a difference DM (=M'−M) between the mean value M' and the mean value M to all the pixels composing the block, and a mean calculation means for calculating a mean value LM of the amplitude values of the pixels in the digital image signal after the addition of the difference DM.

As described in the foregoing, according to the fourth aspect, the digital information is embedded in the mean value of the pixels composing the block, that is, the lowest frequency component. Consequently, it is possible to prevent the embedded digital information from being lost against an attack for unauthorized utilization from a third person.

A fifth aspect is characterized in that the signal replacement means of the first aspect replaces the quantization value with an odd value closest to the value of (M/Q) when each of bits composing the digital information takes a logical value 1, while replacing the quantization value with an even value closest to the value of (M/Q) when the bit takes a logical value 0.

A sixth aspect is characterized in that in the second aspect, the signal replacement means replaces the quantization value with an odd value closest to the value of (M/Q) when each of bits composing the digital information takes a logical value 1, while replacing the quantization value with an even value closest to the value of (M/Q) when the bit takes a logical value 0.

A seventh aspect is characterized in that in the third aspect, the signal replacement means replaces the quantization value with an odd value closest to the value of (M/Q) when each of bits composing the digital information takes a logical value 1, while replacing the quantization value with an even value closest to the value of (M/Q) when the bit takes a logical value 0.

An eighth aspect is characterized in that in the fourth aspect, the signal replacement means replaces the quantization value with an odd value closest to the value of (M/Q) when each of bits composing the digital information takes a logical value 1, while replacing the quantization value with an even value closest to the value of (M/Q) when the bit takes a logical value 0.

As described in the foregoing, according to the fifth to eighth aspects, the quantization value is replaced with the odd or even value closest to the value of (M/Q) on the basis of the logical value of each of the bits composing the digital information in the first to fourth aspects. Consequently, it is possible to reduce the degradation of the image at the time of extracting the embedded digital information, and it is difficult for a third person to detect the embedded digital information.

A ninth aspect is directed to a digital information extracting apparatus for extracting inherent digital information embedded by a particular apparatus in transform coefficients in the lowest frequency band obtained by dividing a digital image signal using either discrete wavelet transform or sub-band division, wherein the digital image signal outputted by the particular apparatus and a quantization step-size are inputted, comprising a band division means for dividing the digital image signal into transform coefficients over a plurality of frequency bands using either discrete wavelet transform or sub-band division, a block division means for dividing the lowest frequency band out of the plurality of frequency bands obtained by the division into a plurality of blocks in accordance with a previously determined block size, a quantization means for calculating for each of the blocks a mean value M of the transform coefficients in the block, and subjecting the mean value M to linear quantization using the previously determined quantization step-size Q, to calculate a quantization value, and a digital information judgment means for judging whether the quantization value is even or odd, to extract the embedded digital information on the basis of the results of the judgment.

As described in the foregoing, according to the ninth aspect, the logical value of the embedded digital information is judged by the results of extracting the transform coefficients which have been embedded in the lowest frequency band which is hardly affected by data destruction in high frequency bands, and calculating the quantization value of the mean value of the transform coefficients in each of the blocks in the low frequency band using a previously determined method. Consequently, accurate digital information can be extracted without being affected by an attack from an unauthorized user.

A tenth aspect is directed to a digital information extracting apparatus for extracting inherent digital information embedded by a particular apparatus in transform coefficients in the lowest frequency band obtained by dividing a digital image signal using either discrete wavelet transform or sub-band division, wherein the digital image signal outputted by the particular apparatus, a quantization step-size, and a mean value LM of the transform coefficients in the lowest frequency band at the time of output are inputted, comprising a band division means for dividing the digital image signal into transform coefficients over a plurality of frequency bands using either discrete wavelet transform or sub-band division, a mean difference subtraction means for calculating a mean value LM' of the transform coefficients in the lowest frequency band out of the plurality of frequency bands obtained by the division, and subtracting a difference DM (=LM'−LM) between the mean value LM' and the mean value LM from all the transform coefficients in the lowest frequency band, a block division means for dividing the lowest frequency band after the subtraction of the difference DL into a plurality of blocks in accordance with a previously determined block size, a quantization means for calculating for each of the blocks a mean value M of the transform coefficients in the block, and subjecting the mean value M to linear quantization using the quantization step-size Q, to calculate a quantization value, and a digital information judgment means for judging whether the quantization value is even or odd, to extract the embedded digital information on the basis of the results of the judgment.

As described in the foregoing, according to the tenth aspect, the logical value of the embedded digital information is judged by the results of calculating, with respect to the lowest frequency band including the transform coefficients whose mean value is corrected using the mean values LM' and LM even when it is changed by image processing such as irreversible compression, the quantization value of the mean value of the transform coefficients in each of the blocks in the low frequency band using a previously determined method. Consequently, more accurate digital information can be extracted without being affected by an attack from an unauthorized user.

An eleventh aspect is directed to a digital information extracting apparatus for extracting inherent digital information embedded by a particular apparatus in transform coefficients obtained by subjecting a digital image signal to signal transformation which is any one of discrete cosine transform, Fourier transform and Hadamard transform, then dividing the digital image signal into blocks, and subjecting each of the blocks to orthogonal transform, wherein the digital image signal outputted by the particular apparatus and a quantization step-size are inputted, comprising an orthogonal transform means for dividing the digital image signal into a plurality of blocks each composed of a plurality of pixels previously determined, and subjecting, for each of the blocks, the block to orthogonal transform, to calculate transform coefficients, a block selection means for further classifying the plurality of blocks obtained by the division into groups each comprising one or two or more blocks in accordance with a previously determined number of blocks, a quantization means for calculating for each of the groups a mean value of the respective transform coefficients having the lowest frequency components in the blocks belonging to the group, and subjecting the mean value to linear quantization using the previously determined quantization step-size, to calculate a quantization value, and a digital information judgment means for judging whether the quantization value is even or odd, to extract the embedded digital information on the basis of the results of the judgment.

As described in the foregoing, according to the eleventh aspect, the logical value of the embedded digital information is judged by the results of extracting the transform coefficient which has been embedded in the lowest frequency component which is hardly affected by data destruction in high frequency bands, and calculating the quantization value of the mean value of the respective transform coefficients having the lowest frequency components in the plurality of blocks using a previously determined method. Consequently, accurate digital information can be extracted without being affected by an attack from an unauthorized user.

A twelfth aspect is directed to a digital information extracting apparatus for extracting inherent digital information embedded by a particular apparatus in transform coefficients obtained by subjecting a digital image signal to signal transformation which is any one of discrete cosine transform, Fourier transform and Hadamard transform, then dividing the digital image signal into blocks, and subjecting each of the blocks to orthogonal transform, wherein the digital image signal outputted by the particular apparatus, a quantization step-size, and a mean value LM of the amplitude values of pixels in the digital image signal at the time of output are inputted, comprising a mean difference subtraction means for calculating a mean value LM' of the amplitude values of the pixels in the digital image signal at the time of input, and subtracting a difference DM (=LM'−LM) between the mean value LM' and the mean value LM from the values of all the pixels in the digital image signal, an orthogonal transform means for dividing the digital image signal after the subtraction of the difference DL into a plurality of blocks each composed of a plurality of pixels previously determined, and subjecting, for each of the blocks, the block to orthogonal transform, to calculate transform coefficient, a block selection means for further classifying the plurality of blocks obtained by the division into groups each comprising one or two or more blocks in accordance with a previously determined number of blocks, a quantization means for calculating for each of the groups a mean value of the respective transform coefficients having the lowest frequency components in the blocks belonging to the group, and subjecting the mean value to linear quantization using the previously determined quantization step-size, to calculate a quantization value, and a digital information judgment means for judging whether the quantization value is even or odd, to extract the embedded digital information on the basis of the results of the judgment.

As described in the foregoing, according to the twelfth aspect, the logical value of the embedded digital information is judged by the results of calculating, with respect to the lowest frequency component, in the digital image signal, including the transform coefficients whose mean value is corrected using the mean values LM' and LM of the amplitude values of the pixels in the digital image signal even when it is changed by image processing such as irreversible compression, the quantization value of the mean value of the respective transform coefficients having the lowest frequency components in the plurality of blocks using a previously determined method. Consequently, more accurate digital information can be extracted without being affected by an attack from an unauthorized user.

A thirteenth aspect is directed to a digital information extracting apparatus for extracting inherent digital information embedded by a particular apparatus in a mean value of pixels composing each of blocks obtained by dividing a digital image signal, wherein the digital image signal outputted by the particular apparatus and a quantization step-size are inputted, comprising a block selection means for dividing the digital image signal into a plurality of blocks each composed of a plurality of pixels previously determined, a quantization means for calculating for each of the blocks a mean value of the pixels composing the block, and subjecting the mean value to linear quantization using the quantization step-size, to calculate a quantization value, and a digital information judgment means for judging whether the quantization value is even or odd, to extract the embedded digital information on the basis of the results of the judgment.

As described in the foregoing, according to the thirteenth aspect, the logical value of the embedded digital information is judged by the results of extracting the mean value of the pixels composing the block which is hardly affected by data destruction in high frequency bands, and calculating the quantization value of the mean value using a previously determined method. Consequently, accurate digital information can be extracted without being affected by an attack from an unauthorized user.

A fourteenth aspect is directed to a digital information extracting apparatus for extracting inherent digital information embedded by a particular apparatus in a mean value of pixels composing each of blocks obtained by dividing a digital image signal, wherein the digital image signal outputted by the particular apparatus, a quantization step-size, and a mean value LM of the amplitude values of the pixels in the digital image signal at the time of output are inputted, comprising a mean difference subtraction means for calculating a mean value LM' of the amplitude values of the pixels in the digital image signal at the time of input, and subtracting a difference DL (=LM'−LM) between the mean value LM' and the mean value LM from the values of all the pixels in the digital image signal, a block selection means for dividing the digital image signal after the subtraction of the difference DL into a plurality of blocks each composed of a plurality of pixels previously determined, a quantization means for calculating a mean value of the pixels composing each of the blocks obtained by the division, and subjecting the mean value to linear quantization using the quantization step-size, to calculate a quantization value, and a digital information judgment means for judging whether the quantization value is even or odd, to extract the embedded digital information on the basis of the results of the judgment.

As described in the foregoing, according to the fourteenth aspect, the logical value of the embedded digital information is judged by the results of calculating, with respect to the digital image signal including blocks each composed of the pixels whose mean value is corrected using the mean values LM' and LM of the amplitude values of the pixels in the digital image signal even when it is changed by image processing such as irreversible compression, the quantization value of the mean value of the pixels composing the block using a previously determined method. Consequently, accurate digital information can be extracted without being affected by an attack from an unauthorized user.

A fifteenth aspect is directed to a digital information embedding apparatus for embedding inherent digital information in a digital image signal, comprising a band division means for dividing the digital image signal into transform coefficients over a plurality of frequency bands using either discrete wavelet transform or sub-band division, a map information generation means for generating, with respect to each of the transform coefficients included in the one or two frequency bands out of the plurality of frequency bands obtained by the division, map information storing a true/false value based on decision whether or not all the absolute amplitude values of the transform coefficient and the other transform coefficients in the same space representation region in the same direction of division as the one or two frequency bands are not more than a previously determined set value, a signal replacement means for replacing all of the transform coefficient and the other transform coefficients which correspond to the position where the true/false value of the map information is true with a previously determined transform value on the basis of the value of the digital information to be embedded in the transform coefficients, and a band synthesis means for synthesizing the plurality of transform coefficients after the replacement, to reconstruct a digital image signal.

As described in the foregoing, according to the fifteenth aspect, the digital information is embedded in the frequency signal over a plurality of hierarchies using either the discrete wavelet transform or the sub-band division. Consequently, it is possible to prevent the embedded digital information from being lost against an attack for unauthorized utilization from a third person.

A sixteenth aspect is characterized in that in the fifteenth aspect, the transform value is set to integers±K which are not more than the set value, and the signal replacement means replaces the transform coefficient and the other transform coefficients with the transform value+K when each of bits composing the digital information takes a logical value 1, while replacing the transform coefficients with the transform value−K when the bit takes a logical value 0.

As described in the foregoing, according to the sixteenth aspect, the transform coefficient whose absolute amplitude value is not more than the set value is replaced with the transform values±K which are set to not more than the set value. Consequently, it is possible to reduce the effect on the degradation of the image at the time of extracting the embedded digital information, and it is difficult for a third person to detect the embedded digital information.

A seventeenth aspect is characterized in that in the fifteenth aspect, the map information generation means generates the map information with respect to the transform coefficients included in at least one or both of the frequency band which is low in its horizontal component and is high in its vertical component and the frequency band which is high in its horizontal component and is low in its vertical component.

An eighteenth aspect is characterized in that in the sixteenth aspect, the map information generation means generates the map information with respect to the transform coefficients included in at least one or both of the frequency band which is low in its horizontal component and is high in its vertical component and the frequency band which is high in its horizontal component and is low in its vertical component.

As described in the foregoing, according to the seventeenth and eighteenth aspects, the digital information is embedded in the frequency signal having the lower frequency component in the fifteenth and sixteenth aspects. Consequently, it is possible to further prevent the embedded digital information from being lost against an attack for unauthorized utilization from a third person A nineteenth aspect is directed to a digital information embedding apparatus for embedding inherent digital information in a digital image signal, comprising a band division means for dividing the digital image signal into transfer coefficients over a plurality of frequency bands using either discrete wavelet transform or sub-band division, a map information generation means for generating, with respect to each of the transform coefficients included in the one or two frequency bands out of the plurality of frequency bands obtained by the division, map information storing a true/false value based on decision whether or not the absolute amplitude value of the transform coefficient is included between upper-limit and lower-limit threshold values which are previously determined, a signal replacement means for replacing the transform coefficient corresponding to the position where the true/false value of the map information is true with a previously determined transform value on the basis of the sign of the transform coefficient and the value of the digital information to be embedded in the transform coefficient, and a band synthesis means for synthesizing the plurality of transform coefficients after the replacement, to reconstruct a digital image signal.

As described in the foregoing, according to the nineteenth aspect, the digital information is embedded only in the transform coefficients in a deep hierarchical signal which is hardly affected using the discrete wavelet transform or the sub-band division. Consequently, it is possible to further prevent the embedded digital information from being lost against an attack for unauthorized utilization from a third person.

A twentieth aspect is directed to a digital information embedding apparatus for embedding inherent digital information in a digital image signal, comprising an orthogonal transform means for dividing the digital image signal into a plurality of block signals of a previously determined size, and subjecting, for each of the block signals, the block signal to orthogonal transform, to calculate transform coefficients, a map information generation means for generating, with respect to each of the transform coefficients included in the one or two block signals out of the plurality of block signals obtained by the division, map information storing a true/false value based on decision whether or not the absolute amplitude value of the transform coefficient is included between upper-limit and lower-limit threshold values which are previously determined, a signal replacement means for replacing the transform coefficient corresponding to the position where the true/false value of the map information is true with a previously determined transform value on the basis of the sign of the transform coefficient and the value of the digital information to be embedded in the transform coefficient, and an inverse orthogonal transform means for subjecting the plurality of transform coefficients after the replacement to inverse orthogonal transform, to reconstruct a digital image signal.

As described in the foregoing, according to the twentieth aspect, the digital information is embedded only in the transform coefficients in a deep hierarchical signal which is hardly affected using the orthogonal transform. Consequently, it is possible to further prevent the embedded digital information from being lost against an attack for unauthorized utilization from a third person.

A twenty-first aspect is characterized in that in the twentieth aspect, the orthogonal transform means performs frequency transformation which is any one of discrete cosine transform, Fourier transform and Hadamard transform.

As described in the foregoing, according to the twenty-first aspect, the typical system of the frequency transformation performed by the orthogonal transform means in the twentieth aspect is specified.

A twenty-second aspect is characterized in that in the nineteenth aspect, the transform value is set to integers±A and±B between the upper-limit and lower-limit threshold values, and the signal replacement means replaces the transform coefficient with the transform value+A when each of bits composing the digital information takes a logical value 1 and the sign of the transform coefficient is positive, with the transform value−A when the bit takes a logical value 1 and the sign of the transform coefficient is negative, with the transform value+B when the bit takes a logical value 0 and the sign of the transform coefficient is positive, and with the transform value−B when the bit takes a logical value 0 and the sign of the transform coefficient is negative.

A twenty-third aspect is characterized in that in the twentieth aspect, the transform value is set to integers±A and±B between the upper-limit and lower-limit threshold values, and the signal replacement means replaces the transform coefficient with the transform value+A when each of bits composing the digital information takes a logical value 1 and the sign of the transform coefficient is positive, with the transform value−A when the bit takes a logical value 1 and the sign of the transform coefficient is negative, with the transform value+B when the bit takes a logical value 0 and the sign of the transform coefficient is positive, and with the transform value−B when the bit takes a logical value 0 and the sign of the transform coefficient is negative.

A twenty-fourth aspect is characterized in that in the twenty-first aspect, the transform value is set to integers±A and±B between the upper-limit and lower-limit threshold values, and the signal replacement means replaces the transform coefficient with the transform value+A when each of bits composing the digital information takes a logical value 1 and the sign of the transform coefficient is positive, with the transform value−A when the bit takes a logical value 1 and the sign of the transform coefficient is negative, with the transform value+B when the bit takes a logical value 0 and the sign of the transform coefficient is positive, and with the transform value−B when the bit takes a logical value 0 and the sign of the transform coefficient is negative.

As described in the foregoing, according to the twenty-second to twenty-fourth aspects, the transform coefficient whose absolute amplitude value is within the threshold range is transformed into and replaced with a value within the threshold range considering the sign of the transform coefficient. Consequently, it is possible to reduce the effect on the degradation of the image at the time of extracting the embedded digital information, and it is difficult for a third person to detect the embedded digital information.

A twenty-fifth aspect is characterized in that in the nineteenth aspect, the map information generation means generates the map information with respect to the respective transform coefficients having the low frequency components other than the DC components.

A twenty-sixth aspect is characterized in that in the twentieth aspect, the map information generation means generates the map information with respect to the respective transform coefficients having the low frequency components other than the DC components.

A twenty-seventh aspect is characterized in that in the twenty-first aspect, the map information generation means generates the map information with respect to the respective transform coefficients having the low frequency components other than the DC components.

A twenty-eighth aspect is characterized in that in the twenty-second aspect, the map information generation means generates the map information with respect to the respective transform coefficients having the low frequency components other than the DC components.

A twenty-ninth aspect is characterized in that in the twenty-third aspect, the map information generation means generates the map information with respect to the respective transform coefficients having the low frequency components other than the DC components.

A thirtieth aspect is characterized in that in the twenty-fourth aspect, the map information generation means generates the map information with respect to the respective transform coefficients having the low frequency components other than the DC components.

As described in the foregoing, according to the twenty-fifth to thirtieth aspects, the digital information is embedded in the frequency signal having the lower frequency component in the nineteenth to twenty-fourth aspects. Consequently, it is possible to further prevent the embedded digital information from being lost against an attack for unauthorized utilization from a third person.

A thirty-first aspect is directed to a digital information extracting apparatus for extracting inherent digital information embedded by a particular apparatus in transform coefficients obtained by dividing a digital image signal using either discrete wavelet transform or sub-band division, wherein the digital image signal outputted by the particular apparatus and map information representing the position where the digital information is embedded are inputted, comprising a band division means for dividing the digital image signal into transform coefficients over a plurality of frequency bands using either discrete wavelet transform or sub-band division, a map information analysis means for extracting, on the basis of the map information, the transform coefficient corresponding to the position where a true/false value of the map information is true and the other transform coefficients in the same space representation region in the same direction of division as the frequency band including the transform coefficient, a coefficient calculation means for calculating a total value of the transform coefficients included in the one or two or more frequency bands out of the transform coefficient and the other transform coefficients which are extracted, and a digital information judgment means for judging the sign of the total value, to extract the embedded digital information on the basis of the results of the judgment.

As described in the foregoing, according to the thirty-first aspect, the logical value of the embedded digital information is judged by the results of extracting the transform coefficients which have been embedded in the low frequency band which is hardly affected by data destruction in high frequency bands, and calculating the total value of the transform coefficients using a previously determined method. Consequently, accurate digital information can be extracted without being affected by an attack from an unauthorized user.

A thirty-second aspect is directed to a digital information extracting apparatus for extracting inherent digital information embedded by a particular apparatus in transform coefficients obtained by dividing a digital image signal using either discrete wavelet transform or sub-band division, wherein the digital image signal outputted by the particular apparatus, map information representing the position where the digital information is embedded, and information representing a transform value to be embedded are inputted, comprising a band division means for dividing the image signal into transform coefficients over a plurality of frequency bands using either discrete wavelet transform or sub-band division, a map information analysis means for extracting, on the basis of the map information, the transform coefficient corresponding to the position where a true/false value of the map information is true, an error calculation means for calculating an absolute error between the extracted transform coefficient and the transform value, and a digital information judgment means for judging the absolute error, to extract the embedded digital information on the basis of the results of the judgment.

As described in the foregoing, according to the thirty-second aspect, the logical value of the embedded digital information is judged by the results of extracting the transform coefficient which has been embedded in a deep hierarchical signal which is not affected by data destruction in high frequency bands, and calculating and judging the absolute error between the transform coefficient and the transform value using a previously determined method. Consequently, accurate digital information can be extracted without being affected by an attack from an unauthorized user.

A thirty-third aspect is directed to a digital information extracting apparatus for extracting inherent digital information embedded by a particular apparatus in transform coefficients obtained by subjecting a digital image signal to frequency transformation which is any one of discrete cosine transform, Fourier transform and Hadamard transform, then dividing the digital image signal into blocks, and subjecting each of the blocks to orthogonal transform, wherein the digital image signal outputted by the particular apparatus, map information representing the position where the digital information is embedded, and information representing a transform value to be embedded are inputted, comprising an orthogonal transform means for dividing the digital image signal into a plurality of block signals of a previously determined size, and subjecting, for each of the block signals, the block signal to orthogonal transform, to calculate transform coefficients, a map information analysis means for extracting, on the basis of the map information, the transform coefficient corresponding to the position where a true/false value of the map information is true, an error calculation means for calculating an absolute error between the extracted transform coefficient and the transform value, and a digital information judgment means for judging the absolute error, to extract the embedded digital information on the basis of the results of the judgment.

As described in the foregoing, according to the thirty-third aspect, the logical value of the embedded digital information is judged by the results of extracting the transform coefficient which has been embedded in a deep hierarchical signal which is not affected by data destruction in high frequency bands and calculating and judging the absolute error between the transform coefficient and the transform value using a previously determined method. Consequently, accurate digital information can be extracted without being affected by an attack from an unauthorized user.

A thirty-fourth aspect is directed to a digital information embedding method of embedding inherent digital information in a digital image signal, comprising the steps of dividing the digital image signal into transform coefficients over a plurality of frequency bands using either discrete wavelet transform or sub-band division, dividing the lowest frequency band out of the plurality of frequency bands obtained by the division into a plurality of blocks in accordance with a previously determined block size, calculating for each of the blocks a mean value M of the transform coefficients in the block, and subjecting the mean value M to linear quantization using a previously determined quantization step-size Q (Q is an integer of not less than one), to calculate a quantization value, replacing for each of the blocks, on the basis of the quantization value and the value of the digital information to be embedded which correspond to the block, the quantization value, subjecting for each of the blocks the replaced quantization value to inverse linear quantization using the quantization step-size Q to calculate a mean value M', and adding a difference DM (=M'−M) between the mean value M' and the mean value M to all the transform coefficients in the block, calculating a mean value LM of the transform coefficients in the lowest frequency band after the addition of the difference DM, and reconstructing a digital image signal in which the digital information has been embedded using the lowest frequency band after the addition of the difference DM and the other frequency bands.

As described in the foregoing, according to the thirty-fourth aspect, the digital information is embedded in the transform coefficients in the lowest frequency band using either the discrete wavelet transform, or the sub-band division. Consequently, it is possible to prevent the embedded digital information from being lost against an attack for unauthorized utilization from a third person.

A thirty-fifth aspect is directed to a digital information embedding method of embedding inherent digital information in a digital image signal, comprising the steps of dividing the digital image signal into a plurality of blocks each composed of a plurality of pixels previously determined, and subjecting, for each of the blocks, the block to orthogonal transform, to calculate transform coefficients, further classifying the plurality of blocks obtained by the division into groups each comprising one or two or more blocks in accordance with a previously determined number of blocks, extracting, for each of blocks belonging to each of the groups, the transform coefficient having the lowest frequency component (hereinafter referred to as a DC component) out of the transform coefficients in the block and calculating a mean value M of the respective DC components in the blocks, and subjecting the mean value M to linear quantization using a previously determined quantization step-size Q (Q is an integer of not less than one), to calculate a quantization value, replacing for each of the groups, on the basis of the quantization value and the value of the digital information to be embedded which correspond to the group, the quantization value, subjecting for each of the groups the replaced quantization value to inverse linear quantization using the quantization step-size Q to calculate a mean value M', and adding a difference DM (=M'−M) between the mean value M' and the mean value M to all the respective DC components in the blocks belonging to the group, subjecting the plurality of blocks after the addition of the difference DM to inverse orthogonal transform, to reconstruct a digital image signal in which the digital information has been embedded, and calculating a mean value LM of the amplitude values of the pixels in the reconstructed digital image signal.

As described in the foregoing, according to the thirty-fifth aspect, the digital information is embedded only in the lowest frequency component using the orthogonal transform. Consequently, it is possible to prevent the embedded digital information from being lost against an attack for unauthorized utilization from a third person.

A thirty-sixth aspect is characterized in that in the thirty-fifth aspect, the step of respectively calculating the transform coefficients performs signal transformation which is any one of discrete cosine transform, Fourier transform and Hadamard transform.

As described in the foregoing, according to the thirty-sixth aspect, the typical system of the signal transformation performed in the calculating step in the thirty-fifth aspect is specified.

A thirty-seventh aspect is directed to a digital information embedding method of embedding inherent digital information in a digital image signal, comprising the steps of dividing the digital image signal into a plurality of blocks each composed of a plurality of pixels previously determined, calculating for each of the blocks a mean value M of the pixels composing the block, and subjecting the mean value M to linear quantization using a previously determined quantization step-size Q (Q is an integer of not less than one), to calculate a quantization value, replacing for each of the blocks, on the basis of the quantization value and the value of the digital information to be embedded which correspond to the block, the quantization value, subjecting for each of the blocks the replaced quantization value to inverse linear quantization using the quantization step-size Q to calculate a mean value M', and adding a difference DM (=M'−M) between the mean value M' and the mean value M to all the pixels composing the block, and calculating a mean value LM of the amplitude values of the pixels in the digital image signal after the addition of the difference DM.

As described in the foregoing, according to the thirty-seventh aspect, the digital information is embedded in the mean value of the pixels composing the block, that is, the lowest frequency component. Consequently, it is possible to prevent the embedded digital information from being lost against an attack for unauthorized utilization from a third person.

A thirty-eighth aspect is characterized in that the step of replacing the quantization value of the thirty-fourth aspect replaces the quantization value with an odd value closest to the value of (M/Q) when each of bits composing the digital information takes a logical value 1, while replacing the quantization value with an even value closest to the value of (M/Q) when the bit takes a logical value 0.

A thirty-ninth aspect is characterized in that in the thirty-fifth aspect, the step of replacing the quantization value replaces the quantization value with an odd value closest to the value of (M/Q) when each of bits composing the digital information takes a logical value 1, while replacing the quantization value with an even value closest to the value of (M/Q) when the bit takes a logical value 0.

A fortieth aspect is characterized in that in the thirty-sixth aspect, the step of replacing the quantization value replaces the quantization value with an odd value closest to the value of (M/Q) when each of bits composing the digital information takes a logical value 1, while replacing the quantization value with an even value closest to the value of (M/Q) when the bit takes a logical value 0.

A forty-first aspect is characterized in that in the thirty-seventh aspect, the step of replacing the quantization value replaces the quantization value with an odd value closest to the value of (M/Q) when each of bits composing the digital information takes a logical value 1, while replacing the quantization value with an even value closest to the value of (M/Q) when the bit takes a logical value 0.

As described in the foregoing, according to the thirty-eighth to forty-first aspects, the quantization value is replaced with an odd or even value closest to the value of (M/Q) on the basis of the logical value of each of the bits composing the digital information in the thirty-fourth to thirty-seventh aspects. Consequently, it is possible to reduce the effect on the degradation of the image at the time of extracting the embedded digital information, and it is difficult for a third person to detect the embedded digital information.

A forty-second aspect is directed to a digital information extracting method of extracting inherent digital information embedded by a particular apparatus in transform coefficients in the lowest frequency band obtained by dividing a digital image signal using either discrete wavelet transform or sub-band division, wherein the digital image signal outputted by the particular apparatus and a quantization step-size are inputted, comprising the steps of dividing the digital image signal into transform coefficients over a plurality of frequency bands using either discrete wavelet transform or sub-band division, dividing the lowest frequency band out of the plurality of frequency bands obtained by the division into a plurality of blocks in accordance with a previously determined block size, calculating for each of the blocks a mean value M of the transform coefficients in the block, and subjecting the mean value M to linear quantization using the previously determined quantization step-size Q, to calculate a quantization value, and judging whether the quantization value is even or odd, to extract the embedded digital information on the basis of the results of the judgment.

As described in the foregoing, according to the forty-second aspect, the logical value of the embedded digital information is judged by the results of extracting the transform coefficients which have been embedded in the lowest frequency band which is hardly affected by data destruction in high frequency bands, and calculating the quantization value of the mean value of the transform coefficients in each of the blocks in the lowest frequency band using a previously determined method. Consequently, accurate digital information can be extracted without being affected by an attack from an unauthorized user.

A forty-third aspect is directed to a digital information extracting method of extracting inherent digital information embedded by a particular apparatus in transform coefficients in the lowest frequency band obtained by dividing a digital image signal using either discrete wavelet transform or sub-band division, wherein the digital image signal outputted by the particular apparatus, a quantization step-size, and a mean value LM of the transform coefficients in the lowest frequency band at the time of output are inputted, comprising the steps of dividing the digital image signal into transform coefficients over a plurality of frequency bands using either discrete wavelet transform or sub-band division, calculating a mean value LM' of the transform coefficients in the lowest frequency band out of the plurality of frequency bands obtained by the division, and subtracting a difference DM (=LM'−LM) between the mean value LM' and the mean value LM from all the transform coefficients in the lowest frequency band, dividing the lowest frequency band after the subtraction of the difference DL into a plurality of blocks in accordance with a previously determined block size, calculating for each of the blocks a mean value M of the transform coefficients in the block, and subjecting the mean value M to linear quantization using the quantization step-size Q, to calculate a quantization value, and judging whether the quantization value is even or odd, to extract the embedded digital information on the basis of the results of the judgment.

As described in the foregoing, according to the forty-third aspect, the logical value of the embedded digital information is judged by the results of calculating, with respect to the lowest frequency band including the transform coefficients whose mean value is corrected using the mean values LM' and LM even when it is changed by image processing such as irreversible compression, the quantization value of the mean value of the transform coefficients in each of the blocks in the lowest frequency band using a previously determined method. Consequently, more accurate digital information can be extracted without being affected by an attack from an unauthorized user.

A forty-fourth aspect is directed to a digital information extracting method of extracting inherent digital information embedded by a particular apparatus in transform coefficients obtained by subjecting a digital image signal to frequency transformation which is any one of discrete cosine transform, Fourier transform and Hadamard transform, then dividing the digital image signal into blocks, and subjecting each of the blocks to orthogonal transform, wherein the digital image signal outputted by the particular apparatus and a quantization step-size are inputted, comprising the steps of dividing the digital image signal into a plurality of blocks each composed of a plurality of pixels previously determined, and subjecting, for each of the blocks, the block to orthogonal transform, to calculate transform coefficients, further classifying the plurality of blocks obtained by the division into groups each comprising one or two or more blocks in accordance with a previously determined number of blocks, calculating for each of the groups a mean value of the respective transform coefficients having the lowest frequency components in the blocks belonging to the group, and subjecting the mean value to linear quantization using the previously determined quantization step-size, to calculate a quantization value, and judging whether the quantization value is even or odd, to extract the embedded digital information on the basis of the results of the judgment.

As described in the foregoing, according to the forty-fourth aspect, the logical value of the embedded digital information is judged by the results of extracting the transform coefficient which has been embedded in the lowest frequency component which is hardly affected by data destruction in high frequency bands, and calculating the quantization value of the mean value of the respective transform coefficients having the lowest frequency components in the plurality of blocks using a previously determined method. Consequently, accurate digital information can be extracted without being affected by an attack from an unauthorized user.

A forty-fifth aspect is directed to a digital information extracting method of extracting inherent digital information embedded by a particular apparatus in transform coefficients obtained by subjecting a digital image signal to signal transformation which is any one of discrete cosine transform, Fourier transform and Hadamard transform, then dividing the digital image signal into blocks, and subjecting each of the blocks to orthogonal transform, wherein the digital image signal outputted by the particular apparatus, a quantization step-size, and a mean value LM of the amplitude values of pixels in the digital image signal at the time of output are inputted, comprising the steps of calculating a mean value LM' of the amplitude values of the pixels in the digital image signal at the time of input, and subtracting a difference DM (=LM'−LM) between the mean value LM' and the mean value LM from the values of all the pixels in the digital image signal, dividing the digital image signal after the subtraction of the difference DL into a plurality of blocks each composed of the plurality of pixels previously determined, and subjecting, for each of the blocks, the block to orthogonal transform, to calculate transform coefficients, further classifying the plurality of blocks obtained by the division into groups each comprising one or two or more blocks in accordance with a previously determined number of blocks, calculating for each of the groups a mean value of the respective transform coefficients having the lowest frequency components in the blocks belonging to the group, and subjecting the mean value to linear quantization using the previously determined quantization step-size, to calculate a quantization value, and judging whether the quantization value is even or odd, to extract the embedded digital information on the basis of the results of the judgment.

As described in the foregoing, according to the forty-fifth aspect, the logical value of the embedded digital information is judged by the results of calculating, with respect to the lowest frequency component, in the digital image signal, including the transform coefficients whose mean value is corrected using the mean values LM' and LM of the amplitude values of the pixels in the digital image signal even when it is changed by image processing such as irreversible compression, the quantization value of the mean value of the respective transform coefficients having the lowest frequency components in the plurality of blocks using a previously determined method. Consequently, more accurate digital information can be extracted without being affected by an attack from an unauthorized user.

A forty-sixth aspect is directed to a digital information extracting method of extracting inherent digital information embedded by a particular apparatus in a mean value of pixels composing each of blocks obtained by dividing a digital image signal, wherein the digital image signal outputted by the particular apparatus and a quantization step-size are inputted, comprising the steps of dividing the digital image signal into a plurality of blocks each composed of a plurality of pixels previously determined, calculating for each of the blocks a mean value of the pixels composing the block, and subjecting the mean value to linear quantization using the quantization step-size, to calculate a quantization value, and judging whether the quantization value is even or odd, to extract the embedded digital information on the basis of the results of the judgment.

As described in the foregoing, according to the forty-sixth aspect, the logical value of the embedded digital information is judged by the results of extracting the mean value of the pixels composing the block which is hardly affected by data destruction in high frequency bands, and calculating the quantization value of the mean value using a previously determined method. Consequently, accurate digital information can be extracted without being affected by an attack from an unauthorized user.

A forty-seventh aspect is directed to a digital information extracting method of extracting inherent digital information embedded by a particular apparatus in a mean value of pixels composing each of blocks obtained by dividing a digital image signal, wherein the digital image signal outputted by the particular apparatus, a quantization step-size, and a mean value LM of the amplitude values of the pixels in the digital image signal at the time of output are inputted, comprising the steps of calculating a mean value LM' of the amplitude values of the pixels in the digital image signal at the time of input, and subtracting a difference DL (=LM'−LM) between the mean value LM' and the mean value LM from the values of all the pixels in the digital image signal, dividing the digital image signal after the subtraction of the difference DL into a plurality of blocks each composed of a plurality of pixels previously determined, calculating a mean value of the pixels composing each of the blocks obtained by the division, and subjecting the mean value to linear quantization using the quantization step-size, to calculate a quantization value, and judging whether the quantization value is even or odd, to extract the embedded digital information on the basis of the results of the judgement.

As described in the foregoing, according to the forty-seventh aspect, the logical value of the embedded digital information is judged by the results of calculating, with respect to the digital image signal including the blocks each composed of pixels whose mean value is corrected using the mean values LM' and LM of the amplitude values of the pixels in the digital image signal even when it is changed by image processing such as irreversible compression, the quantization value of the mean value of the pixels composing the block using a previously determined method. Consequently, accurate digital information can be extracted without being affected by an attack from an unauthorized user.

A forty-eighth aspect is directed to a digital information embedding method of embedding inherent digital information in a digital image signal, comprising the steps of dividing the digital image signal into a plurality of frequency bands to obtain transform coefficients using either discrete wavelet transform or sub-band division, generating, with respect to each of the transform coefficients included in the one or two frequency bands out of the plurality of frequency bands obtained by the division, map information storing a true/false value based on decision whether or not all the absolute amplitude values of the transform coefficient and the other transform coefficients in the same space representation region in the same direction of division as the one or two frequency bands are not more than a previously determined set value, replacing all of the transform coefficient and the other transform coefficients which correspond to the position where the true/false value of the map information is true with a previously determined transform value on the basis of the value of the digital information to be embedded in the transform coefficients, and synthesizing the plurality of transform coefficients after the replacement, to reconstruct a digital image signal.

As described in the foregoing, according to the forty-eighth aspect, the digital information is embedded in a frequency signal over a plurality of hierarchies using either the discrete wavelet transform or the sub-band division. Consequently, it is possible to prevent the embedded digital information from being lost against an attack for unauthorized utilization from a third person.

A forty-ninth aspect is characterized in that in the forty-eighth aspect, the transform value is set to integers±K which are not more than the set value, and the replacing step replaces the transform coefficient and the other transform coefficients with the transform value+K when each of bits composing the digital information takes a logical value 1, while replacing the transform coefficients with the transform value−K when the bit takes a logical value 0.

As described in the foregoing, according to the forty-ninth aspect, the transform coefficient whose absolute amplitude value is not more than the set value is replaced with the transform values±K which are set to not more than the set value. Consequently, it is possible to reduce the effect on the degradation of the image at the time of extracting the embedded digital information, and it is difficult for a third person to detect the embedded digital information.

A fiftieth aspect is characterized in that in the forty-eighth aspect, the generating step generates the map information with respect to the transform coefficients included in at least one or both of the frequency band which is low in its horizontal component and is high in its vertical component and the frequency band which is high in its horizontal component and is low in its vertical component.

A fifty-first aspect is characterized in that in the forty-ninth aspect, the generating step generates the map information with respect to the transform coefficients included in at least one or both of the frequency band which is low in its horizontal component and is high in its vertical component and the frequency band which is high in its horizontal component and is low in its vertical component.

As described in the foregoing, according to the fiftieth and fifty-first aspects, the digital information is embedded in the frequency signal having the lower frequency component in the forty-eighth and forty-ninth aspects. Consequently, it is possible to prevent the embedded digital information from being lost against an attack for unauthorized utilization from a third person.

A fifty-second aspect is directed to a digital information embedding method of embedding inherent digital information in a digital image signal, comprising the steps of dividing the digital image signal into transform coefficients over a plurality of frequency bands using either discrete wavelet transform or sub-band division, generating, with respect to each of the transform coefficients included in the one or two frequency bands out of the plurality of frequency bands obtained by the division, map information storing a true/false value based on decision whether or not the absolute amplitude value of the transform coefficient is included between upper-limit and lower-limit threshold values which are previously determined, replacing the transform coefficient corresponding to the position where the true/false value of the map information is true with a previously determined transform value on the basis of the sign of the transform coefficient and the value of the digital information to be embedded in the transform coefficient, and synthesizing the plurality of transform coefficients after the replacement, to reconstruct a digital image signal.

As described in the foregoing, according to the fifty-second aspect, the digital information is embedded only in the transform coefficients in a deep hierarchical signal which is hardly affected using either the discrete wavelet transform or the sub-band division. Consequently, it is possible to further prevent the embedded digital information from being lost against an attack for unauthorized utilization from a third person.

A fifty-third aspect is directed to a digital information embedding method of embedding inherent digital information in a digital image signal, comprising the steps of dividing the digital image signal into a plurality of block signals of a previously determined size, and subjecting, for each of the block signals, the block signal to orthogonal transform, to calculate transform coefficients, generating, with respect to each of the transform coefficients included in the one or two block signals out of the plurality of block signals obtained by the division, map information storing a true/false value based on decision whether or not the absolute amplitude value of the transform coefficient is included between upper-limit and lower-limit threshold values which are previously determined, replacing the transform coefficient corresponding to the position where the true/false value of the map information is true with a previously determined transform value on the basis of the sign of the transform coefficient and the value of the digital information to be embedded in the transform coefficient, and subjecting the plurality of transform coefficients after the replacement to inverse orthogonal transform, to reconstruct a digital image signal.

As described in the foregoing, according to the fifty-third aspect, the digital information is embedded only in the transform coefficients in a deep hierarchical signal which is hardly affected using the orthogonal transform. Consequently, it is possible to further prevent the embedded digital information from being lost against an attack for unauthorized utilization from a third person.

A fifty-fourth aspect is characterized in that in the fifty-third aspect, the calculating step performs frequency transformation which is any one of discrete cosine transform, Fourier transform and Hadamard transform.

As described in the foregoing, according to the fifty-fourth aspect, the typical system of the frequency transformation performed by the orthogonal transform means in the fifty-third aspect is specified.

A fifty-fifth aspect is characterized in that in the fifty-second aspect, the transform value is set to integers±A and±B between the upper-limit and lower-limit threshold values, and the replacing step replaces the transform coefficient with the transform value+A when each of bits composing the digital information takes a logical value 1 and the sign of the transform coefficient is positive, with the transform value−A when the bit takes a logical value 1 and the sign of the transform coefficient is negative, with the transform value+B when the bit takes a logical value 0 and the sign of the transform coefficient is positive, and with the transform value−B when the bit takes a logical value 0 and the sign of the transform coefficient is negative.

A fifty-sixth aspect is characterized in that in the fifty-third aspect, the transform value is set to integers±A and±B between the upper-limit and lower-limit threshold values, and the replacing step replaces the transform coefficient with the transform value+A when each of bits composing the digital information takes a logical value 1 and the sign of the transform coefficient is positive, with the transform value−A when the bit takes a logical value 1 and the sign of the transform coefficient is negative, with the transform value+B when the bit takes a logical value 0 and the sign of the transform coefficient is positive, and with the transform value−B when the bit takes a logical value 0 and the sign of the transform coefficient is negative.

A fifty-seventh aspect is characterized in that in the fifty-fourth aspect, the transform value is set to integers±A and±B between the upper-limit and lower-limit threshold values, and the replacing step replaces the transform coefficient with the transform value+A when each of bits composing the digital information takes a logical value 1 and the sign of the transform coefficient is positive, with the transform value−A when the bit takes a logical value 1 and the sign of the transform coefficient is negative, with the transform value+B when the bit takes a logical value 0 and the sign of the transform coefficient is positive, and with the transform value−B when the bit takes a logical value 0 and the sign of the transform coefficient is negative.

As described in the foregoing, according to the fifty-fifth to fifty-seventh aspects, the transform coefficient whose absolute amplitude value is within the threshold range is transformed into and replaced with a value within the threshold range considering the sign of the transform coefficient. Consequently, it is possible to reduce the effect on the degradation of the image at the time of extracting the embedded digital information, and it is difficult for a third person to detect the embedded digital information.

A fifty-eighth aspect is characterized in that in the fifty-second aspect, the generating step generates the map information with respect to the respective transform coefficients having the low frequency components other than the DC components.

A fifty-ninth aspect is characterized in that in the fifty-third aspect, the generating step generates the map information with respect to the respective transform coefficients having the low frequency components other than the DC components.

A sixtieth aspect is characterized in that in the fifty-fourth aspect, the generating step generates the map information with respect to the respective transform coefficients having the low frequency components other than the DC components.

A sixty-first aspect is characterized in that in the fifth—fifth aspect, the generating step generates the map information with respect to the respective transform coefficients having the low frequency components other than the DC components.

A sixty-second aspect is characterized in that in the fifty-sixth aspect, the generating step generates the map information with respect to the respective transform coefficients having the low frequency components other than the DC components.

A sixty-third aspect is characterized in that in the fifty-seventh aspect, the generating step generates the map information with respect to the respective transform coefficients having the low frequency components other than the DC components.

As described in the foregoing, according to the fifty-eighth to sixty-third aspects, the digital information is embedded in the frequency signal having the lower frequency component in the fifty-second to fifty-seventh aspects. Consequently, it is possible to further prevent the embedded digital information from being lost against an attack for unauthorized utilization from a third person.

A sixty-fourth aspect is directed to a digital information extracting method of extracting inherent digital information embedded by a particular apparatus in transform coefficients obtained by dividing a digital image signal using either discrete wavelet transform or sub-band division, wherein the digital image signal outputted by the particular apparatus and map information representing the position where the digital information is embedded are inputted, comprising the steps of dividing the digital image signal into a plurality of frequency bands to obtain transform coefficients using either discrete wavelet transform or sub-band division, extracting, on the basis of the map information, the transform coefficient corresponding to the position where a true/false value of the map information is true and the other transform coefficients in the same space representation region in the same direction of division as the frequency band including the transform coefficient, calculating a total value of the transform coefficients included in the one or two or more frequency bands out of the transform coefficient and the other transform coefficients which are extracted, and judging the sign of the total value, to extract the embedded digital information on the basis of the results of the judgment.

As described in the foregoing, according to the sixty-fourth aspect, the logical value of the embedded digital information is judged by the results of extracting the transform coefficients which have been embedded in the low frequency band which is hardly affected by data destruction in high frequency bands, and calculating the total value of the transform coefficients using a previously determined method. Consequently, accurate digital information can be extracted without being affected by an attack from an unauthorized user.

A sixty-fifth aspect is directed to a digital information extracting method of extracting inherent digital information embedded by a particular apparatus in transform coefficients obtained by dividing a digital image signal using either discrete wavelet transform or sub-band division, wherein the digital image signal outputted by the particular apparatus, map information representing the position where the digital information is embedded, and information representing a transform value to be embedded are inputted, comprising the steps of dividing the image signal into a plurality of frequency bands to obtain transform coefficients using either discrete wavelet transform or sub-band division, extracting, on the basis of the map information, the transform coefficient corresponding to the position where a true/false value of the map information is true, calculating an absolute error between the extracted transform coefficient and the transform value, and judging the absolute error, to extract the embedded digital information on the basis of the results of the judgment.

As described in the foregoing, according to the sixty-fifth aspect, the logical value of the embedded digital information is judged by the results of extracting the transform coefficient which has been embedded in a deep hierarchical signal which is not affected by data destruction in high frequency bands, and calculating and judging the absolute error between the transform coefficient and the transform value using a previously determined method. Consequently, accurate digital information can be extracted without being affected by an attack from an unauthorized user A sixty-sixth aspect is directed to a digital information extracting method of extracting inherent digital information embedded by a particular apparatus in transform coefficients obtained by subjecting a digital image signal to frequency transformation which is any one of discrete cosine transform, Fourier transform and Hadamard transform, then dividing the digital image signal into blocks, and subjecting each of the blocks to orthogonal transform, wherein the digital image signal outputted by the particular apparatus, map information representing the position where the digital information is embedded, and information representing a transform value to be embedded are inputted, comprising the steps of dividing the digital image signal into a plurality of block signals of a previously determined size, and subjecting, for each of the block signals, the block signal to orthogonal transform, to calculate transform coefficients, extracting, on the basis of the map information, the transform coefficient corresponding to the position where a true/false value of the map information is true, calculating an absolute error between the extracted transform coefficient and the transform value, and judging the absolute error, to extract the embedded digital information on the basis of the results of the judgment.

As described in the foregoing, according to the sixty-sixth aspect, the logical value of the embedded digital information is judged by the results of extracting, even with respect to a particular digital image signal which has already been subjected to frequency transformation, the transform coefficient which has been embedded in a deep hierarchical signal which is not affected by data destruction in high frequency bands and calculating and judging the absolute error between the transform coefficient and the transform value using a previously determined method. Consequently, accurate digital information can be extracted without being affected by an attack from an unauthorized user.

A sixty-seventh aspect is directed to a recording medium having a program executed in a computer recorded thereon, the program realizing on the computer an operational environment comprising the steps of dividing a digital image signal into transform coefficients over a plurality of frequency bands using either discrete wavelet transform or sub-band division, dividing the lowest frequency band out of the plurality of frequency bands obtained by the division into a plurality of blocks in accordance with a previously determined block size, calculating for each of the blocks a mean value M of the transform coefficients in the block, and subjecting the mean value M to linear quantization using a previously determined quantization step-size Q (Q is an integer of not less than one), to calculate a quantization value, replacing for each of the blocks, on the basis of the quantization value and the value of the digital information to be embedded which correspond to the block, the quantization value, subjecting for each of the blocks the replaced quantization value to inverse linear quantization using the quantization step-size Q to calculate a mean value M', and adding a difference DM (=M'−M) between the mean value M' and the mean value M to all the transform coefficients in the block, calculating a mean value LM of the transform coefficients in the lowest frequency band after the addition of the difference DM, and reconstructing a digital image signal in which the digital information has been embedded using the lowest frequency band after the addition of the difference DM and the other frequency bands.

A sixty-eighth aspect is directed to a recording medium having a program executed in a computer recorded thereon, the program realizing on the computer an operational environment comprising the steps of dividing a digital image signal into a plurality of blocks each composed of a plurality of pixels previously determined, and subjecting, for each of the blocks, the block to orthogonal transform, to calculate transform coefficients, further classifying the plurality of blocks obtained by the division into groups each comprising one or two or more blocks in accordance with a previously determined number of blocks, extracting, for each of the blocks belonging to each of the groups, the transform coefficient having the lowest frequency component (hereinafter referred to as a DC component) out of the transform coefficients in the block and calculating a mean value M of the respective DC components in the blocks, and subjecting the mean value M to linear quantization using a previously determined quantization step-size Q (Q is an integer of not less than one), to calculate a quantization value, replacing for each of the groups, on the basis of the quantization value and the value of the digital information to be embedded which correspond to the group, the quantization value, subjecting for each of the groups the replaced quantization value to inverse linear quantization using the quantization step-size Q to calculate a mean value M', and adding a difference DM (=M'−M) between the mean value M' and the mean value M to all the DC components in the blocks belonging to the group; subjecting the plurality of blocks after the addition of the difference DM to inverse orthogonal transform, to reconstruct a digital image signal in which the digital information has been embedded, and calculating a mean value LM of the amplitude values of the pixels in the reconstructed digital image signal.

A sixty-ninth aspect is characterized in that in the sixty-eighth aspect, the step of respectively calculating the transform coefficients performs signal transformation which is any one of discrete cosine transform, Fourier transform and Hadamard transform.

A seventieth aspect is directed to a recording medium having a program executed in a computer recorded thereon, the program realizing on the computer an operational environment comprising the steps of dividing a digital image signal into a plurality of blocks each composed of a plurality of pixels previously determined, calculating for each of the blocks a mean value M of the pixels composing the block, and subjecting the mean value M to linear quantization using a previously determined quantization step-size Q (Q is an integer of not less than one), to calculate a quantization value, replacing for each of the blocks, on the basis of the quantization value and the value of the digital information to be embedded which correspond to the block, the quantization value, subjecting for each of the blocks the replaced quantization value to inverse linear quantization using the quantization step-size Q to calculate a mean value M', and adding a difference DM (=M'−M) between the mean value M' and the mean value M to all the pixels composing the block, and calculating a mean value LM of the amplitude values of the pixels in the digital image signal after the addition of the difference DM.

A seventy-first aspect is characterized in that the step of replacing the quantization value of the sixty-seventh aspect replaces the quantization value with an odd value closest to the value of (M/Q) when each of bits composing the digital information takes a logical value 1, while replacing the quantization value with an even value closest to the value of (M/Q) when the bit takes a logical value 0.

A seventy-second aspect is characterized in that in the sixty-eighth aspect, the step of replacing the quantization value replaces the quantization value with an odd value closest to the value of (M/Q) when each of bits composing the digital information takes a logical value 1, while replacing the quantization value with an even value closest to the value of (M/Q) when the bit takes a logical value 0.

A seventy-third aspect is characterized in that in the sixty-ninth aspect, the step of replacing the quantization value replaces the quantization value with an odd value closest to the value of (M/Q) when each of bits composing the digital information takes a logical value 1, while replacing the quantization value with an even value closest to the value of (M/Q) when the bit takes a logical value 0.

A seventy-fourth aspect is characterized in that in the seventieth aspect, the step of replacing the quantization value replaces the quantization value with an odd value closest to the value of (M/Q) when each of bits composing the digital information takes a logical value 1, while replacing the quantization value with an even value closest to the value of (M/Q) when the bit takes a logical value 0.

A seventy-fifth aspect is directed to a recording medium having a program executed in a computer recorded thereon, the program realizing on the computer an operational environment comprising, with respect to a digital image signal having inherent digital information embedded by a particular apparatus in transform coefficients in the lowest frequency band obtained by dividing the digital image signal using either discrete wavelet transform or sub-band division, with using a quantization step-size outputted by the particular apparatus, the steps of dividing the digital image signal into transform coefficients over a plurality of frequency bands using either discrete wavelet transform or sub-band division, dividing the lowest frequency band out of the plurality of frequency bands obtained by the division into a plurality of blocks in accordance with a previously determined block size, calculating for each of the blocks a mean value M of the transform coefficients in the block, and subjecting the mean value M to linear quantization using the previously determined quantization step-size, to calculate a quantization value, and judging whether the quantization value is even or odd, to extract the embedded digital information on the basis of the results of the judgment.

A seventy-sixth aspect is directed to a recording medium having a program executed in a computer recorded thereon, the program realizing on the computer an operational environment comprising, with respect to a digital image signal having inherent digital information embedded by a particular apparatus in transform coefficients in the lowest frequency band obtained by dividing the digital image signal using either discrete wavelet transform or sub-band division, and with a quantization step-size outputted by the particular apparatus and a mean value LM of the transform coefficients in the lowest frequency band at the time of output, the steps of dividing the digital image signal into transform coefficients over a plurality of frequency bands using either discrete wavelet transform or sub-band division, calculating a mean value LM' of the transform coefficients in the lowest frequency band out of the plurality of frequency bands obtained by the division, and subtracting a difference DM (=LM'−LM) between the mean value LM' and the mean value LM from all the transform coefficients in the lowest frequency band, dividing the lowest frequency band after the subtraction of the difference DL into a plurality of blocks in accordance with a previously determined block size, calculating for each of the blocks a mean value M of the transform coefficients in the block, and subjecting the mean value M to linear quantization using the quantization step-size Q, to calculate a quantization value, and judging whether the quantization value is even or odd, to extract the embedded digital information on the basis of the results of the judgment.

A seventy-seventh aspect is directed to a recording medium having a program executed in a computer recorded thereon, the program realizing on the computer an operational environment comprising, with respect to a digital image signal having inherent digital information embedded by a particular apparatus in transform coefficients obtained by subjecting the digital image signal to frequency transformation which is any one of discrete cosine transform, Fourier transform and Hadamard transform, then dividing the digital image signal into blocks, and subjecting each of the blocks to orthogonal transform, and with using a quantization step-size outputted by the particular apparatus, the steps of dividing the digital image signal into a plurality of blocks each composed of a plurality of pixels previously determined, and subjecting, for each of the blocks, the block to orthogonal transform, to calculate transform coefficients, further classifying the plurality of blocks obtained by the division into groups each comprising one or two or more blocks in accordance with a previously determined number of blocks, calculating for each of the groups a mean value of the respective transform coefficients having the lowest frequency components in the blocks belonging to the group, and subjecting the mean value to linear quantization using the previously determined quantization step-size, to calculate a quantization value, and judging whether the quantization value is even or odd, to extract the embedded digital information on the basis of the results of the judgment.

A seventy-eighth aspect is directed to a recording medium having a program executed in a computer recorded thereon, the program realizing on the computer an operational environment comprising, with respect to a digital image signal having inherent digital information embedded by a particular apparatus in transform coefficients obtained by subjecting the digital image signal to signal transformation which is any one of discrete cosine transform, Fourier transform and Hadamard transform, then dividing the digital image signal into blocks, and subjecting each of the blocks to orthogonal transform, with using a quantization step-size outputted by the particular apparatus and a mean value LM of the amplitude values of pixels in the digital image signal at the time of output, the steps of calculating a mean value LM' of the amplitude values of the pixels in the digital image signal at the time of input, and subtracting a difference DM (=LM'−LM) between the mean value LM' and the mean value LM from the values of all the pixels in the digital image signal, dividing the digital image signal after the subtraction of the difference DL into a plurality of blocks each composed of a plurality of pixels previously determined, and subjecting, for each of the blocks, the block to orthogonal transform, to calculate transform coefficients, further classifying the plurality of blocks obtained by the division into groups each comprising one or two or more blocks in accordance with a previously determined number of blocks, calculating for each of the groups a mean value of the respective transform coefficients having the lowest frequency components in the blocks belonging to the group, and subjecting the mean value to linear quantization using the previously determined quantization step-size, to calculate a quantization value, and judging whether the quantization value is even or odd, to extract the embedded digital information on the basis of the results of the judgment.

A seventy-ninth aspect is directed to a recording medium having a program executed in a computer recorded thereon, the program realizing on the computer an operational environment comprising, with respect to a digital image signal having inherent digital information embedded by a particular apparatus in a mean value of pixels composing each of blocks obtained by dividing the digital image signal, with using a quantization step-size outputted by the particular apparatus, the steps of dividing the digital image signal into a plurality of blocks each composed of a plurality of pixels previously determined, calculating for each of the blocks a mean value of the pixels composing the block, and subjecting the mean value to linear quantization using the quantization step-size, to calculate a quantization value, and judging whether the quantization value is even or odd, to extract the embedded digital information on the basis of the results of the judgment.

An eightieth aspect is directed to a recording medium having a program executed in a computer recorded thereon, the program realizing on the computer an operational environment comprising, with respect to a digital image signal having inherent digital information embedded by a particular apparatus in a mean value of pixels composing each of blocks obtained by dividing the digital image signal, with using a quantization step-size and a mean value LM of the amplitude values of the pixels in the digital image signal at the time of output, the steps of calculating a mean value LM' of the amplitude values of the pixels in the digital image signal at the time of input, and subtracting a difference DL (=LM'−LM) between the mean value LM' and the mean value LM from the values of all the pixels in the digital image signal, dividing the digital image signal after the subtraction of the difference DL into a plurality of blocks each composed of a plurality of pixels previously determined, calculating a mean value of the pixels composing each of the blocks obtained by the division, and subjecting the mean value to linear quantization using the quantization step-size, to calculate a quantization value, and judging whether the quantization value is even or odd, to extract the embedded digital information on the basis of the results of the judgment.

An eighty-first aspect is directed to a recording medium having a program executed in a computer recorded thereon, the program realizing on the computer an operational environment comprising the steps of dividing a digital image signal into a plurality of frequency bands to obtain transform coefficients using either discrete wavelet transform or sub-band division, generating, with respect to each of the transform coefficients included in the one or two frequency bands out of the plurality of frequency bands obtained by the division, map information storing a true/false value based on decision whether or not all the absolute amplitude values of the transform coefficient and the other transform coefficients in the same space representation region in the same direction of division as the one or two frequency bands are not more than a previously determined set value, replacing all of the transform coefficient and the other transform coefficients which correspond to the position where the true/false value of the map information is true with a previously determined transform value on the basis of the value of the digital information to be embedded in the transform coefficients, and synthesizing the plurality of transform coefficients after the replacement, to reconstruct a digital image signal.

An eighty-second aspect is characterized in that in the eighty-first aspect, the transform value is set to integers±K which are not more than the set value, and the replacing step replaces the transform coefficient and the other transform coefficients with the transform value+K when each of bits composing the digital information takes a logical value 1, while replacing the transform coefficients with the transform value−K when the bit takes a logical value 0.

An eighty-third aspect is characterized in that in the eighty-first aspect, the generating step generates the map information with respect to the transform coefficients included in at least one or both of the frequency band which is low in its horizontal component and is high in its vertical component and the frequency band which is high in its horizontal component and is low in its vertical component.

An eighty-fourth aspect is characterized in that in the eighty-second aspect, the generating step generates the map information with respect to the transform coefficients included in at least one or both of the frequency band which is low in its horizontal component and is high in its vertical component and the frequency band which is high in its horizontal component and is low in its vertical component.

An eighty-fifth aspect is directed to a recording medium having a program executed in a computer recorded thereon, the program realizing on the computer an operational environment comprising the steps of dividing a digital image signal into transform coefficients over a plurality of frequency bands using either discrete wavelet transform or sub-band division, generating, with respect to each of the transform coefficients included in the one or two frequency bands out of the plurality of frequency bands obtained by the division, map information storing a true/false value based on decision whether or not the absolute amplitude value of the transform coefficient is included between upper-limit and lower-limit threshold values which are previously determined, replacing the transform coefficient corresponding to the position where the true/false value of the map information is true with a previously determined transform value on the basis of the sign of the transform coefficient and the value of the digital information to be embedded in the transform coefficient, and synthesizing the plurality of transform coefficients after the replacement, to reconstruct a digital image signal.

An eighty-sixth aspect is directed to a recording medium having a program executed in a computer recorded thereon, the program realizing on the computer an operational environment comprising the steps of dividing a digital image signal into a plurality of block signals of a previously determined size, and subjecting, for each of the block signals, the block signal to orthogonal transform, to calculate transform coefficients, generating, with respect to each of the transform coefficients included in the one or two block signals out of the plurality of block signals obtained by the division, map information storing a true/false value based on decision whether or not the absolute amplitude value of the transform coefficient is included between upper-limit and lower-limit threshold values which are previously determined, replacing the transform coefficient corresponding to the position where the true/false value of the map information is true with a previously determined transform value on the basis of the sign of the transform coefficient and the value of the digital information to be embedded in the transform coefficient, and subjecting the plurality of transform coefficients after the replacement to inverse orthogonal transform, to reconstruct a digital image signal.

An eighty-seventh aspect is characterized in that in the eighty-sixth aspect, the calculating step performs frequency transformation which is any one of discrete cosine transform, Fourier transform and Hadamard transform.

An eighty-eighth aspect is characterized in that in the eighty-fifth aspect, the transform value is set to integers±A and±B between the upper-limit and lower-limit threshold values, and the replacing step replaces the transform coefficient with the transform value+A when each of bits composing the digital information takes a logical value 1 and the sign of the transform coefficient is positive, with the transform value−A when the bit takes a logical value 1 and the sign of the transform coefficient is negative, with the transform value+B when the bit takes a logical value 0 and the sign of the transform coefficient is positive, and with the transform value−B when the bit takes a logical value 0 and the sign of the transform coefficient is negative.

An eighty-ninth aspect is characterized in that in the eighty-sixth aspect, the transform value is set to integers±A and±B between the upper-limit and lower-limit threshold values, and the replacing step replaces the transform coefficient with the transform value+A when each of bits composing the digital information takes a logical value 1 and the sign of the transform coefficient is positive, with the transform value−A when the bit takes a logical value 1 and the sign of the transform coefficient is negative, with the transform value+B when the bit takes a logical value 0 and the sign of the transform coefficient is positive, and with the transform value−B when the bit takes a logical value 0 and the sign of the transform coefficient is negative.

A ninetieth aspect is characterized in that in the eighty-seventh aspect, the transform value is set to integers±A and±B between the upper-limit and lower-limit threshold values, and the replacing step replaces the transform coefficient with the transform value+A when each of bits composing the digital information takes a logical value 1 and the sign of the transform coefficient is positive, with the transform value−A when the bit takes a logical value 1 and the sign of the transform coefficient is negative, with the transform value+B when the bit takes a logical value 0 and the sign of the transform coefficient is positive, and with the transform value−B when the bit takes a logical value 0 and the sign of the transform coefficient is negative.

A ninety-first aspect is characterized in that in the eighty-fifth aspect, the generating step generates the map information with respect to the respective transform coefficients having the low frequency components other than the DC components.

A ninety-second aspect is characterized in that in the eighty-sixth aspect, the generating step generates the map information with respect to the respective transform coefficients having the low frequency components other than the DC components.

A ninety-third aspect is characterized in that in the eighty-seventh aspect, the generating step generates the map information with respect to the respective transform coefficients having the low frequency components other than the DC components.

A ninety-fourth aspect is characterized in that in the eighty-eighth aspect, the generating step generates the map information with respect to the respective transform coefficients having the low frequency components other than the DC components.

A ninety-fifth aspect is characterized in that in the eighty-ninth aspect, the generating step generates the map information with respect to the respective transform coefficients having the low frequency components other than the DC components.

A ninety-sixth aspect is characterized in that in the ninetieth aspect, the generating step generates the map information with respect to the respective transform coefficients having the low frequency components other than the DC components.

A ninety-seventh aspect is directed to a recording medium having a program executed in a computer, the program realizing on the computer an operational environment comprising, with respect to a digital image signal having inherent digital information embedded by a particular apparatus in transform coefficients obtained by dividing the digital image signal using either discrete wavelet transform or sub-band division, with using map information outputted by the particular apparatus and representing the position where the digital information is embedded, the steps of dividing the digital image signal into transform coefficients over a plurality of frequency bands using either discrete wavelet transform or sub-band division, extracting, on the basis of the map information, the transform coefficient corresponding to the position where a true/false value of the map information is true and the other transform coefficients in the same space representation region in the same direction of division as the frequency band including the transform coefficient, calculating a total value of the transform coefficients included in the one or two or more frequency bands out of the transform coefficient and the other transform coefficients which are extracted, and judging the sign of the total value, to extract the embedded digital information on the basis of the results of the judgment.

A ninety-eighth aspect is directed to a recording medium having a program executed in a computer recorded thereon, the program realizing on the computer an operational environment comprising, with respect to a digital image signal having inherent digital information embedded by a particular apparatus in transform coefficients obtained by dividing the digital image signal using either discrete wavelet transform or sub-band division, with using map information outputted by the particular apparatus and representing the position where the digital information is embedded and information representing a transform value to be embedded, the steps of dividing the image signal into transform coefficients over a plurality of frequency bands using either discrete wavelet transform or sub-band division, extracting, on the basis of the map information, the transform coefficient corresponding to the position where a true/false value of the map information is true, calculating an absolute error between the extracted transform coefficient and the transform value, and judging the absolute error, to extract the embedded digital information on the basis of the results of the judgment.

A ninety-ninth aspect is directed to a recording medium having a program executed in a computer, the program realizing on the computer an operational environment comprising, with respect to a digital image signal having inherent digital information embedded by a particular apparatus in transform coefficients obtained by subjecting the digital image signal to frequency transformation which is any one of discrete cosine transform, Fourier transform and Hadamard transform, then dividing the digital image signal into blocks, and subjecting each of the blocks to orthogonal transform, with using map information outputted by the particular apparatus and representing the position where the digital information is embedded and information representing a transform value to be embedded, the steps of dividing the digital image signal into a plurality of block signals of a previously determined size, and subjecting, for each of the block signals, the block signal to orthogonal transform, to calculate transform coefficients, extracting, on the basis of the map information, the transform coefficient corresponding to the position where a true/false value of the map information is true, calculating an absolute error between the extracted transform coefficient and the transform value, and judging the absolute error, to extract the embedded digital information on the basis of the results of the judgment.

As described in the foregoing, the sixty-seventh to ninety-ninth aspects are directed to the recording mediums respectively having programs for carrying out digital information embedding and extracting methods in the foregoing forty-fifth to sixty-sixth aspects. This corresponds to the supply of the digital information embedding and extracting methods in the forty-fifth to sixty-sixth aspects to the existing apparatus in the form of software.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 8 is a block diagram showing the construction of a digital information extracting apparatus 1b according to a second embodiment of the present invention.

FIGS. 21(a) to 21(b) are diagrams for explaining the generation of map information in the map information generation portion 52

FIG. 25 is a block diagram showing the construction of a digital information embedding apparatus 5a according to a ninth embodiment of the present invention.

FIG. 27 is a diagram showing the contents of transformation designated by a signal transform portion 62 shown in FIG. 25.

DESCRIPTION OF THE PREFERRED EMBODIMENTS (First Embodiment)

Figure 1:
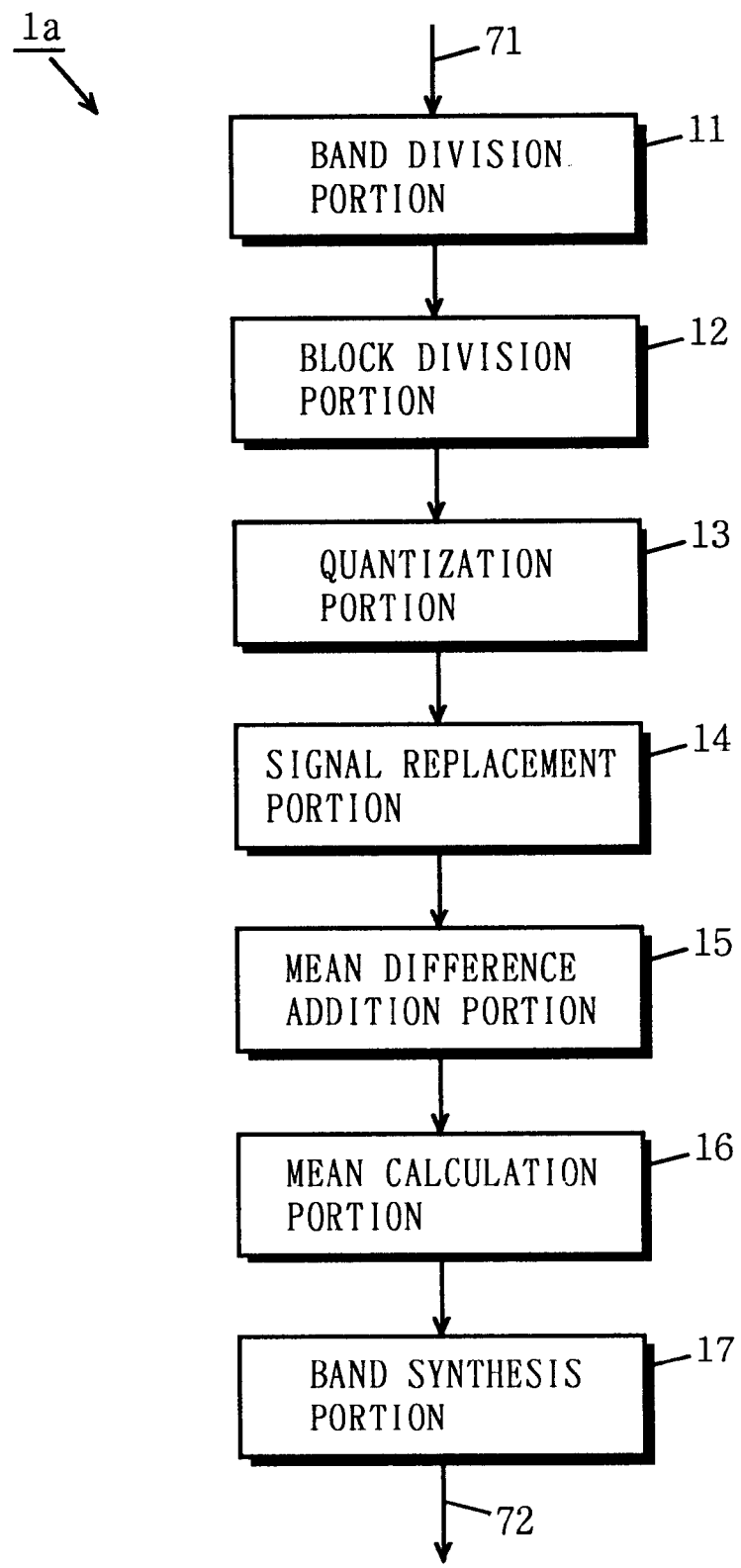
FIG. 1 is a block diagram showing the construction of a digital information embedding apparatus 1a according to a first embodiment of the present invention.

FIG. 1 is a block diagram showing the construction of a digital information embedding apparatus according to a first embodiment of the present invention. In FIG. 1, the digital information embedding apparatus 1a comprises a band division portion 11, a block division portion 12, a quantization portion 13, a signal replacement portion 14, a mean difference addition portion 15, a mean calculation portion 16, and a band synthesis portion 17.

The band division portion 11 in the digital information embedding apparatus 1a according to the first embodiment has the same structure as the band dividing device 11 described in the above-mentioned prior art, and is assigned the same reference numeral and hence, the description thereof is not repeated.

The band division portion 11 receives a digitized image signal 71, and divides the image signal 71 into 10 frequency bands, i.e., an LL3 signal, LHi signals, HLi signals and HHi signals (i=1 to 3, the same is true for the following) by discrete wavelet transform, to calculate respective transform coefficients. The block division portion 12 divides the lowest frequency band signal (the LL3 signal) obtained by the division in the band division portion 11 into a plurality of blocks in accordance with a previously determined block size. The quantization portion 13 finds, for each of the plurality blocks obtained by the division in the block division portion 12, a mean value M of the transform coefficients in the block. The quantization portion 13 subjects the found mean value M to linear quantization using a previously determined quantization step-size Q, to calculate a quantization value q. The signal replacement portion 14 replaces the quantization value q found in the quantization portion 13 with a value (q+1) or a value (q−1) on the basis of the value of digital information to be embedded in the block. The mean difference addition portion 15 subjects the quantization values (q±1) obtained by the replacement in the signal replacement portion 14 to inverse linear quantization using the quantization step-size Q, to respectively find mean values M'. The mean difference addition portion 15 calculates for each of the blocks a difference DM between the found mean value M' and the above-mentioned mean value M (DM=M'−M), and respectively adds the difference DM to all the transform coefficients in the block. The mean calculation portion 16 calculates a mean value LM of all the transform coefficients in the LL3 signal which has been subjected to the addition processing in the mean difference addition portion 15. The band synthesis portion 17 synthesizes the LL3 signal which has been subjected to the embedding processing and a plurality of other frequency band signals, to reconstruct an image signal 72

Referring now to FIGS. 2 to 7, a digital information embedding method carried out by the digital information embedding apparatus 1a will be described while taking specific examples.

Figure 2:
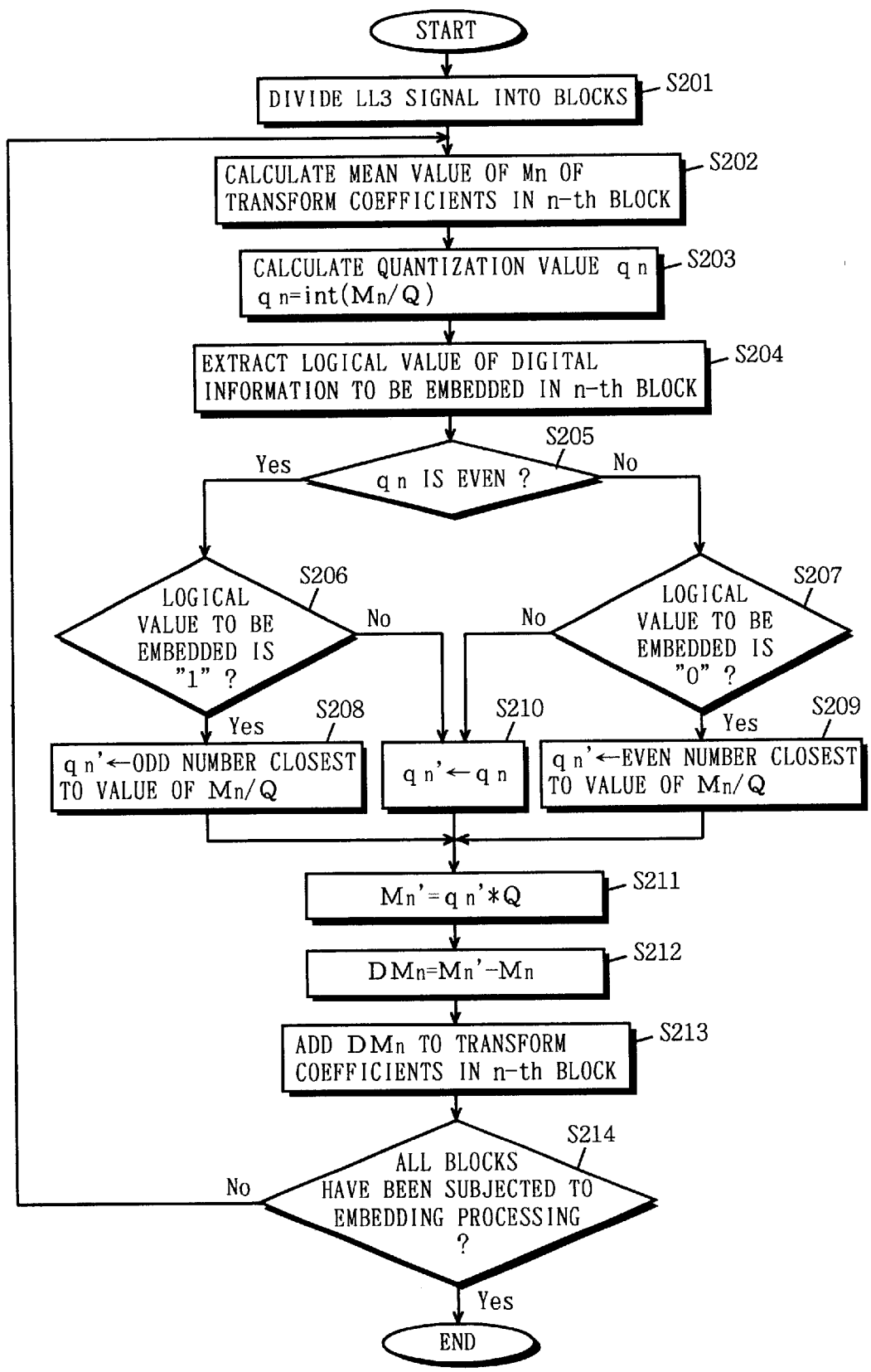
FIG. 2 is a flow chart showing processing performed in a block division portion 12, a quantization portion 13, a signal replacement portion 14, and a mean difference addition portion 15 shown in FIG. 1.
Figure 3:
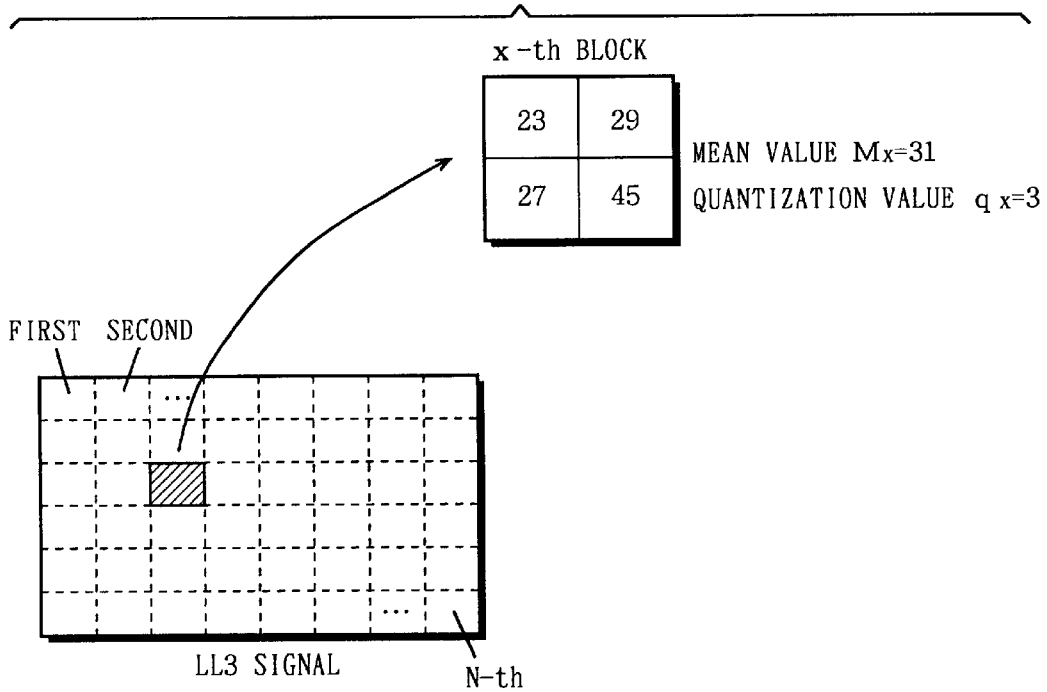
FIG. 3 is a diagram showing an example of blocks obtained by dividing an LL3 signal.
Figure 4:
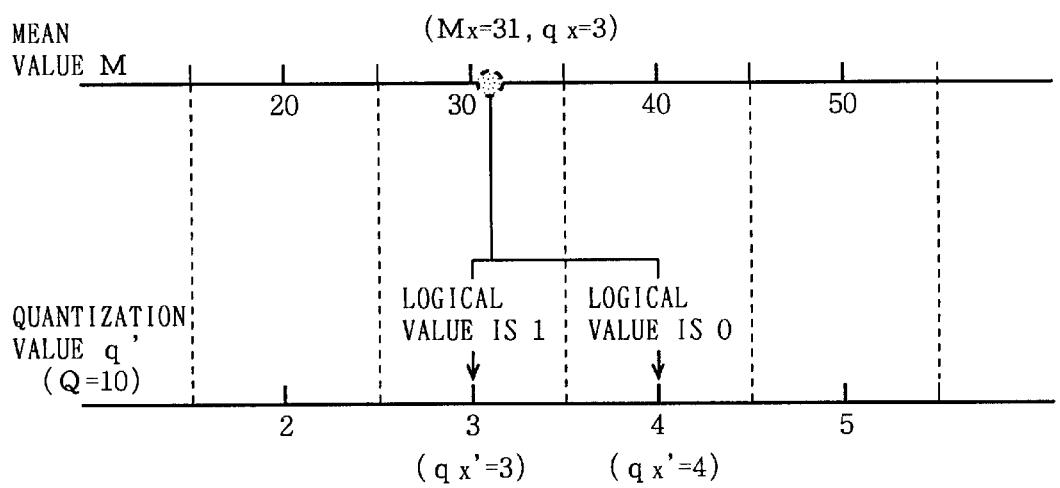
FIG. 4 is a diagram showing an example of processing performed in the signal replacement portion 14 shown in FIG. 1
Figure 5:
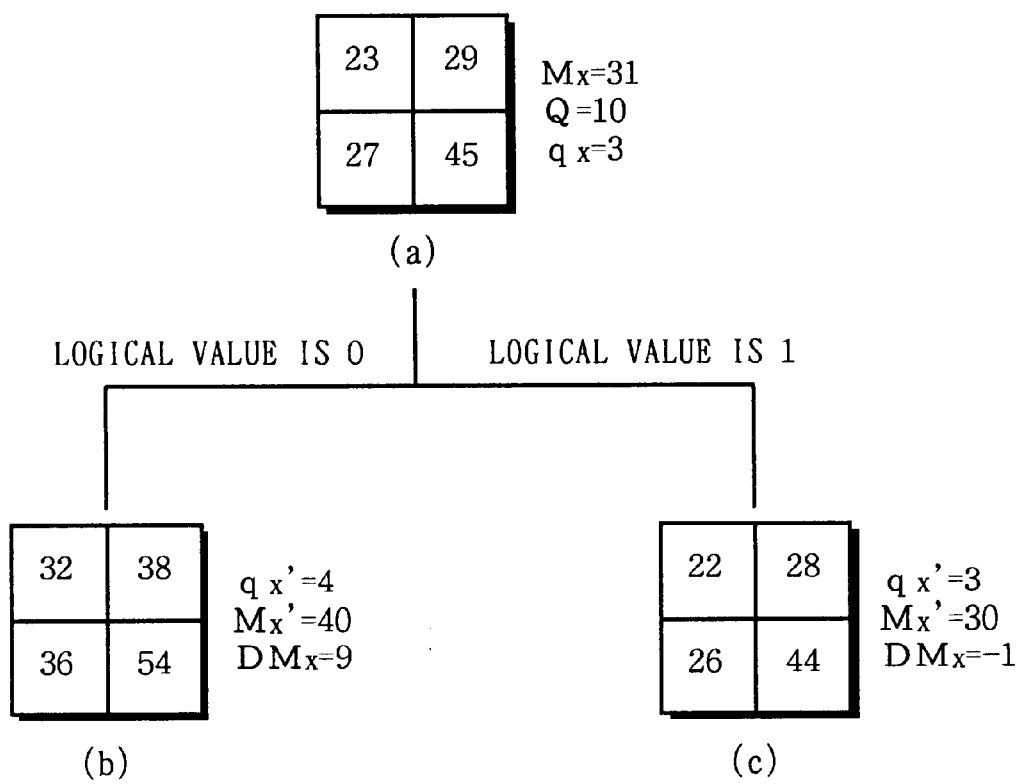
FIGS. 5(a) to 5(c) are diagrams showing an example of processing performed in the mean difference addition portion 15 shown in FIG. 1.
Figure 6:
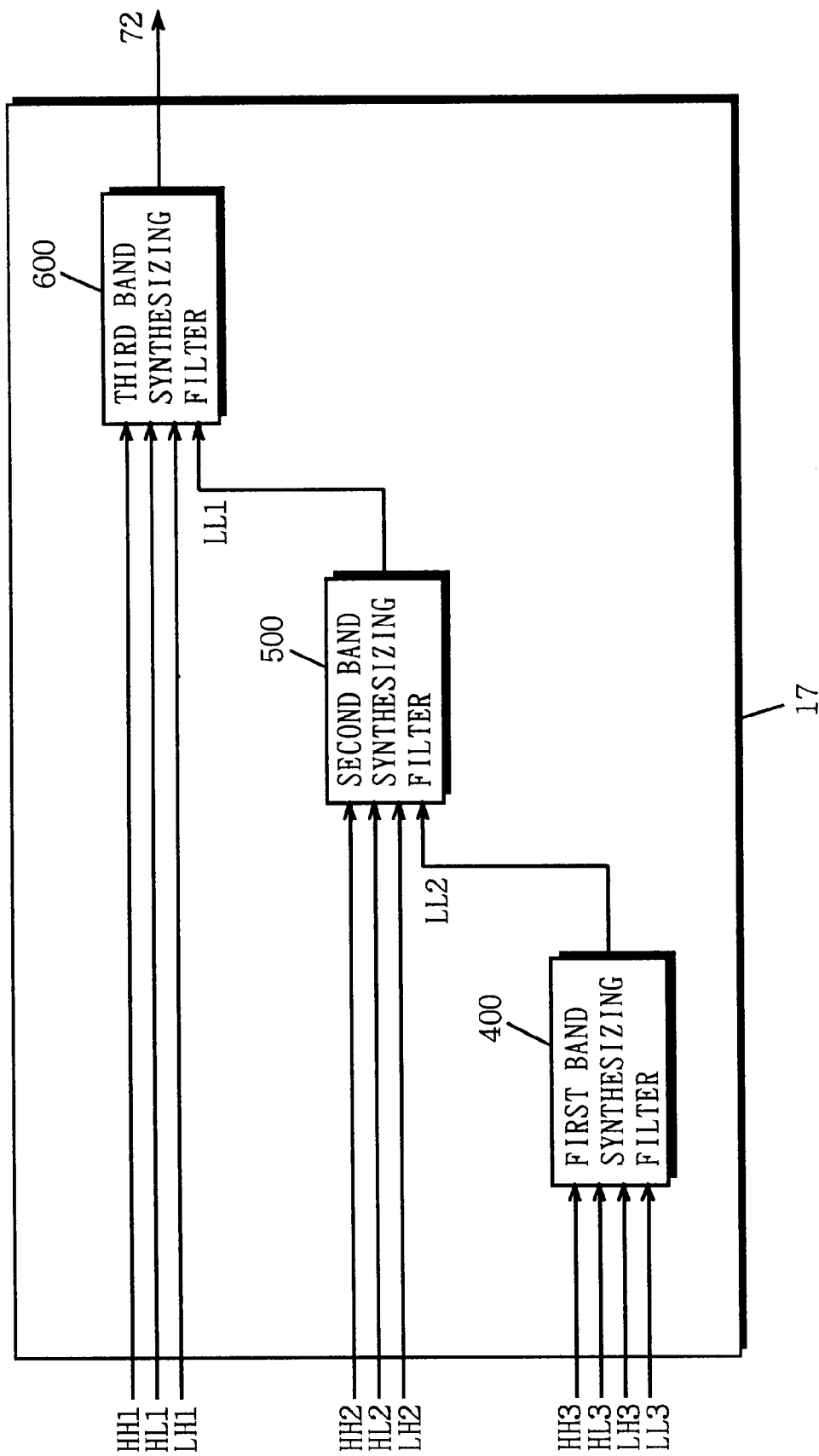
FIG. 6 is a block diagram showing an example of the structure of a band synthesis portion 17 shown in FIG. 1.
Figure 7:
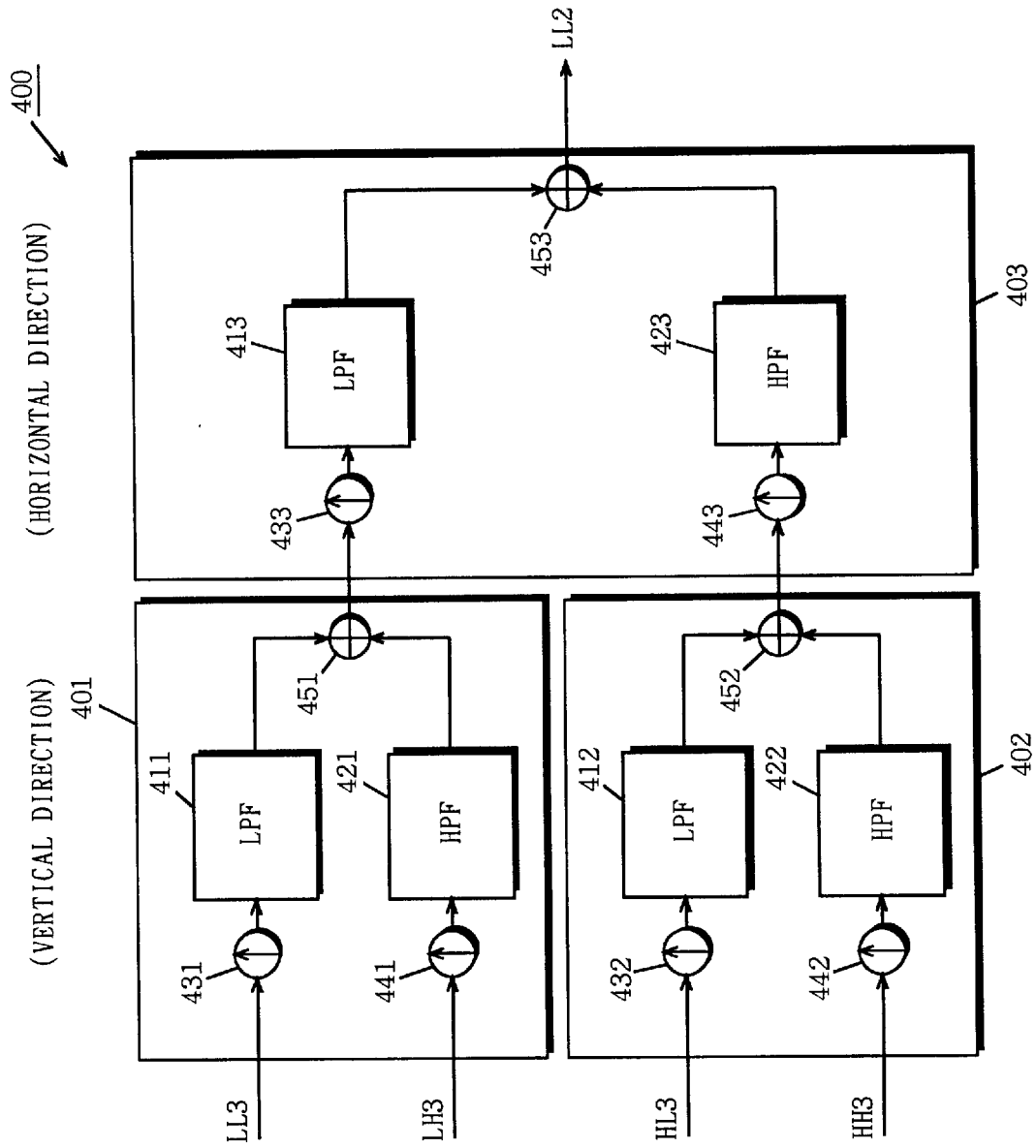
FIG. 7 is a block diagram showing an example of the structure of a first band synthesizing filter shown in FIG. 5.

FIG. 2 is a flow chart showing processing performed in the block division portion 12, the quantization portion 13, the signal replacement portion 14, and the mean difference addition portion 15. FIG. 3 is a diagram showing an example of blocks obtained by dividing the LL3 signal. FIG. 3 illustrates, in a case where the LL3 signal is divided into blocks of a 2×2 size, four transform coefficients in the x-th block. FIG. 4 is a diagram showing an example of processing performed in the signal replacement portion 14. FIG. 5 is a diagram showing an example of processing performed in the mean difference addition portion 15. FIG. 6 is a block diagram showing an example of the structure of the band synthesis portion 17. FIG. 7 is a block diagram showing an example of the structure of a first band synthesizing filter.

In the following description, digital information to be embedded in an image shall be a bit stream obtained by binary-coding the name of a copyright owner, the date for generation, and so forth.

Referring to FIG. 2, the block division portion 12 first divides the LL3 signal outputted by the band division portion 11 into the first to N-th (N is an integer which is not less than two; the same is true for the following) blocks in accordance with a previously determined block size (step S201). The number of blocks N obtained by the division may be not less than the number of logical values, of the digital information, to be embedded.

The size of the block may be an arbitrary size other than the 2×2 size illustrated in FIG. 3. The shape of the block need not be a square such as a regular square or a rectangle, and may be another shape (for example, a triangle or a rhombus).

The quantization portion 13 then calculates a mean value Mn of transform coefficients in the n-th (n=1 to N, the same is true for the following) block (step S202).

In the foregoing step S201, when the size of the block obtained by the division is set to a 1×1 size, processing for calculating a mean value need not be performed.

For example, in FIG. 3, a mean value Mx in the x-th block is as follows:

$$Mx=(23+29+27+45)/4=31$$

Referring to FIG. 2 again, the quantization portion 13 further subjects the mean value Mn to linear quantization using the previously determined quantization step-size Q (Q is an integer of not less than one), to calculate a quantization value qn (step S203). The linear quantization means rounding a certain numerical value to a whole number by rounding up or down figures after its decimal point in accordance with a round-off rule (a function int(m) shall represent linear quantization of m). The quantization step-size Q is the spacing between a transform value in a case where digital information to be embedded takes a logical value "1" and a transform value in a case where it takes a logical value "0", or the amount of replacement. When the quantization step-size Q is decreased, therefore, the quality of the image in which the digital information is to be embedded is hardly degraded, while the attack resistance of the digital information to be embedded is decreased. When the quantization step-size Q is increased, the attack resistance of the digital information is increased, while the quality of the image is significantly degraded because the amount of replacement is increased. Consequently, the quantization step-size Q is not uniquely determined but can be arbitrarily set by a target and object image signal. In the description of the first embodiment, the quantization step-size Q is taken as 10.

For example, in FIG. 3, the quantization value qx in the x-th block is as follows because the mean value Mx is 31 as described above:

$$qx=int(Mx/Q)=int(31/10)=3$$

Referring to FIG. 2 again, the signal replacement portion 14 extracts the logical value ("1" or "0"), of the digital information, to be embedded in the n-th block (step S204). Thereafter, the signal replacement portion 14 judges whether the quantization value qn is even or odd (step S205). When the quantization value qn is even in the judgment at the step S205, the signal replacement portion 14 further judges whether the logical value to be embedded, which is extracted at the foregoing step S204, is "1" (step S206). When the logical value to be embedded is "1" in the judgment at the step S206, the signal replacement portion 14 takes an odd number closest to the value of Mn/Q (either qn+1 or qn−1) as a quantization value qn' (that is, the quantization value qn is replaced with qn') (step S208). Contrary to this, when the logical value to be embedded is "0" in the judgment at the step S206, the signal replacement portion 14 takes the quantization value qn as a quantization value qn' (step S210).

On the other hand, when the quantization value qn is not even (that is, odd) in the judgment at the step S205, the signal replacement portion 14 further judges whether the logical value to be embedded is "0" (step S207). When the logical value to be embedded is "0" in the judgment at the step S207, the signal replacement portion 14 takes an even number closest to the value of Mn/Q (either qn+1 or qn−1) as a quantization value qn' (step S209). Contrary to this, when the logical value to be embedded is "1" in the judgment at the step S207, the signal replacement portion 14 takes the quantization value qn as a quantization value qn' (step S210).

For example, referring to FIG. 4, the quantization value qx in the x-th block shown in FIG. 3 is "3" (an odd number) as described above, and Mx/Q=3.1. By following the steps S205 to S210, therefore, when the logical value "1" of the digital information is embedded in the x-th block, the quantization value qx is odd, so that the value of qx=3 is taken as a quantization value qx'=3. Contrary to this, when the logical value "0" of the digital information is embedded in the x-th block, an even number closest to the value of M/xQ=3.1, i.e., "4" is taken as a quantization value qx' (qx'=qx+1).

Referring to FIG. 2 again, the mean difference addition portion 15 performs inverse linear quantization using the quantization value qn' which is found at any one of the foregoing steps S208 to S210 and the quantization step-size Q, to calculate a mean value Mn' (=qn'*Q) (step S211). The mean difference addition portion 15 finds a difference DMn between the calculated mean value Mn' and the mean value Mn found at the foregoing step S202 (DMn=Mn'−Mn) (step S212). Further, the mean difference addition portion 15 adds the difference DMn to all the transform coefficients in the n-th block (step S213).

For example, referring to FIG. 5, when the logical value "0" of the digital information is embedded in the x-th block, the quantization value qx' is four, as described above, so that a mean value Mx' after the inverse linear quantization is as follows:

$$Mx'=qx'* Q=4*10=40$$

A difference DMx from the mean value Mx is as follows:

$$DMx=Mx'-Mx=40-31=+9$$

The difference DMx is added to each of the transform coefficients in the x-th block, to create a transform coefficient after digital information embedding processing (FIG. 5(b)).

On the other hand, when the logical value "1" of the digital information is embedded in the x-th block, the quantization value qx' is three, as described above, so that a mean value Mx' after the inverse linear quantization is as follows:

$$Mx'=qx'*Q=3*10=30$$

A difference DMx from the mean value Mx is as follows:

$$DMx=Mx'-Mx=30-31=-1$$

The difference DMx is added to each of the transform coefficients in the x-th block (in this case, is subtracted as a consequence), to create a transform coefficient after digital information embedding processing (FIG. 5(c)).

The quantization portion 13, the signal replacement portion 14, and the mean difference addition portion 15 judge, in order to perform the above-mentioned digital information embedding processing (the foregoing steps S202 to S213) with respect to all the first to N-th blocks, whether all the blocks have been processed (step S214). When there exists a block which has not been processed yet, the program is returned to the foregoing step S202, to repeatedly perform the same processing.

Thereafter, the mean calculation portion 16 calculates a mean value LM of all the transform coefficients in the LL3 signal. The mean value LM will be a correction value for extracting, in extracting the embedded digital information as described later when the image signal is changed by an exterior attack, the digital information more reliably.

When the change of the image signal (particularly the LL3 signal) need not be considered because there is no attack from the exterior, it is possible to omit the structure of the mean calculation portion 16 for calculating the mean value LM of the transform coefficients in the LL3 signal.

When the number of bits composing the digital information is smaller than the number of blocks obtained by the division, methods such as a method of embedding all bits composing the digital information, and then continuously embedding the bits, starting with the first bit, and a method of embedding a bit "0 (or 1)" in all the remaining blocks may be used.

Description is now made of processing performed by the band synthesis portion 17. In short, the band synthesis portion 17 performs processing reverse to the processing performed by the band division portion 11.

Referring to FIG. 6, the band synthesis portion 17 comprises first to third band synthesizing filters 400, 500 and 600 having the same structure. Each of the first to third band synthesizing filters 400, 500 and 600 receives four frequency band signals, and synthesizes the signals, to output one signal.

The first band synthesizing filter 400 receives the LL3 signal in which the digital information has been embedded, and an LH3 signal, an HL3 signal and an HH3 signal, and synthesizes the signals, to generate an LL2 signal. The second band synthesizing filter 500 receives the LL2 signal obtained by the synthesis, and an LH2 signal, an HL2 signal and an HH2 signal, and synthesizes the signals, to generate an LL1 signal. The third band synthesizing filter 600 receives the LL1 signal obtained by the synthesis, and an LH1 signal, an HL1 signal and an HH1 signal, and synthesizes the signals, to generate an image signal 72.

FIG. 7 is a block diagram showing an example of the structure of the first band synthesizing filter 400. In FIG. 7, the first band synthesizing filter 400 comprises first to third two-band synthesis portions 401 to 403. The first to third two-band synthesis portions 401 to 403 respectively comprise LPFs 411 to 413, HPFs 421 to 423, up-samplers 431 to 433 and 441 to 443 for inserting zero into a signal at a ratio of 2:1, and adders 451 to 453.

The first two-band synthesis portion 401 receives the LL3 signal and the LH3 signal, and transforms the signals, respectively, into signals which are twice their original sizes using the up-samplers 431 and 441, filters the two signals obtained by the transformation with respect to their vertical components by the LPF 411 and the HPF 421, and then adds the signals by the adder 451, to output the result of the addition. On the other hand, the second two-band synthesis portion 402 receives the HL3 signal and the HH3 signal, and transforms the signals, respectively, into signals which are twice their original sizes using the up-samplers 432 and 442, filters the two signals obtained by the transformation with respect to their vertical components by the LPF 412 and HPF 422, and then adds the signals by the adder 452, to output the result of the addition. The third two-band synthesis portion 403 receives outputs of the adders 451 and 452, and transforms the outputs, respectively, into signals which are twice their original sizes using the up-samplers 433 and 443, filters the two signals obtained by the transformation with respect to their horizontal components by the LPF 413 and the HPF 423, and then adds the signals by the adder 453, to output the result of the addition.

Consequently, the LL2 signal which is low in both its horizontal and vertical components, which is a second hierarchical signal, is outputted from the first band synthesizing filter 400.

The second and third band synthesizing filters 500 and 600 also respectively perform the same processing as described above with respect to signals inputted thereto.

The band synthesis portion 17 reconstructs the 10 frequency band signals, i.e., the LL3 signal, the LHi signals, the HLi signals, and the HHi signals as the image signal 72 which has been subjected to the embedding processing, as described above, to output the image signal 72, together with the quantization step-size Q and the mean value LM.

As described in the foregoing, the digital information embedding apparatus 1a according to the first embodiment embeds the digital information only in the transform coefficients in the lowest frequency band (the LL3 signal). Consequently, it is possible to prevent the embedded digital information from being lost against an attack for unauthorized utilization from a third person.

Furthermore, the digital information embedding apparatus 1a according to the first embodiment replaces the quantization value qn with either one of an odd value and an even value which are closest to the value of Mn/Q on the basis of the logical value of the digital information. Consequently, it is possible to reduce the effect on the degradation of the image at the time of extracting the embedded digital information, and it is difficult for the third person to detect the embedded digital information.

Discrete wavelet transform performed in the digital information embedding apparatus 1a according to the first embodiment is not limited to three hierarchies. It can be performed even many times until the LL signal reaches a 1×1 element.

Furthermore, the processing for replacing the quantization value qn in the signal replacement portion 14 may be replacement of the quantization value with an odd quantization value closest to the value of Mn/Q when the logical value, of the digital information, to be embedded is "0" and an even quantization value closest to the value of Mn/Q when the logical value is "1".

(Second Embodiment)

FIG. 8 is a block diagram showing the construction of a digital information extracting apparatus according to a second embodiment of the present invention. The digital information extracting apparatus 1b according to the second embodiment is an apparatus for extracting the digital information embedded by the digital information embedding apparatus 1a according to the first embodiment. In FIG. 8, the digital information extracting apparatus 1b comprises a band division portion 11, a mean difference subtraction portion 21, a block division portion 12, a quantization portion 13, and a digital information judgment portion 22.

The band division portion 11, the block division portion 12 and the quantization portion 13 in the digital information extracting apparatus 1b according to the second embodiment respectively have the same structures as the band division portion 11, the block division portion 12 and the quantization portion 13 in the digital information embedding apparatus 1a according to the first embodiment, and are assigned the same reference numerals and hence, the description thereof is not repeated.

The band division portion 11 receives an image signal 81. The image signal 81 includes, in addition to the image signal 72 outputted by the band synthesis portion 17 in the digital information embedding apparatus 1a according to the first embodiment, the quantization step-size Q used for linear quantization in the quantization portion 13 in the digital information embedding apparatus 1a, and the mean value LM of the transform coefficients in the LL3 signal which has been calculated in the mean calculation portion 16 in the digital information embedding apparatus 1a. The band division portion 11 subjects the inputted image signal 81 to discrete wavelet transform, to divide the image signal 81 into ten frequency bands, i.e., an LL3 signal, LHi signals, HLi signals and HHi signals, and calculate respective transform coefficients. The mean difference subtraction portion 21 calculates a mean value LM' of all the transform coefficients in the LL3 signal, and finds a difference DL between the mean value LM' and the above-mentioned given mean value LM (DL=LM=−LM). The mean difference subtraction portion 21 subtracts the difference DL from all the transform coefficients in the LL3 signal. The block division portion 12 divides the LL3 signal which has been subjected to the subtraction processing in the mean difference subtraction portion 21 into a plurality of blocks in accordance with a previously determined block size. The quantization portion 13 finds, for each of the plurality of blocks obtained by the division in the block division portion 12, a mean value M of the transform coefficients in the block. The quantization portion 13 subjects the found mean value M to linear quantization using the given quantization step-size Q, to calculate a quantization value q. The digital information judgment portion 22 judges whether each of the quantization values q calculated in the quantization portion 13 is even or odd, to judge the logical value of embedded digital information on the basis of the judgment.

Figure 9:
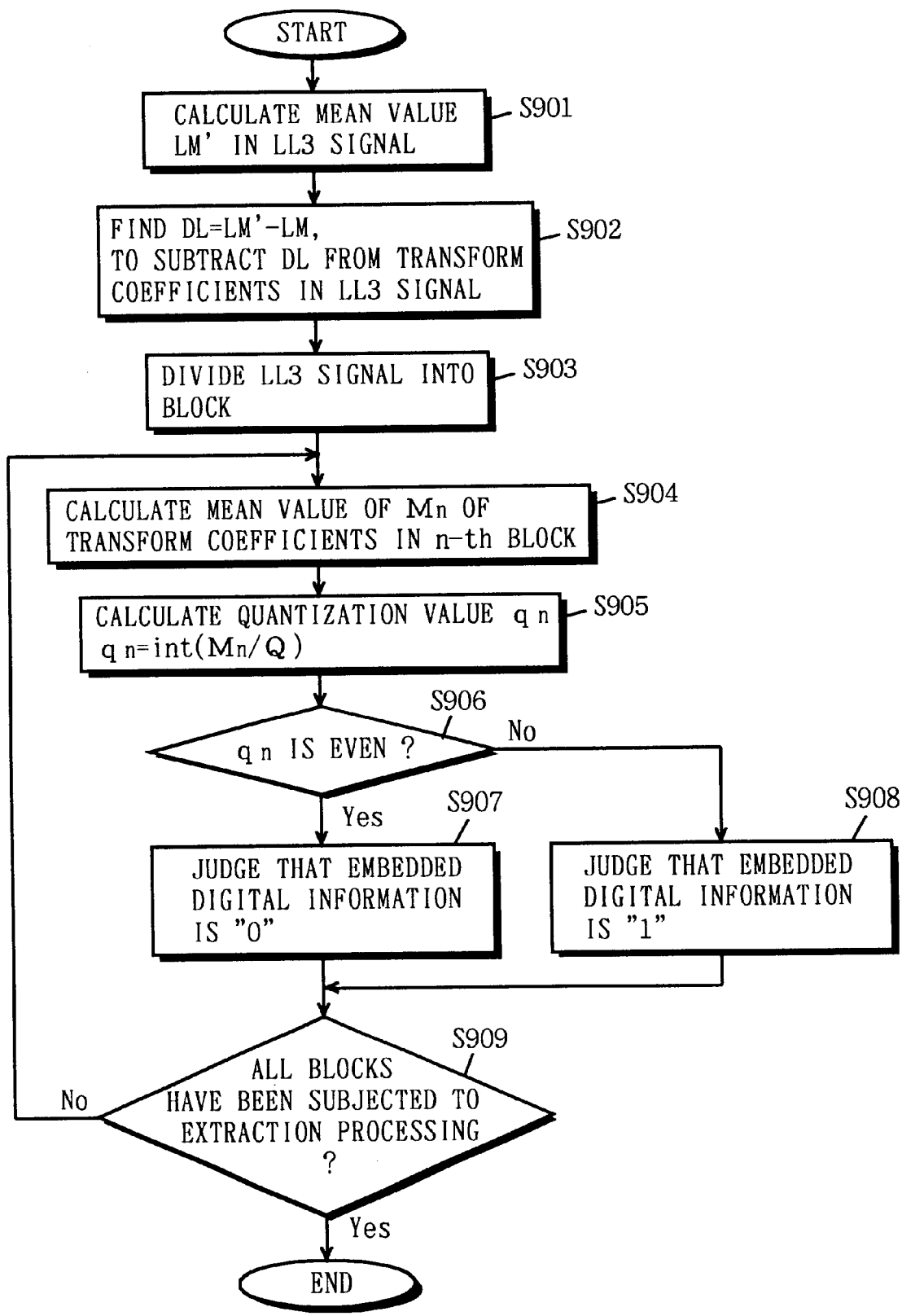
FIG. 9 is a flow chart showing processing performed in a mean difference subtraction portion 21, a block division portion 12, a quantization portion 13, and a digital information judgment portion 22 shown in FIG. 8.
Figure 10:
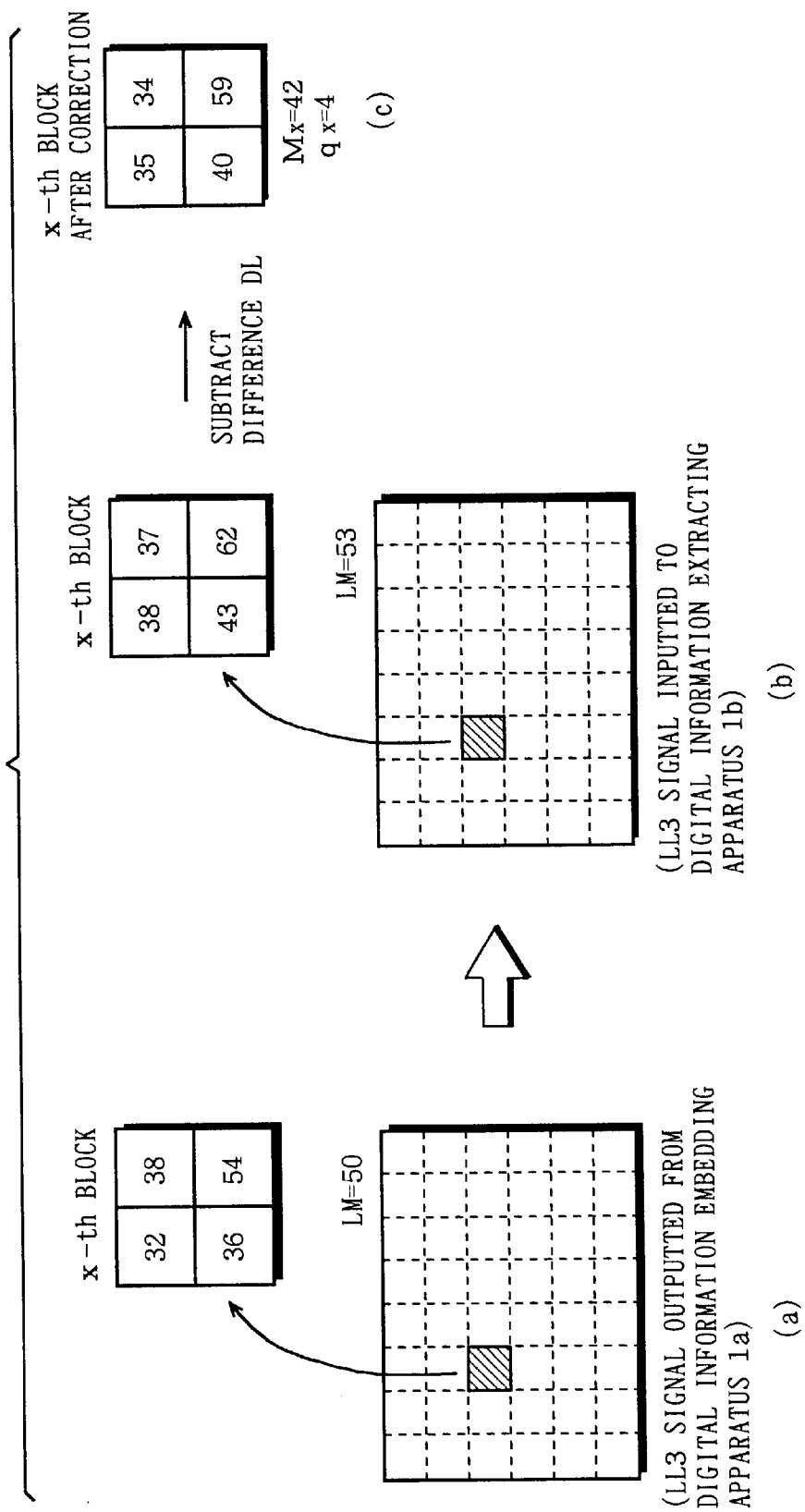
FIGS. 10(a) to 10(c) are diagrams showing an example in which digital information is extracted from the x-th block.

Referring now to FIGS. 9 and 10, description is made of a digital information extracting method carried out by the digital information extracting apparatus 1b. FIG. 9 is a flow chart showing processing performed in the mean difference subtraction portion 21, the block division portion 12, the quantization portion 13, and the digital information judgment portion 22. FIG. 10 is a diagram showing an example in which digital information is extracted from the x-th block. FIG. 10(*a*) illustrates transform coefficients in the x-th block in the LL3 signal outputted by the digital information embedding apparatus 1a (see FIG. 5(*b*)), and FIG. 10(*b*) illustrates transform coefficients in the x-th block in the LL3 signal inputted to the digital information extracting apparatus 1b. FIG. 10(*c*) illustrates transform coefficients in the x-th block which are obtained by correcting the transform coefficients shown in FIG. 10 (b) by the difference DL.

Referring to FIG. 9, the mean difference subtraction portion 21 first calculates a mean value LM' of the transform coefficients in the LL3 signal (step S901). The mean difference subtraction portion 21 finds a difference DL between the calculated mean value LM' and the given mean value LM, to subtract the difference DL from all the transform coefficients in the LL3 signal (step S902).

For example, in FIG. 10, the mean value of the transform coefficients in the LL3 signal is changed from LM=50 to LM'=53, so that the difference DL is as follows:

$$DL=LM'-LM=53-50=3$$

In order to subtract the difference DL=3 from each of the transform coefficients, the transform coefficients in the x-th block are changed from values shown in FIG. 10(*b*) to values shown in FIG. 10(*c*).

Referring to FIG. 9 again, the block division portion 12 divides the LL3 signal which has been subjected to the subtraction processing in the mean difference subtraction portion 21 into the first to N-th blocks in accordance with a previously determined block size (step S903). The quantization portion 13 calculates for each of the blocks a mean value Mn of the transform coefficients in the block (step S904), and subjects the mean value Mn to linear quantization using the given quantization step-size Q, to find a quantization value qn (step S905).

For example, in FIG. 10(c), a mean value Mx in the x-th block is as follows:

$$Mx=(35+34+40+59)/4=42$$

Consequently, a quantization value qx in the x-th block is as follows:

$$qx=int(Mx/Q)=int(42/10)=4$$

Referring to FIG. 9 again, the digital information judgment portion 22 judges whether the quantization value qn calculated at the foregoing step S905 is even or odd (step S906). When the quantization value qn is even in the judgment at the step S906, the digital information judgment portion 22 judges that the digital information embedded in a position, corresponding to the n-th block, of the image signal takes a logical value "0" (step S907). On the other hand, when the quantization value qn is odd in the judgment at the step S906, the digital information judgment portion 22 judges that the digital information embedded in the position, corresponding to the n-th block, of the image signal takes a logical value "1" (step S908).

For example, in FIG. 10(c), the quantization value qx in the x-th block is "4" (an even number), as described above, so that it is judged that the logical value of the embedded digital information is "0".

The digital information judgment portion 22 judges, in order to perform the above-mentioned digital information extraction processing (the foregoing steps S904 to S908) with respect to all the first to N-th blocks, whether or not all the blocks have been processed (step S909). When there exists the block which has not been processed yet, the program is returned to the foregoing step S904, to repeatedly perform the same processing.

The digital information judgment portion 22 thus performs the above-mentioned digital information extraction processing with respect to all the first to N-th blocks, to respectively extract the logical values embedded in the image signal, and reproduce the digital information as a bit stream.

To make sure, the difference DL is subtracted from each of the transform coefficients in the LL3 signal for the following reasons.

Referring to FIG. 10, when the difference DL is not subtracted irrespective of the fact that the image signal is changed (change from the mean value LM to the mean value LM') by an attack from the exterior, a block where a mean value Mx is calculated includes the transform coefficients in the block shown in FIG. 10(b). Consequently, the mean value Mx in this case is as follows:

$$Mx=(38+37+43+62)/4=45$$

A quantization value qx in the x-th block is odd as follows:

$$qx=int(Mx/Q)=int(45/10)=5$$

That is, the logical value, of the digital information, embedded in the x-th block may, in some cases, be erroneously judged to be "1".

Therefore, the digital information extracting apparatus 1b according to the second embodiment performs processing for subtracting the difference DL from each of the transform coefficients (correction) in order to extract a correct logical value more reliably.

In the digital information extracting apparatus 1b according to the second embodiment can perform, in a case where the transform coefficients in the inputted LL3 signal hardly vary, the digital information extraction processing without causing any problems even if the structure of the mean difference subtraction portion 21 (that is, the processing at the steps S901 and 902 in FIG. 9) is omitted.

As described in the foregoing, the digital information extracting apparatus 1b according to the second embodiment of the present invention judges the logical value of the embedded digital information by the results of extracting the transform coefficients which have been embedded in the lowest frequency band which is hardly affected by data destruction in high frequency bands, and calculating the quantization value of the mean value of the transform coefficients in each of the blocks in the lowest frequency band using a previously determined method. Consequently, accurate digital information can be extracted without being affected by an attack from an unauthorized user.

(Third Embodiment)

Figure 11:
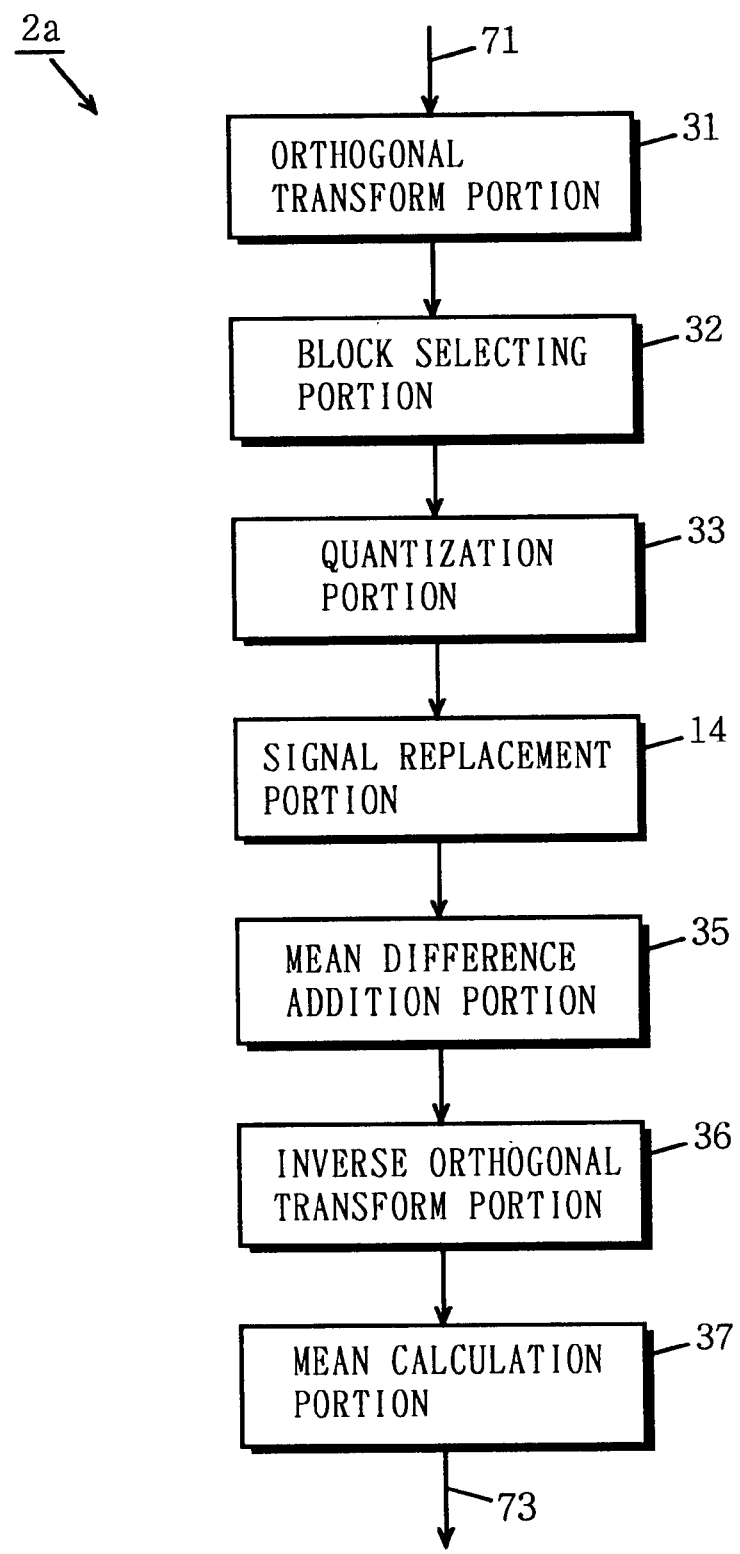
FIG. 11 is a block diagram showing the construction of a digital information embedding apparatus 2a according to a third embodiment of the present invention.

FIG. 11 is a block diagram showing the construction of a digital information embedding apparatus according to a third embodiment of the present invention. In FIG. 11, the digital information embedding apparatus 2a comprises an orthogonal transform portion 31, a block selection portion 32, a quantization portion 33, a signal replacement portion 14, a mean difference addition portion 35, an inverse orthogonal transform portion 36, and a mean calculation portion 37.

The signal replacement portion 14 in the digital information embedding apparatus 2a according to the third embodiment has the same structure as the signal replacement portion 14 in the digital information embedding apparatus 1a according to the first embodiment, and is assigned the same reference numeral and hence, the description thereof is not repeated.

The orthogonal transform portion 31 receives a digitized image signal 71, and divides the image signal 71 into a plurality of blocks in accordance with a previously determined block size. The orthogonal transform portion 31 subjects the signal to orthogonal transform for each of the plurality of blocks obtained by the division, to calculate transform coefficients in the block. The block selection portion 32 classifies the plurality of blocks obtained by the division in the orthogonal transform portion 31 into groups each comprising one or more blocks in accordance with a previously determined number of blocks. The quantization portion 33 finds, for each of the blocks belonging to each of the groups obtained by the classification in the block selection portion 32, the transform coefficient having the lowest frequency component (hereinafter referred to as a DC component) in the block and finds a mean value M of the DC components in the blocks. The quantization portion 33 subjects the found mean value M to linear quantization using a previously determined quantization step-size Q, to calculate a quantization value q. The signal replacement portion 14 respectively replaces the quantization values q found in the quantization portion 13 with a value (q+1) or a value (q−1) on the basis of the values, of digital information, to be embedded in the blocks. The mean difference addition portion 35 subjects the quantization values (q+1) obtained by the replacement in the signal replacement portion 14 to inverse linear quantization using the quantization step-size Q, to respectively find mean values M'. The mean difference addition portion 35 calculates for each of the groups a difference DM between the found mean value M' and the above-mentioned mean value M (DM=M'−M), and respectively adds the difference DM to all the DC components in the blocks in the group. The inverse orthogonal transform portion 36 subjects the respective blocks including the DC components which have been subjected to the addition processing in the mean difference addition portion 35 to inverse orthogonal transform, to construct an image signal 73. The mean calculation portion 37 calculates a mean value LM of the values of all pixels composing the image signal 73 reconstructed in the inverse orthogonal transform portion 36, to output the mean value LM, together with the image signal 73.

Figure 12:
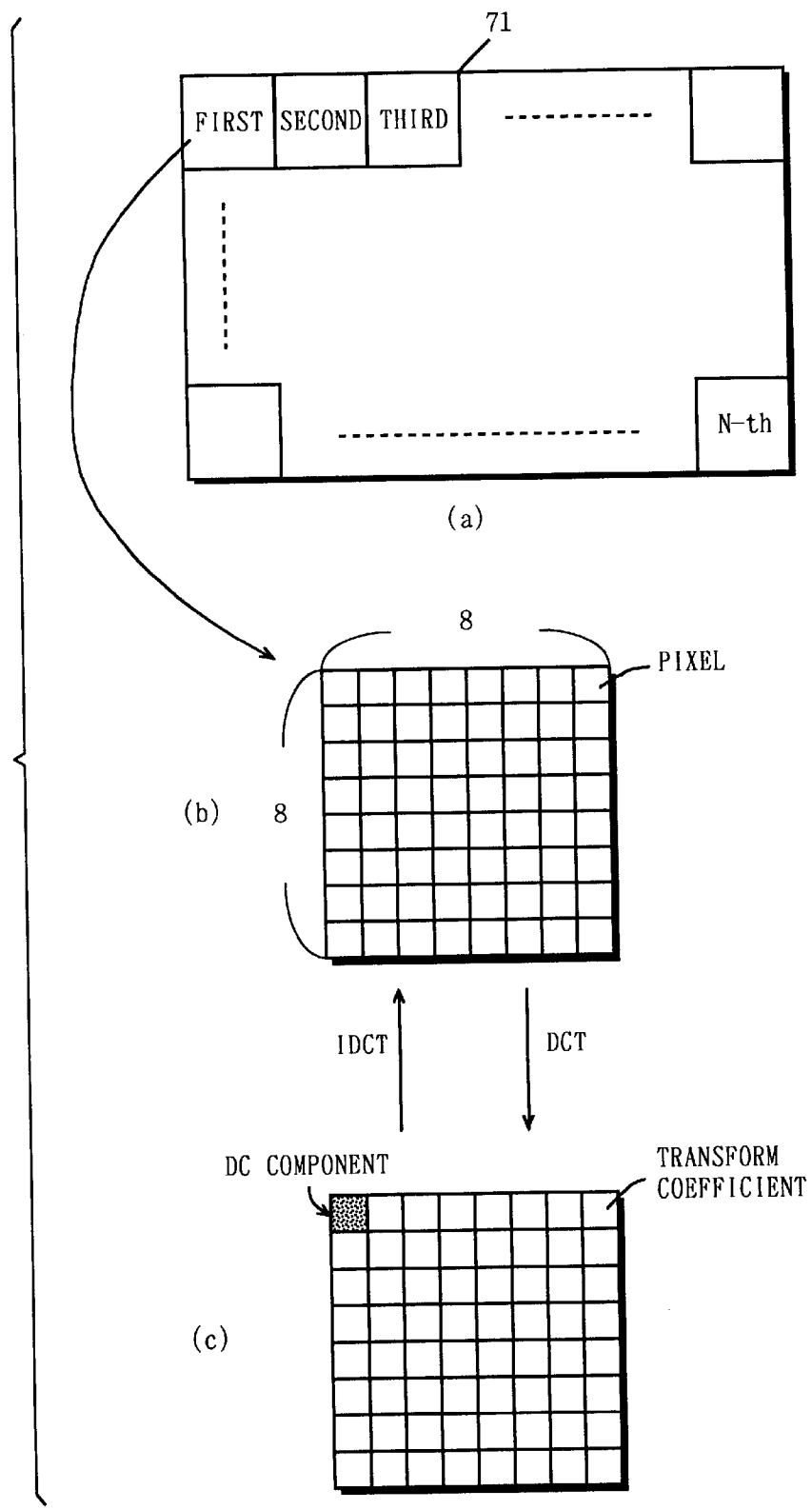
FIGS. 12(a) to 12(c) are diagrams showing an example of processing performed in an orthogonal transform portion 31 shown in FIG. 11.
Figure 13:
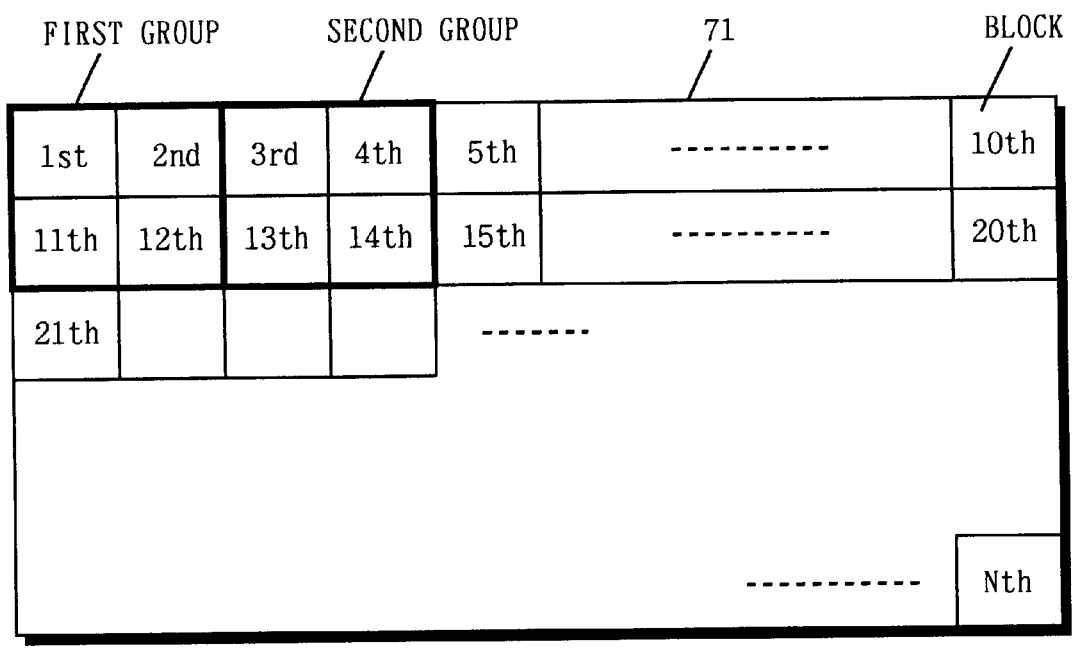
FIG. 13 is a diagram showing an example of processing performed in a block selection portion 32 shown in FIG. 11.
Figure 14:
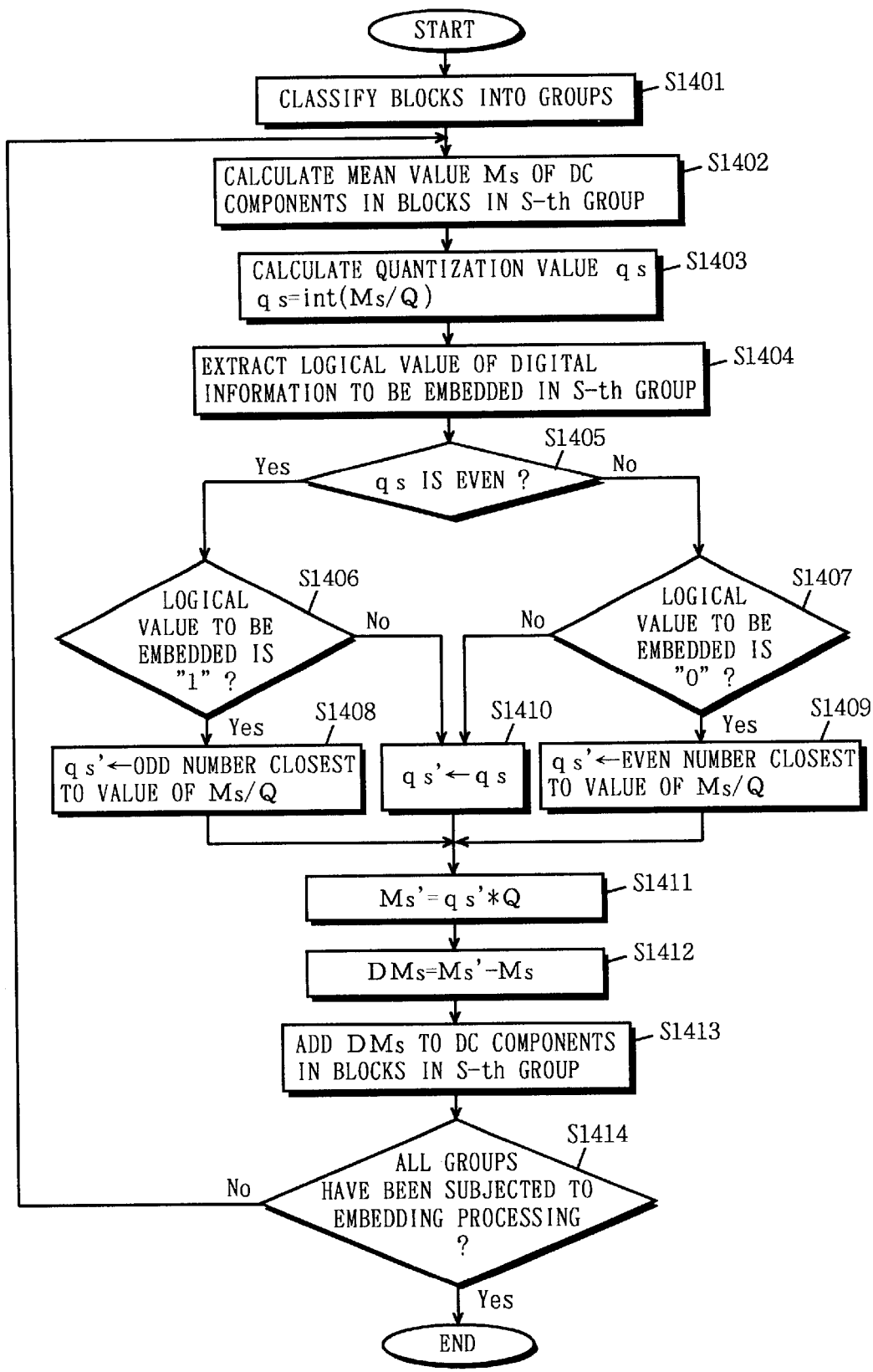
FIG. 14 is a flow chart showing processing performed in the block selection portion 32, a quantization portion 33, a signal replacement portion 14, and a mean difference addition portion 35 shown in FIG. 11.

Referring now to FIGS. 12 to 14, description is made of a digital information embedding method carried out by the digital information embedding apparatus 2a. FIG. 12 is a diagram showing an example of processing performed in the orthogonal transform portion 31. FIG. 13 is a diagram showing an example of processing performed in the block selection portion 32. FIG. 14 is a flow chart showing processing performed in the block selection portion 32, the quantization portion 33, the signal replacement portion 14, and the mean difference addition portion 35.

Referring to FIG. 12, the orthogonal transform portion 31 receives the digitized image signal 71, and divides the image signal 71 into the first to N-th blocks in accordance with a previously determined block size (see FIG. 1(a)). The orthogonal transform portion 31 subjects the signal in each of the first to N-th blocks obtained by the division to orthogonal transform, to calculate transform coefficients of the same block size.

FIG. 12 illustrates a case where the image signal 71 is divided into a plurality of blocks each composed of pixels of a 8×8 size, and each of the blocks is subjected to orthogonal transform by discrete cosine transform (DCT) (see FIGS. 12(b) and 12(c)). Out of the transform coefficients obtained by the orthogonal transform shown in FIG. 12(c), the transform coefficient at the upper left (a portion painted in block in FIG. 12(c)) is a DC component, which represents a mean value of the values of all the pixels composing the block shown in FIG. 12(b).

Referring to FIG. 14, the block selection portion 32 classifies the first to N-th blocks obtained by the division in the orthogonal transform portion 31 into the first to S-th (S is an integer satisfying 2≦S≦N; the same is true for the following) groups each comprising one or more blocks in accordance with a previously determined number of blocks (step S1401). The number of groups S obtained by the classification may be not less than the number of logical values, of the digital information, to be embedded.

For example, in FIG. 13, the classification is made by taking the four blocks, i.e., the first block, the second block, the eleventh block and the twelfth block as one group.

The block size of the group obtained by the classification may be an arbitrary size other than the 2×2 size illustrated in FIG. 13. The shape of the group need not be a square such as a regular square or a rectangle, and may be another shape (for example, a triangle or a rhombus). Further, the blocks in the group need not necessarily be adjacent to each other, and the blocks which are not adjacent to each other may be selected and grouped.

Referring to FIG. 14 again, the quantization portion 33 then extracts only the respective DC components in the plurality of blocks in the S-th (s=1 to S; the same is true for the following) group, and calculates their mean value Ms (step S1402). At the foregoing step S1401, when the block size of the group obtained by the classification is taken as a 1×1 size, processing for calculating a mean value need not be performed. Further, the quantization portion 33 subjects the mean value Ms to linear quantization using a previously determined quantization step-size Q (Q is an integer of not less than one), to calculate a quantization value qs(step S1403). The signal replacement portion 14 extracts the logical value, of digital information, to be embedded in the s-th group, and finds a quantization value qs', as described in the first embodiment (steps S1404 to S1410). The mean difference addition portion 35 performs inverse linear quantization using the quantization value qs' found in any one of the foregoing steps S1408 to S1410 and the quantization step-size Q, to calculate a mean value Ms' (=qs'*Q) (step S1411). The mean difference addition portion 35 finds a difference DMs between the calculated mean value Ms' and the mean value Ms found at the foregoing step S1402 (DMs=Ms'−Ms) (step S1412). Further, the mean difference addition portion 35 adds the difference DMs to the respective DC components in all the blocks in the s-th group (step S1413).

The block selection portion 32, the quantization portion 33, the signal replacement portion 14, and the mean difference addition portion 35 judge, in order to subject all the blocks in the first to S-th groups to the above-mentioned digital information embedding processing (the foregoing steps S1402 to S1413), whether or not all the groups have been processed (step S1414). When there exists the group which has not been processed yet, the program is returned to the foregoing step S1402, to repeatedly perform the same processing.

When the digital information embedding processing is terminated, the inverse orthogonal transform portion 36 subjects the plurality of blocks including the respective DC components which have been subjected to the addition processing in the mean difference addition portion 35 to inverse orthogonal transform, to reconstruct an image signal 73.

Thereafter, the mean calculation portion 37 calculates a mean value LM of the values of all the pixels composing the image signal 73 reconstructed in the inverse orthogonal transform portion 36, to output the mean value LM, together with the reconstructed image signal 73 and the above-mentioned quantization step-size Q. The mean value LM has the same function as that described in the first embodiment.

As described in the foregoing, the digital information embedding apparatus 2a according to the third embodiment embeds the digital information into the respective transform coefficients having the lowest frequency components (DC components). Consequently, it is possible to prevent the embedded digital information from being lost against an attack for unauthorized utilization from a third person.

The digital information embedding apparatus 2a according to the third embodiment replaces the quantization value qs with either one of an odd value and an even value which are closest to the value of Ms/Q on the basis of the logical value of the digital information. Consequently, it is possible to reduce the effect on the degradation of the image at the time of extracting the embedded digital information, and it is difficult for the third person to detect the embedded digital information.

The orthogonal transform performed in the orthogonal transform portion 31 in the digital information embedding apparatus 2a according to the third embodiment is not limited to the above-mentioned discrete cosine transform. For example, it may be Furrier transform or Hadamard transform.

In the digital information embedding apparatus 2a according to the third embodiment, the mean calculation portion 37 is constructed in a stage succeeding the inverse orthogonal transform portion 36, to calculate the mean value LM of the values of all the pixels composing the image signal 73. However, the DC component out of the transform coefficients obtained by the orthogonal transform represents the mean value of the values of all the pixels composing the image signal, as described above (see FIG. 12). Consequently, the mean calculation portion 37 may be constructed between the mean difference addition portion 35 and the inverse orthogonal transform portion 36, to calculate a mean value of the respective DC components in the blocks.

(Fourth Embodiment)

Figure 15:
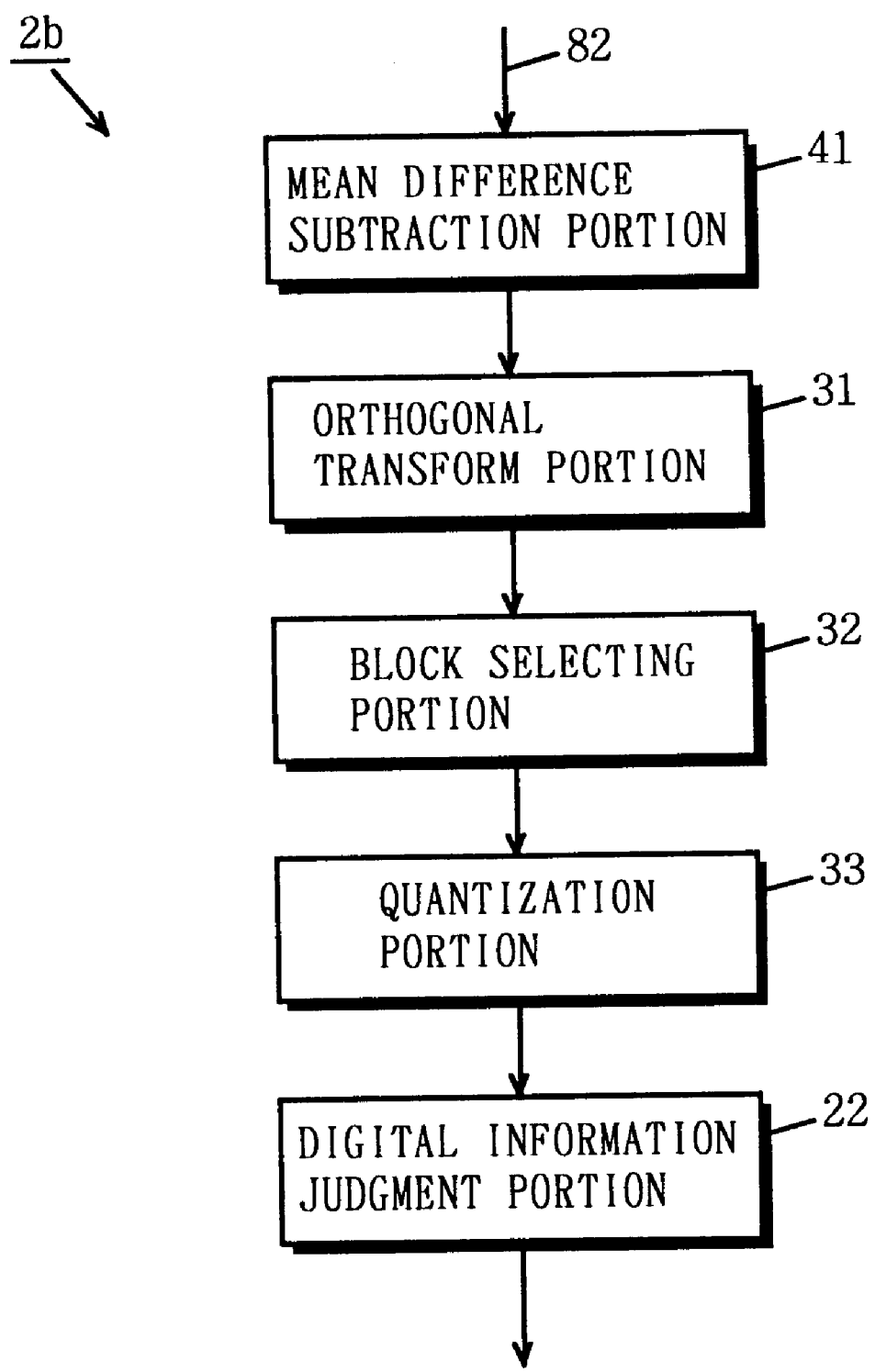
FIG. 15 is a block diagram showing the construction of a digital information extracting apparatus 2b according to a fourth embodiment of the present invention.

FIG. 15 is a block diagram showing the construction of a digital information extracting apparatus according to a fourth embodiment of the present invention. The digital information extracting apparatus 2b according to the fourth embodiment is an apparatus for extracting the digital information embedded by the digital information embedding apparatus 2a according to the third embodiment. In FIG. 15, the digital information extracting apparatus 2b comprises a mean difference subtraction portion 41, an orthogonal transform portion 31, a block selection portion 32, a quantization portion 33, and a digital information judgment portion 22.

The orthogonal transform portion 31, the block selection portion 32 and the quantization portion 33 in the digital information extracting apparatus 2b according to the fourth embodiment have the same structures as the orthogonal transform portion 31, the block selection portion 32 and the quantization portion 33 in the digital information embedding apparatus 2a according to the third embodiment, and are assigned the same reference numerals and hence, the description thereof is not repeated. The digital information judgment portion 22 has the same structure as the digital information judgment portion 22 in the digital information extracting apparatus 1b according to the second embodiment, and is also assigned the same reference numeral and hence, the description thereof is not repeated.

The mean difference subtraction portion 41 receives an image signal 82. The image signal 82 includes, in addition to the image signal 73 outputted by the inverse orthogonal transform portion 36 in the digital information embedding apparatus 2a according to the third embodiment, the quantization step-size Q used for linear quantization in the quantization portion 33 in the digital information embedding apparatus 2a, and the mean value LM of the values of all the pixels composing the image signal 73 which has been calculated in the mean calculation portion 37 in the digital information embedding apparatus 2a. The mean difference subtraction portion 41 calculates a mean value LM' of the values of all pixels composing the inputted image signal 82, to find a difference DL between the mean value LM' and the given mean value LM (DL=LM'−LM). The mean difference subtraction portion 41 subtracts the difference DL from the values of all the pixels composing the image signal 82. The orthogonal transform portion 31 divides the image signal 82 which has been subjected to the subtraction processing in the mean difference subtraction portion 41 into a plurality of blocks in accordance with a previously determined block size, and then subjects the signal in each of the blocks, to calculate transform coefficients in the block. The block selection portion 32 classifies the plurality of blocks obtained by the division in the orthogonal transform portion 31 into groups each comprising one or more blocks in accordance with a previously determined number of blocks. The quantization portion 33 finds, for each of the groups obtained by the classification in the block selection portion 32, a mean value M of respective DC components in the blocks in the group. The quantization portion 33 subjects the found mean value M to linear quantization using the previously determined quantization step-size Q, to calculate a quantization value q. The digital information judgment portion 22 judges whether each of the quantization values q calculated in the quantization portion 33 is even or odd, to judge the logical value of the embedded digital information on the basis of the judgment.

Figure 16:
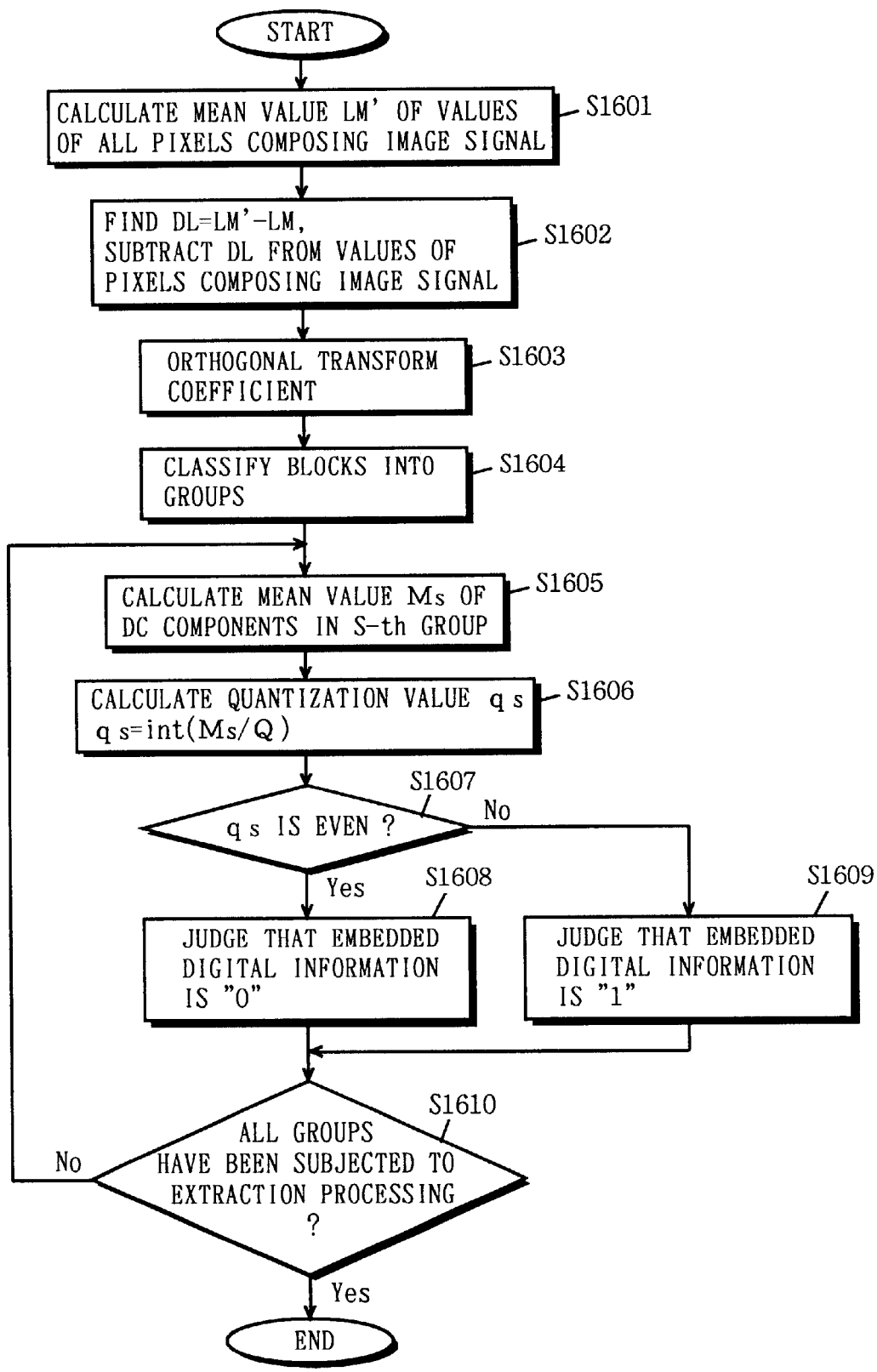
FIG. 16 is a flow chart showing processing performed in the digital information extracting apparatus 2b shown in FIG. 15.

Referring now to FIG. 16, description is made of a digital information extracting method carried out by the digital information extracting apparatus 2b. FIG. 16 is a flow chart showing processing performed by the digital information extracting apparatus 2b.

The mean difference subtraction portion 41 calculates a mean value LM' of the values of all the pixels composing the image signal 82 (step S1601). The mean difference subtraction portion 41 finds a difference DL between the calculated mean value LM' and the given mean value LM, and subtracts the difference DL from the values of all the pixels composing the image signal 82 (step S1602). The orthogonal transform portion 31 divides the image signal 82 which has been subjected to the subtraction processing in the mean difference subtraction portion 41 into the first to N-th blocks in accordance with a previously determined block size, and then subjects the signal in each of the blocks to orthogonal transform, to calculate transform coefficients in the block (step S1603). The block selection portion 32 classifies the first to N-th blocks obtained by the division in the orthogonal transform portion 31 into the first to S-th groups each comprising one or more blocks in accordance with a previously determined number of blocks (step S1604). The quantization portion 33 calculates for each of the groups, a mean value Mn of the respective DC components in the blocks included in the group (step S1605), and subjects the mean value Mn to linear quantization using the given quantization step-size Q, to find a quantization value qn (step S1606). The digital information judgment portion 22 performs the judgment processing described in the above-mentioned second embodiment, to judge all logical values, of the digital information, embedded in positions, corresponding to the groups, of the image signal (steps S1607 to S1609). The digital information judgment portion 22 judges whether all the groups have been processed (step S1610). When there exists the group which has not been processed yet, the program is returned to the foregoing step S1604, to repeatedly perform the same processing.

The digital information judgment portion 22 thus performs the above-mentioned digital information extraction processing with respect to all the first to S-th groups, to respectively extract the logical values embedded in the image signal, and reproduce the digital information as a bit stream.

As described in the foregoing, the digital information extracting apparatus 2b according to the fourth embodiment judges the logical values of the embedded digital information by the results of exacting the DC component which has been embedded in the lowest frequency band which is hardly affected by data destruction in high frequency bands, and calculating the quantization value of the mean value of the DC components in the plurality of blocks using a previously determined method. Consequently, accurate digital information can be extracted without being affected by an attack from an unauthorized user.

The digital information extracting apparatus 2b according to the fourth embodiment can also perform, in a case where the values of the pixels composing the inputted image signal 82 hardly vary, the digital information extracting processing without causing any problems even if the structure of the mean difference subtraction portion 41 (that is, the processing at the steps S1601 and S1602) is omitted, similarly to the above-mentioned digital information extracting apparatus 1b according to the second embodiment.

In contrast with the digital information embedding apparatus in which the mean calculation portion 37 is constructed between the mean difference addition portion 35 and the inverse orthogonal transform portion 36, as described in the above-mentioned third embodiment, the digital information extracting apparatus 2b according the fourth embodiment is so constructed that the mean difference subtraction portion 41 and the orthogonal transform portion 31 are replaced with each other.

(Fifth Embodiment)

Figure 17:
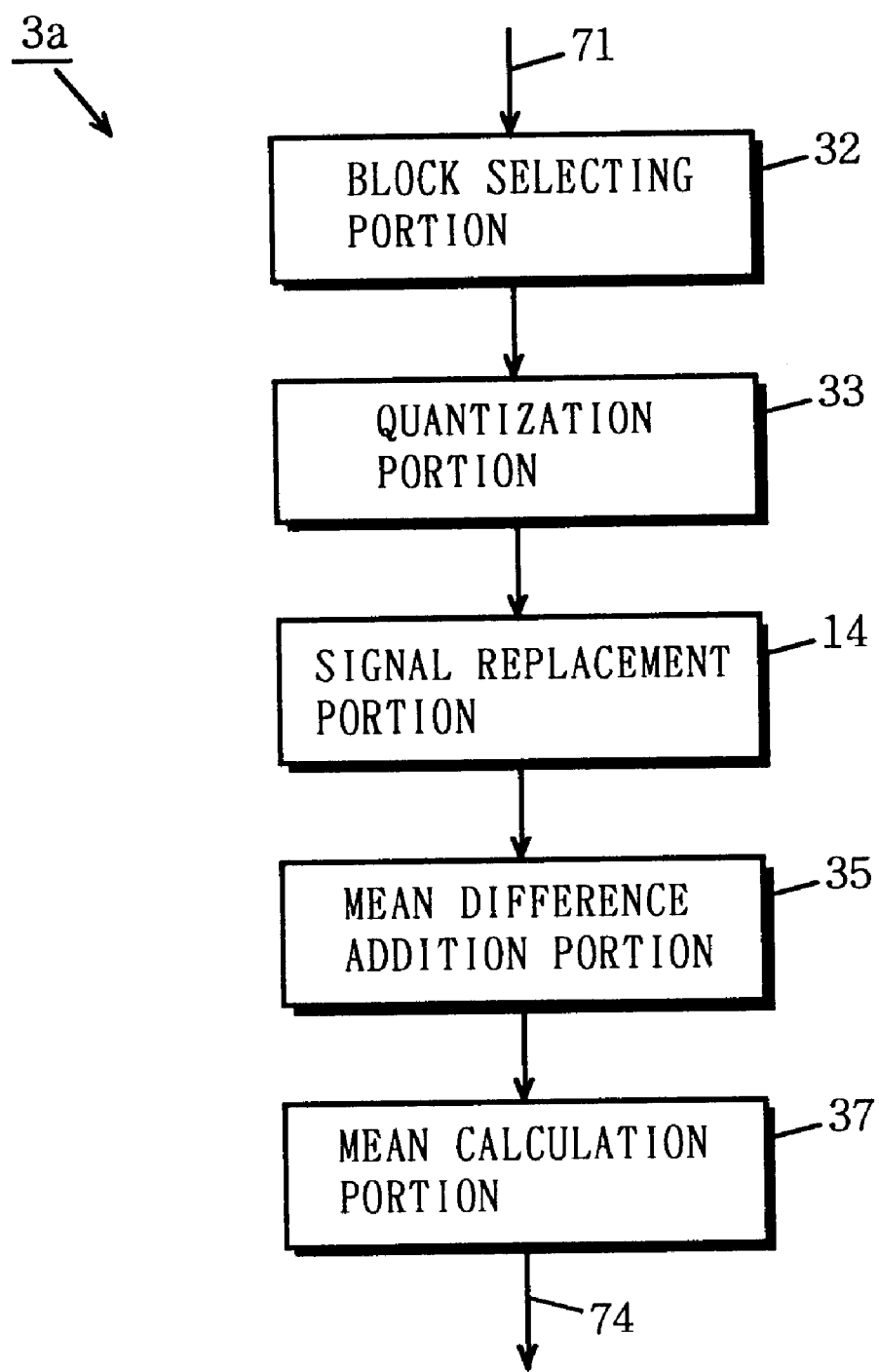
FIG. 17 is a block diagram showing the construction of a digital information embedding apparatus 3a according to a fifth embodiment of the present invention.

FIG. 17 is a block diagram showing the construction of a digital information embedding apparatus 3a according to a fifth embodiment of the present invention. In FIG. 17, the digital information embedding apparatus 3a comprises a block selection portion 32, a quantization portion 33, a signal replacement portion 14, a mean difference addition portion 35, and a mean calculation portion 37.

As shown in FIG. 17, the digital information embedding apparatus 3a according the fifth embodiment is constructed so that the orthogonal transform portion 31 and the inverse orthogonal transform portion 36 in the above-mentioned digital information embedding apparatus 2a according to the third embodiment are omitted.

The digital information embedding apparatus 3a according to the fifth embodiment can perform the same embedding processing as that in the third embodiment even when an image signal 71 is not subjected to orthogonal transform processing.

Processing performed by the digital information embedding apparatus 3a will be briefly described.

The block selection portion 32 receives a digitized image signal 71, and divides the image signal 71 into a plurality of blocks in accordance with a previously determined block size, and then further classifies the blocks obtained by the division into groups each comprising one or more blocks in accordance with a previously determined number of blocks. The quantization portion 33 calculates, for each of the groups obtained by the classification in the block selection portion 32, a mean value M of the values of pixels composing each of the blocks in the group. The quantization portion 33 subjects the found mean value M to linear quantization using a previously determined quantization step-size Q, to calculate a quantization value qs. The signal replacement portion 14 replaces the quantization value q found in the quantization portion 13 with a value (q+1) or a value (q−1) on the basis of the values, of the digital information, to be embedded in the blocks. The mean difference addition portion 35 subjects the quantization values (q±1) obtained by the replacement in the signal replacement portion 14 to inverse linear quantization using the quantization step-size Q, to respectively find mean values Ms'. The mean difference addition portion 35 calculates for each of the groups a difference DMs between the found mean value Ms' and the above-mentioned mean value Ms (DM=M'−M), and adds the difference DM to the values of all the pixels composing the blocks in the group, to output an image signal 74 which has been subjected to the embedding processing The mean calculation portion 37 calculates a mean value LM of the values of all the pixels composing the image signal 74.

As described in the foregoing, the digital information embedding apparatus 3a according to the fifth embodiment can also perform the digital information embedding processing described in the above-mentioned third embodiment with respect to the blocks where the inputted image signal is not subjected to discrete cosine transform, Fourier transform or Hadamard transform.

(Sixth Embodiment)

Figure 18:
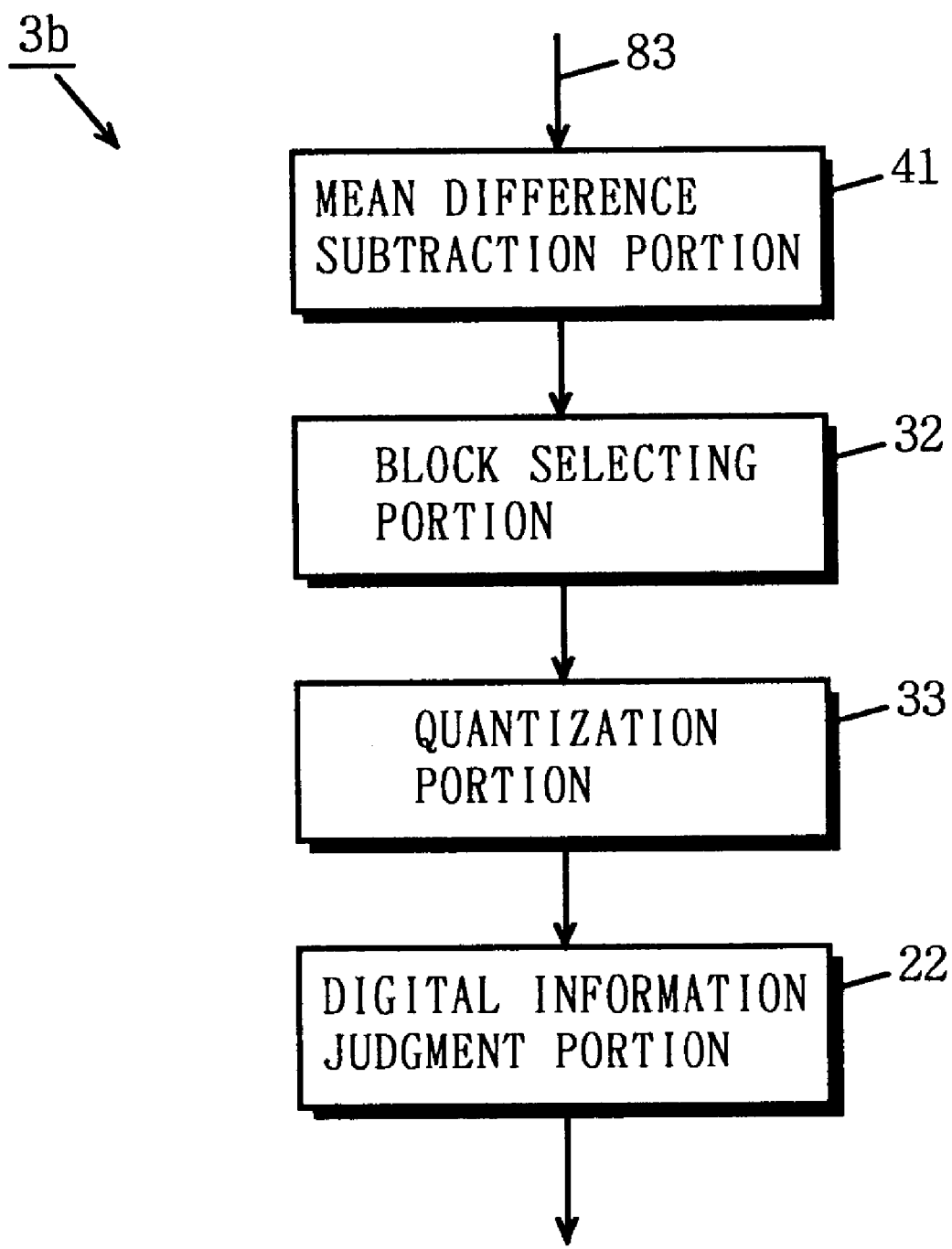
FIG. 18 is a block diagram showing the construction of a digital information extracting apparatus 3b according to a sixth embodiment of the present invention.

FIG. 18 is a block diagram showing the construction of a digital information extracting apparatus 3b according to a sixth embodiment of the present invention. In FIG. 18, the digital information extracting apparatus 3b comprises a mean difference subtraction portion 41, a block selection portion 32, a quantization portion 33, and a digital information judgement portion 22.

As shown in FIG. 18, the digital information extracting apparatus 3b according to the sixth embodiment is so constructed that the orthogonal transform portion 31 in the above-mentioned digital information extracting apparatus 2b according to the fourth embodiment is omitted.

The digital information extracting apparatus 3b according to the sixth embodiment is an apparatus for extracting the digital information embedded by the digital information embedding apparatus 3a according to the fifth embodiment.

Processing performed by the digital information extracting apparatus 3b will be briefly described.

The mean difference subtraction portion 41 receives an image signal 83. The image signal 83 includes, in addition to the image signal 74 outputted by the mean difference addition portion 35 in the digital information embedding apparatus 3a according to the fifth embodiment, the quantization step-size Q used for linear quantization in the quantization portion 33 in the digital information embedding apparatus 3a, and the mean value LM of the values of all the pixels composing the image signal 74 which is calculated in the mean calculation portion 37 in the digital information embedding apparatus 3a. The mean difference subtraction portion 41 calculates a mean value LM' of the values of all pixels composing the inputted image signal 83, to find a difference DL between the mean value LM' and the given mean value LM (DL=LM'−LM). The mean difference subtraction portion 41 subtracts the difference DL from the values of all the pixels composing the image signal 83. The block selection portion 32 classifies the image signal 83 which has been subjected to the subtraction processing in the mean difference subtraction portion 41 into a plurality of blocks in accordance with a previously determined block size, and then classifies the blocks into groups each comprising one or two or more blocks in accordance with a previously determined number of blocks. The quantization portion 33 finds, for each of the groups obtained by the classification in the block selection portion 32, a mean value M of the values of the pixels composing each of the blocks in the group. The quantization portion 33 subjects the found mean value M to linear quantization using a previously determined quantization step-size Q, to calculate a quantization value q. The digital information judgment portion 22 judges whether each of the quantization value qs which are calculated in the quantization portion 33 is even or odd, and judges the logical value of the embedded digital information on the basis of the judgment.

By the above-mentioned construction, the digital information extracting apparatus 3b according to the sixth embodiment can accurately extract the embedded digital information, as described in the fourth embodiment, even when the digital information embedding processing described in the above-mentioned third embodiment has been performed with respect to the block where the inputted image signal is not subjected to discrete cosine transform, Fourier transform or Hadamard transform.

(Seventh Embodiment)

Figure 19:
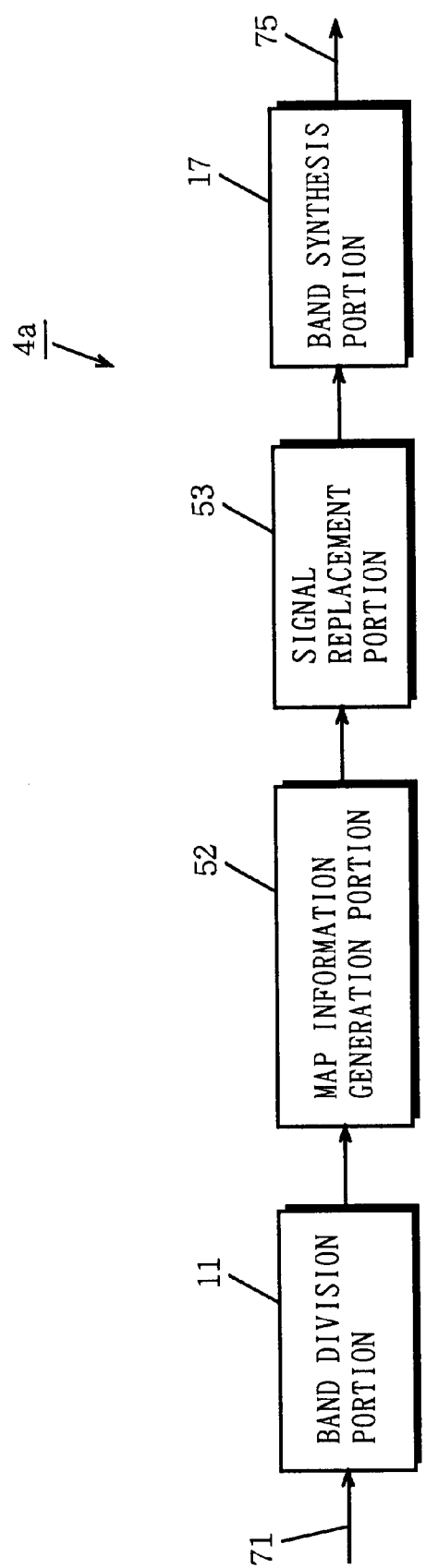
FIG. 19 is a block diagram showing the construction of a digital information embedding apparatus 4a according to a seventh embodiment of the present invention.

FIG. 19 is a block diagram showing the construction of a digital information embedding apparatus according to a seventh embodiment of the present invention. In FIG. 19, the digital information embedding apparatus 4a comprises a band division portion 11, a map information generation portion 52, a signal replacement portion 53, and a band synthesis portion 17.

The band division portion 11 and the band synthesis portion 17 in the digital information embedding apparatus 4a according to the seventh embodiment respectively have the same structures as the band dividing device 11 described in the above-mentioned prior art and the band synthesis portion 17 in the digital information embedding apparatus 1a according to the first embodiment, and are assigned the same reference numerals and hence, the description thereof is not repeated.

The band division portion 11 receives a digitized image signal 71, and divides the image signal 71 into 10 frequency bands, i.e., an LL3 signal, LHi signals, HLi signals and HHi signals by discrete wavelet transform, to calculate respective transform coefficients. The map information generation portion 52 generates, with respect to a third hierarchical signal (excluding the LL3 signal) obtained by the division in the band division portion 11, map information indicating whether the absolute amplitude values of all the transform coefficients in the same space representation region in the same direction of division which correspond to one arbitrary data in the signal are not more than a previously determined set value R. The same space representation region in the same direction of division means a region comprised of signals in the same direction of band division in the band division portion 11, i.e., a region comprised of the LH3 signal, the LH2 signal and the LH1 signal, or a region comprised of the HL3 signal, the HL2 signal and the HL1 signal, a region comprised of the HH3 signal, the HH2 signal and the HH1 signal. The signal replacement portion 53 refers to each of the values of the map information generated in the map information generation portion 52, to replace, when the value is not more than the previously determined set value R, the transform coefficients with other numerical values in accordance with the digital information to be embedded. The band synthesis portion 17 synthesizes band component signals in a plurality of frequency bands which have been subjected to the embedding processing (i.e., the replacement of the transform coefficients) in the signal replacement portion 53, to reconstruct an image signal 75.

Figure 20:
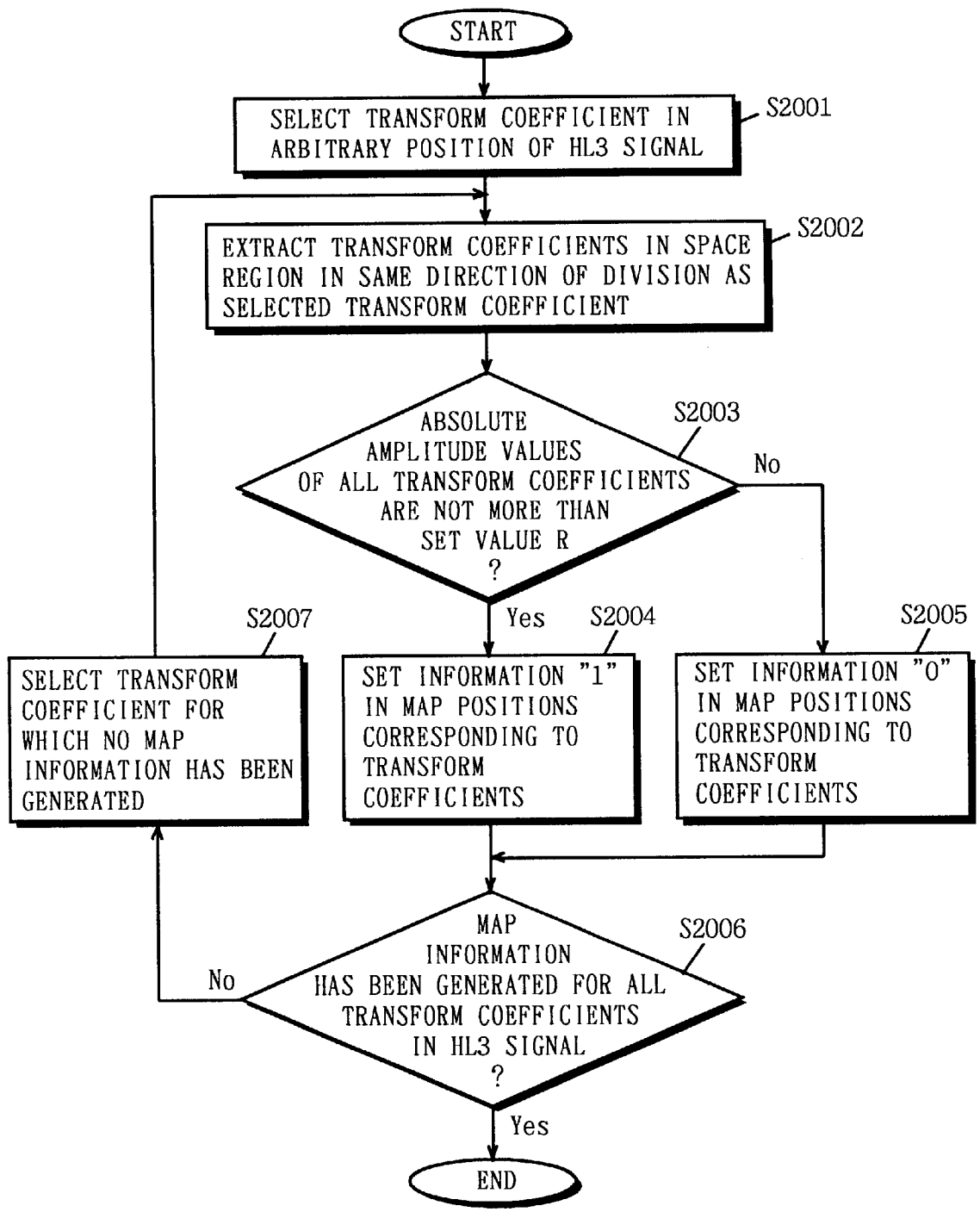
FIG. 20 is a flow chart showing processing performed in a map information generation portion 52 shown in FIG. 19.
Figure 22:
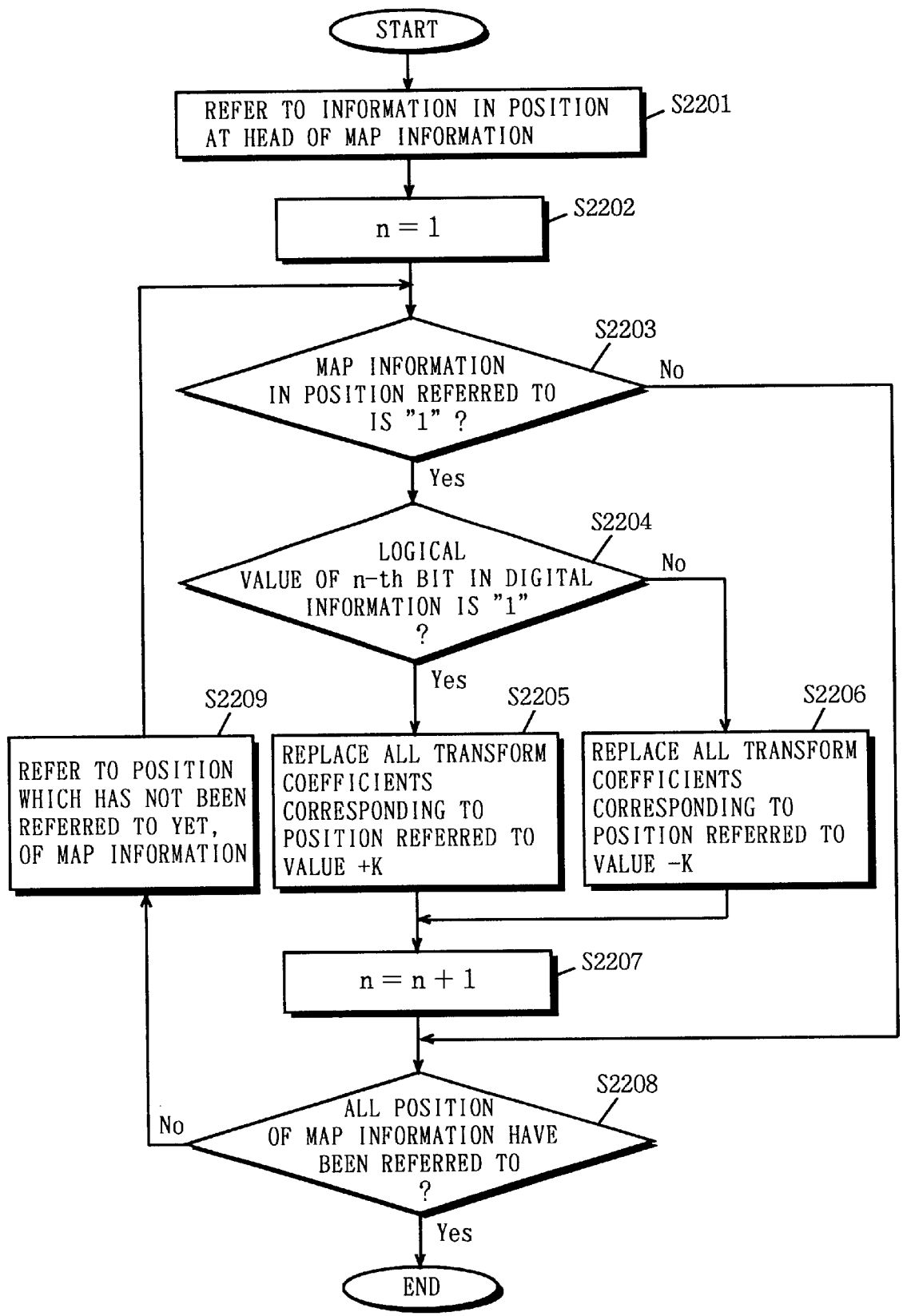
FIG. 22 is a flow chart showing processing performed in a signal replacement portion 53 shown in FIG. 19.

Referring to FIGS. 20 to 22, description is made of a method of embedding digital information carried out by the digital information embedding apparatus 4a.

FIG. 20 is a flow chart showing processing performed in the map information generation portion 52. FIG. 20 shows as an example a case where map information relating to the HL3 signal which is high in its horizontal component and is low in its vertical component is generated. FIG. 21 is a diagram for explaining the generation of the map information. FIG. 22 is a flow chart showing processing performed in the signal replacement portion 53.

Description is now made of processing performed in the map information generation portion 52.

Referring to FIG. 20, the map information generation portion 52 selects one transform coefficient in an arbitrary position of the HL3 signal on the basis of an output of the band division portion 11 (step S2001). Transform coefficients in the same space representation region in the same direction of division as the selected transform coefficient in the HL3 signal are extracted (step S2002). The transform coefficients in the same space representation region in the same direction of division with respect to the HL3 signal are a total of 21 transform coefficients, i.e., one transform coefficient in the HL3 signal, four transform coefficients in the HL2 signal, and 16 transform coefficients in the HL1 signal (portions painted in black in FIG. 21(a)). It is judged whether the absolute amplitude value of each of the 21 transform coefficients is not more than a previously determined set value R (step 2003). The set value R can be arbitrarily determined depending on the length of the digital formation to be embedded, for example. When it is judged at the step S2003 that the absolute amplitude values of all the 21 transform coefficients are not more than the set value R, information "1" is set in map positions corresponding to the positions of the transform coefficients (step S2004). On the other hand, when it is not judged at the step S2003 that the absolute amplitude values of all the 21 transform coefficients are not more than the set value R, information "0" is set in the map positions corresponding to the positions of the transform coefficients (step S2005).

Thereafter, it is judged whether map information has been generated for all the transform coefficients in the HL3 signal. When there exists the transform coefficient for which no map information has been generated, the transform coefficient is selected, after which the program is returned to the foregoing step S2002, to repeatedly perform the same processing (steps S2006 and S2007).

The map information generation portion 52 performs the above-mentioned processing with respect to all the transform coefficient in the HL3 signal and the transform coefficients in the HL2 signal and the HL1 signal in the same space representation region in the same direction of division as the transform coefficient in the HL3 signal, to generate map information of a size corresponding to the transform coefficient in the HL3 signal (see FIG. 21(b)).

Description is now made of processing performed in the signal replacement portion 53.

Referring to FIG. 22, the signal replacement portion 53 refers to information representing a position at the head of the map information generated by the map information generation portion 52 (the position at the head can be arbitrarily determined) (step S2201). A counter n representing the position of a bit, in the digital information, to be embedded (n takes a value in a range from one to the final bit in the digital information) is taken as one (step S2202). The digital information shall be a bit stream obtained by binary-coding the name of a copyright owner, the date for generation, and so fourth. It is judged whether the map information in a position referred to is "1" (step S2203). When the map information is "1" in the judgment at the step S2203, it is further judged whether the logical value of the n-th bit, in the digital information, to be embedded in the position is "1" (step S2204). When the logical value of the n-th bit is "1" in the judgment at the step S2204, all the 21 transform coefficients in the same space representation region in the same direction of division with respect to the HL3 signal which correspond to the above-mentioned position referred to are replaced with a value+K (plus K) (step S2205). Contrary to this, when the logical value of the n-th bit is "0" in the judgment at the step S2204, all the 21 transform coefficients in the same space representation region in the same direction of division with respect to the HL3 signal which correspond to the above-mentioned position referred to are replaced with a value−K (minus K) (step S2206). It is preferable that the absolute value of the value K is not more than the set value R in order to minimize the degradation of the image after the replacement processing of the transform coefficients. After the replacement processing is terminated with respect to the n-th bit, one is added to n in order to proceed to the subsequent bit in the digital information (step S2207). On the other hand, when the map information is "0" in the judgment at the step S2203, the replacement processing of the transform coefficients is not performed.

Thereafter, it is judged whether all positions of the map information have been referred to. When there exists the position, which has not been referred to yet, of the map information, the position is referred to, after which the program is returned to the foregoing step S2203, to repeatedly perform the same processing (steps S2208 and S2209).

The signal replacement portion 53 performs the above-mentioned processing with respect to all the positions of the map information, and replaces only the transform coefficients in the positions in which the digital information is to be embedded out of the transform coefficients in the HL3 signal, the HL2 signal and the HL1 signal with the value+K or the value−K.

The number of bits composing the digital information to be embedded and the number of positions where the map information is "1" do not necessarily coincide with each other. Contrary to this, when the number of bits composing the digital information is smaller than the number of positions where the map information is "1", methods such as a method of embedding all bits composing the digital information, and then continuously embedding the bits, starting with the first bit, and a method of embedding a bit "0 (or 1)" in all the remaining positions where the map information is "1" are considered. When the number of bits composing the digital information is larger than the number of positions where the map information is "1", methods such as a method of ensuring positions, where the map information is "1", corresponding to the number of bits composing the digital information by increasing the set value R and a method of continuously embedding bits which cannot be embedded in the region comprised of the HL signals in the region comprised of the LH signals are considered.

As described in the foregoing, the digital information embedding apparatus 4a according to the seventh embodiment embeds the digital information in low frequency band signals over a plurality of hierarchies. Consequently, it is possible to prevent the embedded digital information from being lost against an attack for unauthorized utilization from a third person. Further, the transform coefficients whose absolute amplitude values are not more than the set value R are replaced with the values±K which are set to not more than the set value R. Consequently, it is possible to reduce the effect on the degradation of the image at the time of extracting the embedded digital information, and it is difficult for the third person to detect the embedded digital information.

The discrete wavelet transform performed in the digital information embedding apparatus 4a according to the seventh embodiment is not limited to three hierarchies. It can be performed even many times until the LL signal reaches a 1×1 element.

A value set in the map information generation portion 52 may be set to "0" in a case where the absolute amplitude values of the 21 transform coefficients in the same space representation region in the same direction of division are not more than the set value R, while being set to "1" in the other case.

Furthermore, a value which is replaced with the transform coefficient in the signal replacement portion 53 may be set to +K when the logical value of a bit, in the digital information, to be embedded is "0", while being set to −K when the bit is "1". The replacement of the transform coefficient may be not replacement of the value+K and the value−K but replacement of the value+K and the value 0.

(Eighth Embodiment)

Figure 23:
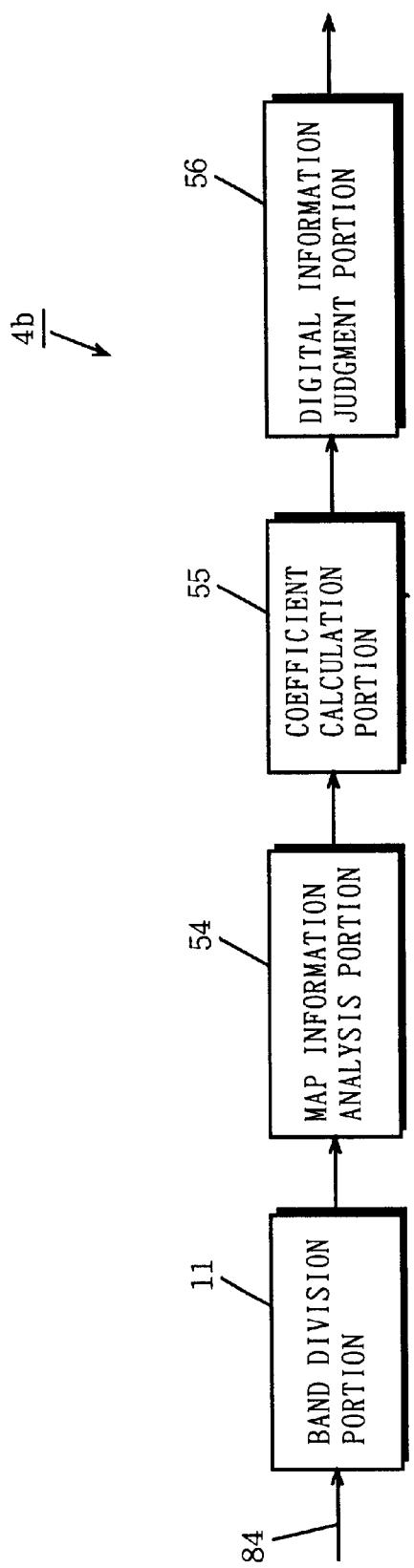
FIG. 23 is a block diagram showing the construction of a digital information extracting apparatus 4b according to an eighth embodiment of the present invention.

FIG. 23 is a block diagram showing the construction of a digital information extracting apparatus according to an eighth embodiment of the present invention. The digital information extracting apparatus 4b according to the eighth embodiment is an apparatus for extracting the digital information embedded by the above-mentioned digital information embedding apparatus 4a according to the seventh embodiment. In FIG. 7, the digital information extracting apparatus 4b comprises a band division portion 11, a map information analysis portion 54, a coefficient calculation portion 55, and a digital information judgment portion 56.

The band division portion 11 in the digital information extracting apparatus 4b according to the eighth embodiment has the same structure as the band division portion 11 in the digital information embedding apparatus 4a according to the seventh embodiment, and is assigned the same reference numeral and hence, the description thereof is not repeated.

The band division portion 11 receives an image signal 84. The image signal 84 includes, in addition to the image signal 75 outputted by the band synthesis portion 17 in the digital information embedding apparatus 4a according to the seventh embodiment, the map information generated by the map information generation portion 52 in the digital information embedding apparatus 4a, and the value K used for replacement in the signal replacement portion 53 in the digital information embedding apparatus 4a. The band division portion 11 subjects the inputted image signal 84 to discrete wavelet transform, to divide the image signal 84 into 10 frequency bands, i.e., an LL3 signal, LHi signals, HLi signals and HHi signals, and calculate respective transform coefficients. The map information analysis portion 54 extracts, on the basis of the map information, 21 transform coefficients in the same space representation region in the same direction of division which correspond to the position where the map information is "1". The coefficient calculation portion 55 calculates, using the transform coefficients included in one or more frequency bands out of the transform coefficients extracted in the map information analysis portion 54, a total value Y of the transform coefficients on the basis of the value K. The digital information judgment portion 56 judges the sign of the total value Y calculated in the coefficient calculation portion 55, to extract the embedded digital information on the basis of the judgment.

Figure 24:
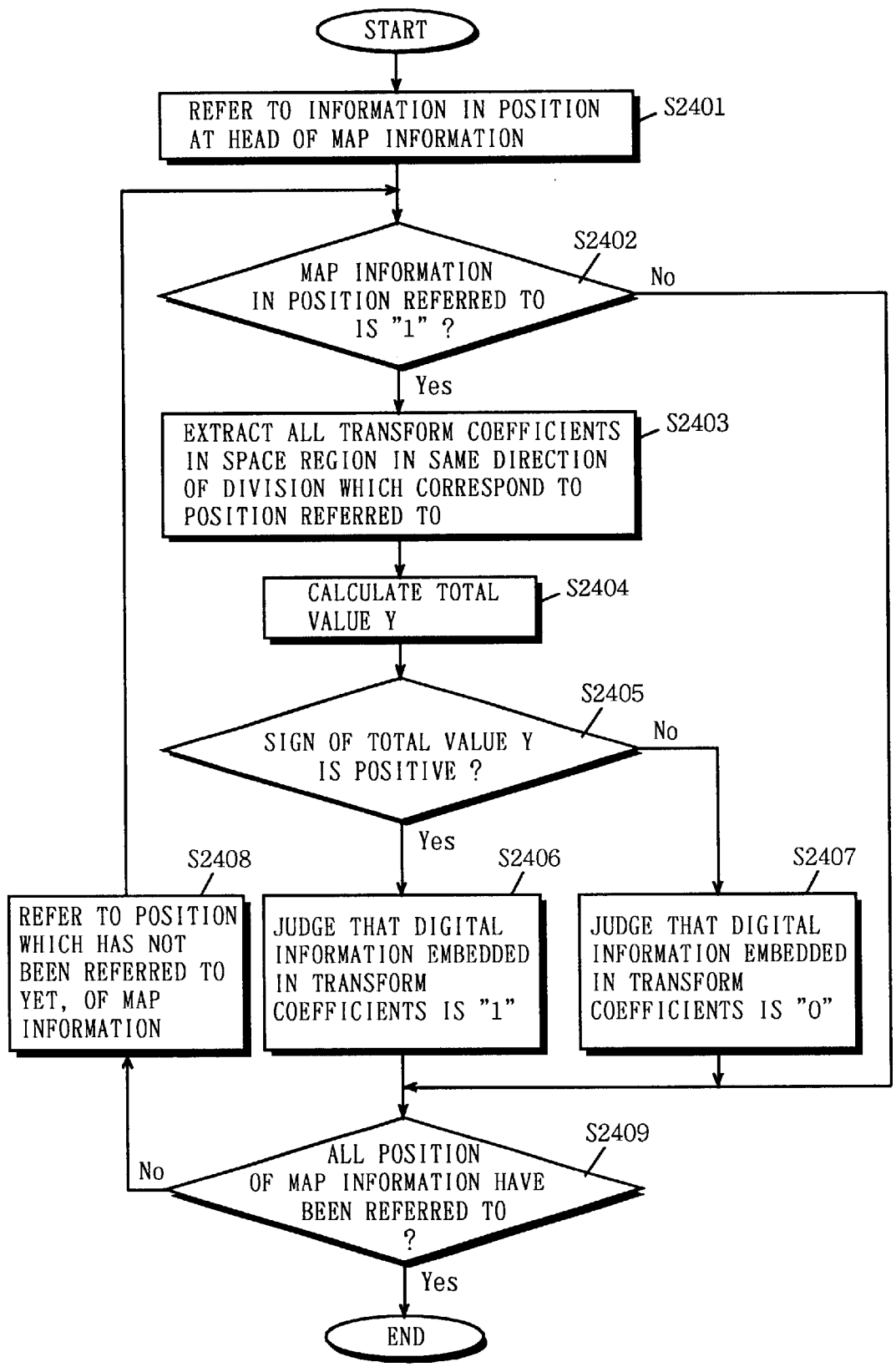
FIG. 24 is a flow chart showing processing performed in a map information analysis portion 54, a coefficient calculation portion 55, and a digital information judgment portion 56 shown in FIG. 23.

Referring now to FIG. 24, description is made of a digital information extracting method carried out by the digital information extracting apparatus 4b. FIG. 24 is a flow chart showing processing performed in the map information analysis portion 54, the coefficient calculation portion 55, and the digital information judgment portion 56. FIG. 24 shows as an example a case where map information relating to the HL3 signal which is high in its horizontal frequency component and is low in its vertical frequency component is analyzed, to extract digital information.

Referring to FIG. 24, the map information analysis portion 54 refers to information in a position at the head of the map information generated by the map information generation portion 52 (step S2401). It is judged whether the map information in a position referred to is "1" (step S2402). When the map information is "1" in the judgment at the step S2402, all the transform coefficients in the HL3 signal, the HL2 signal and the HL1 signal in the same space representation region in the same direction of division which correspond to the map position are extracted (step S2403). The coefficient calculation portion 55 uses the transform coefficients included in the one or more frequency bands out of the 21 transform coefficients extracted at the step S2403, that is, one or more signals out of the HL3 signal, the HL2 signal and the HL1 signal, to calculate a total value Y of the transform coefficients (step S2404). On the other hand, when the map information is "0" in the judgment at the step S2402, no processing is performed.

In calculating the total value Y, "one or two or more signals out of the HL3 signal, the HL2 signal and the HL1 signal" is defined in order to cope with a case where the sign of the transform coefficient is changed due to any effect on high frequency bands, as described in the above-mentioned problems to be solved. For example, the effect on high frequency bands is most easily exerted on a shallow hierarchical signal, so that the total value Y may be calculated as follows using not the HL1 signal but only the HL3 signal and the HL2 signal in order to increase the reliability of the total value Y:

$$Y=(\text{transform coefficient in } HL3 \text{ signal})\times 4+(\text{sum of four transform coefficients in } HL2 \text{ signal})$$

The transform coefficient in the HL3 signal is multiplexed by four in order to obtain a total value Y in higher reliability by weighting a deep hierarchical signal on which the effect on high frequency bands is not easily exerted. A method of calculating the total value Y is not limited to the above-mentioned example. It can be suitably and arbitrarily determined by the state of the inputted image signal 72.

Referring to FIG. 24 again, the digital information judgment portion 56 judges whether the sign of the total value Y calculated at the foregoing step S2404 is positive or negative (step S2405). When the sign of the total value Y is positive in the judgment at the step S2405, it is judged that the digital information embedded in positions of the transform coefficients whose total value Y has been calculated takes a value "1" (step S2406). On the other hand, when the sign of the total value Y is negative in the judgment at the step S2405, it is judged that the digital information embedded in the positions takes a value "0" (step S2407).

Thereafter, it is judged whether all positions of the map information have been referred to. When there exists the position, which has not been referred to yet, of the map information, the position is referred to, after which the program is returned to the foregoing step S2402, to repeatedly perform the same processing (steps S2408 and S2409). Consequently, the digital information is extracted and reproduced.

As described in the foregoing, the digital information extracting apparatus 4b according to the eighth embodiment judges the logical value of the embedded digital information by the results of extracting transform coefficients which have been embedded in a low frequency band which is hardly affected by data destruction in high frequency bands, and calculating the total value Y of the transform coefficients using a previously determined method. Consequently, accurate digital information can be extracted without being affected by an attack from an unauthorized user.

(Ninth Embodiment)

FIG. 25 is a block diagram showing the construction of a digital information embedding apparatus according to a ninth embodiment of the present invention. In FIG. 25, the digital information embedding apparatus 5a comprises a band division portion 11, a map information generation portion 61, a signal transform portion 62, a signal replacement portion 63, and a band synthesis portion 17.

The band division portion 11 and the band synthesis portion 17 in the digital information embedding apparatus 5a according to the ninth embodiment respectively have the same structures as the band dividing device 11 and the band synthesis portion 17 in the digital information embedding apparatus 4a according to the seventh embodiment, and are assigned the same reference numerals and hence, the description thereof is not repeated.

The band division portion 11 receives a digitized image signal 71, and divides the image signal 71 into 10 frequency bands, i.e., an LL3 signal, LHi signals, HLi signals and HHi signals by discrete wavelet transform, to calculate respective transform coefficients. The map information generation portion 61 generates, with respect to a third hierarchical signal (excluding the LL3 signal) obtained by the division in the band division portion 11, map information indicating whether the absolute amplitude values of the transform coefficients are between two set values which are previously determined. The signal transform portion 62 designates a transform value to be embedded in accordance with digital information to be embedded and the sign of the transform coefficient. The signal replacement portion 63 replaces the transform coefficient with the transform value designated in the signal transform portion 62. The band synthesis portion 17 synthesizes the plurality of frequency bands which have been subjected to the embedding processing in the signal replacement portion 63, to reconstruct an image signal 76.

Figure 26:
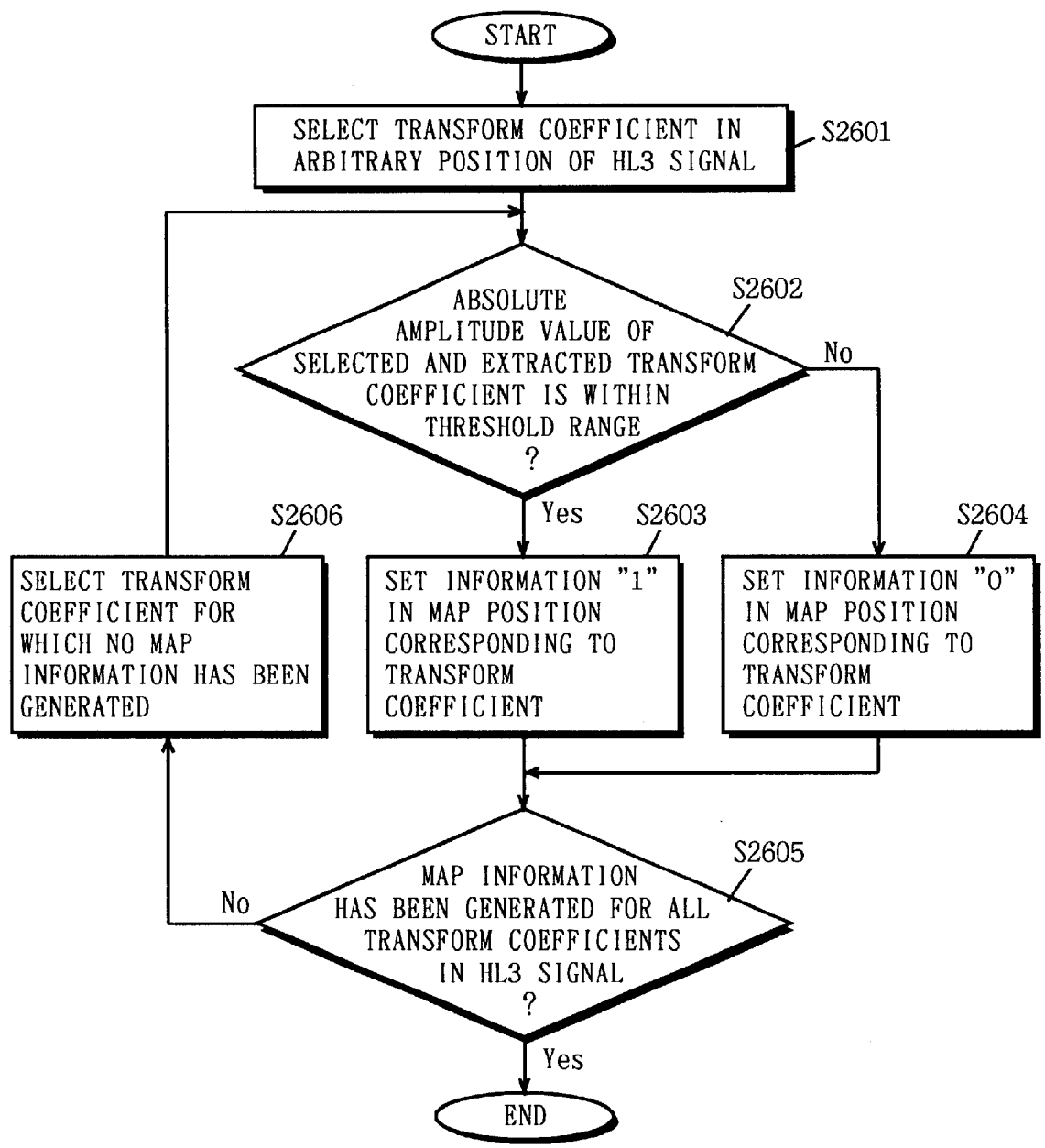
FIG. 26 is a flow chart showing processing performed in a map information generation portion 61 shown in FIG. 25.
Figure 28:
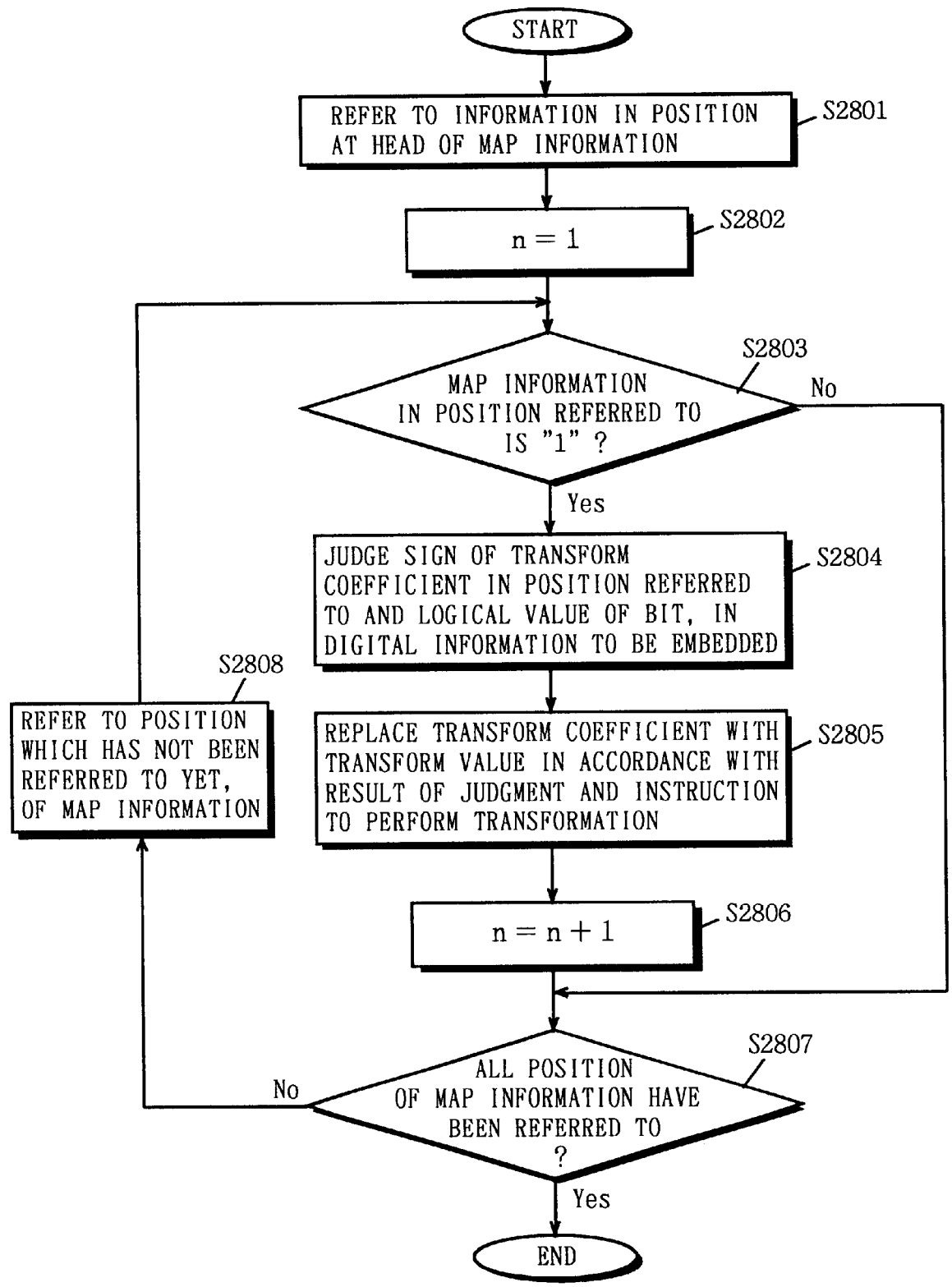
FIG. 28 is a flow chart showing processing performed in a signal replacement portion 63 shown in FIG. 25.

Referring to FIGS. 26 to 28, description is made of a method of embedding digital information carried out by the digital information embedding apparatus 5a.

FIG. 26 is a flow chart showing processing performed in the map information generation portion 61. FIG. 26 shows as an example a case where map information relating to the HL3 signal which is high in its horizontal frequency component and is low in its vertical frequency component. FIG. 27 is a diagram showing the contents of transformation designated by the signal transform portion 62. FIG. 28 is a flow chart showing processing performed in the signal replacement portion 63.

Description is now made of the processing performed in the map information generation portion 61.

Referring to FIG. 26, the map information generation portion 61 selects one transform coefficient in an arbitrary position of the HL3 signal on the basis of an output of the band division portion 11 (step S2601). It is judged whether the absolute amplitude value of the transform coefficient is within the range of not less than a threshold value TL nor more than a threshold value TH (hereinafter referred to as a threshold range) (step S2602). The threshold values TL and TH can be arbitrarily determined depending on the length of digital information to be embedded, for example. When the absolute amplitude value is within the threshold range in the judgment at the step S2602, information "1" is set in a threshold map position corresponding to the position of the HL3 signal (step S2603). On the other hand, when the absolute amplitude value is not within the threshold range in the judgment at the step S2602, information "0" is set in the threshold map position corresponding to the position of the HL3 signal (step S2604). Thereafter, it is judged whether map information has been generated with respect to all the transform coefficients in the HL3 signal. When there exists the transform coefficient for which no map information has been generated, the transform coefficient is selected, after which the program is returned to the foregoing step S2602, to repeatedly perform the same processing (steps S2605 and S2606).

The map information generation portion 61 performs the above-mentioned processing with respect to all the transform coefficients in the HL3 signal, to generate map information of a size corresponding to the transform coefficients in the HL3 signal. The map information is basically the same as the map information generated by the map information generation portion 52 according to the seventh embodiment except for a threshold value (a set value) for judging a logical value.

Description is now made of processing performed in the signal transform portion 62.

The signal transform portion 62 issues an instruction to perform transformation based on a combination of the sign of a transform coefficient and the logical value of a bit, in digital information, to be embedded, as shown in FIG. 27. FIG. 27 depicts that in a case where a transform coefficient in a position referred to is positive, a transform value is +A (plus A) when the logical value of a bit, in digital information, to be embedded in the position is "1", while being +B (plus B) when the logical value is "0", and depicts that in a case where a transform coefficient in a position referred to is negative, a transform value is −A (minus A) when the logical value of a bit, in digital information, to be embedded in the position is "1", while being −B (minus B) when the logical value is "0". It is preferable that the absolute values of the value A and the value B are set within the above-mentioned threshold range (TL<A and B<TH) in order to minimize the degradation of an image after the replacement of the transform coefficient.

Processing performed in the signal replacement portion 63 will be described.

Referring to FIG. 28, the signal replacement portion 63 refers to information representing a position at the head of the map information generated by the map information generation portion 61 (step S2801). A counter n representing the position of a bit, in the digital information, to be embedded (n takes a value in a range from one to the final bit in the digital information) is taken as one (step S2802). It is judged whether the map information in a position referred to is "1" (step S2803). When the map information is "1" in the judgment at the step S2803, it is judged whether the sign of a transform coefficient in the position referred to is positive or negative, and it is judged whether the logical value of the n-th bit, in the digital information, to be embedded in the position is "1" or "0" (step S2804). The transform coefficient is replaced with transform value (either±A or±B) in accordance with the results of the judgment at the step S2804 and the instruction to perform transformation issued by the signal transform portion 62 (step S2805). After the replacement processing is terminated with respect to the n-th bit, one is added to n in order to proceed to the subsequent bit in the digital information (step S2806). On the other hand, when the map information is "0" in the judgment at the step S2803, the replacement processing of the transform coefficient is not performed.

Thereafter, it is judged whether all positions of the map information have been referred to. When there exists the position which has not been referred to yet, of the map information, the position is referred to, after which the program is returned to the foregoing step S2803, to repeatedly perform the same processing (steps S2807 and S2808).

The signal replacement portion 63 performs the above-mentioned processing with respect to all the positions of the map information, and replaces only the transform coefficient, in the position in which the digital information is to be embedded, in the HL3 signal with either one of the values±A and values±B.

After the above-mentioned processing is performed, the band synthesis portion 17 reconstructs the 10 frequency bands, i.e., the LL3 signal, the LHi signals, the HLi signals and the HHi signals as an image signal 76 which has been subjected to the embedding processing, as described above, to output the image signal 76.

As described in the foregoing, the digital information embedding apparatus 5a according to the ninth embodiment embeds the digital information only in the transform coefficients in a deep hierarchical signal which is not easily affected. Consequently, it is possible to more satisfactorily prevent the embedded digital information from being lost against an attack for unauthorized utilization from in a third person, as compared with the digital information embedding apparatus 4a according to the seventh embodiment. Further, the transform coefficient whose absolute amplitude value is within the range of not more than the threshold value TL nor more than the threshold value TH is transformed into a value within the threshold range considering the sign of the transform coefficient, so that it is possible to reduce the effect on the degradation of the image at the time of extracting the embedded digital information, and it is difficult for the third person to detect the embedded digital information.

(Tenth Embodiment)

Figure 29:
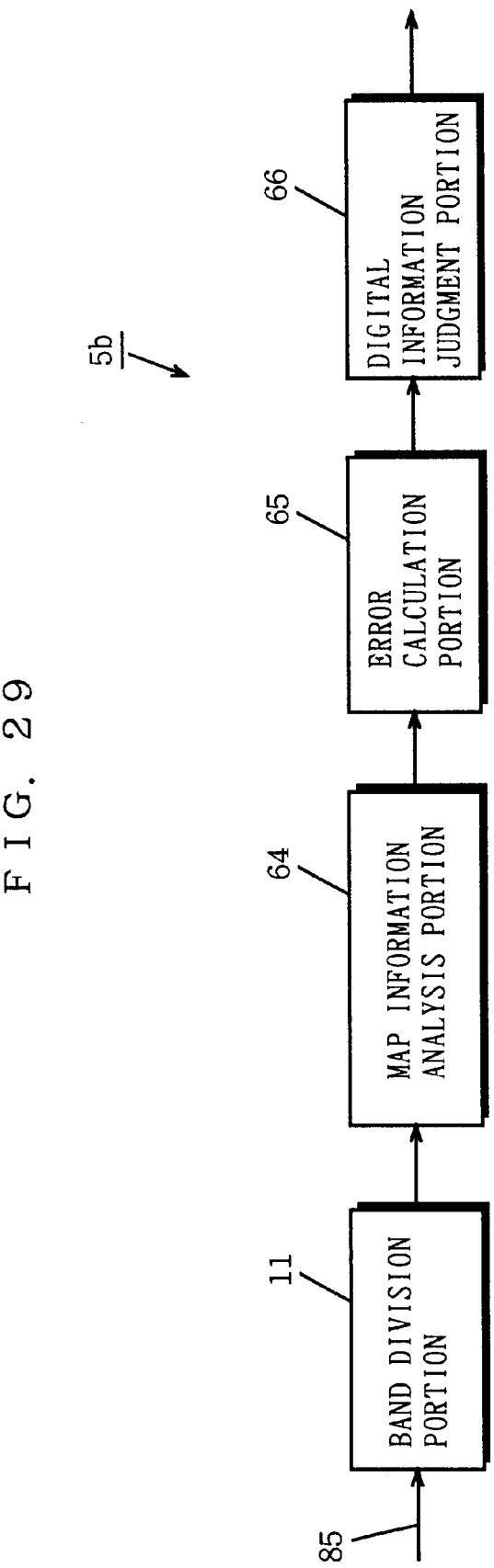
FIG. 29 is a block diagram showing the construction of a digital information extracting apparatus 5b according to a tenth embodiment of the present invention

FIG. 29 is a block diagram showing the construction of a digital information extracting apparatus according to a tenth embodiment of the present invention. The digital information extracting apparatus 5b according to the tenth embodiment is an apparatus for extracting the digital information embedded by the above-mentioned digital information embedding apparatus 5a according to the ninth embodiment. In FIG. 29, the digital information extracting apparatus 5b comprises a band division portion 11, a map information analysis portion 64, an error calculation portion 65, and a digital information judgment portion 66.

The band division portion 11 in the digital information extracting apparatus 5b according to the tenth embodiment has the same structure as the band division portion 11 in the digital information embedding apparatus 4a according to the seventh embodiment, and is assigned the same reference numeral and hence, the description thereof is not repeated.

The band division portion 11 receives an image signal 85. The image signal 85 includes, in addition to the image signal 76 outputted by the band synthesis portion 17 in the digital information embedding apparatus 5a according to the ninth embodiment, the map information generated by the map information generation portion 61 in the digital information embedding apparatus 5a, and the transform values A and B designated in the signal transform portion 62 in the digital information embedding apparatus 5a. The band division portion 11 subjects the inputted image signal 85 to discrete wavelet transform, to divide the image signal 85 into 10 frequency bands, i.e., an LL3 signal, LHi signals, HLi signals and HHi signals, and calculate respective transform coefficients. The map information analysis portion 64 extracts, on the basis of the map information, a transform coefficient corresponding to the position where the value of the map information is "1". The error calculation portion 65 calculates errors between an absolute amplitude value C of the transform coefficient extracted in the map information analysis portion 64 and the transform values A and B. The digital information judgment portion 66 judges whether the logical value of a bit, in digital information, embedded in the transform coefficient is "1" or "0" from the errors calculated in the error calculation portion 65, to extract the digital information.

Figure 30:
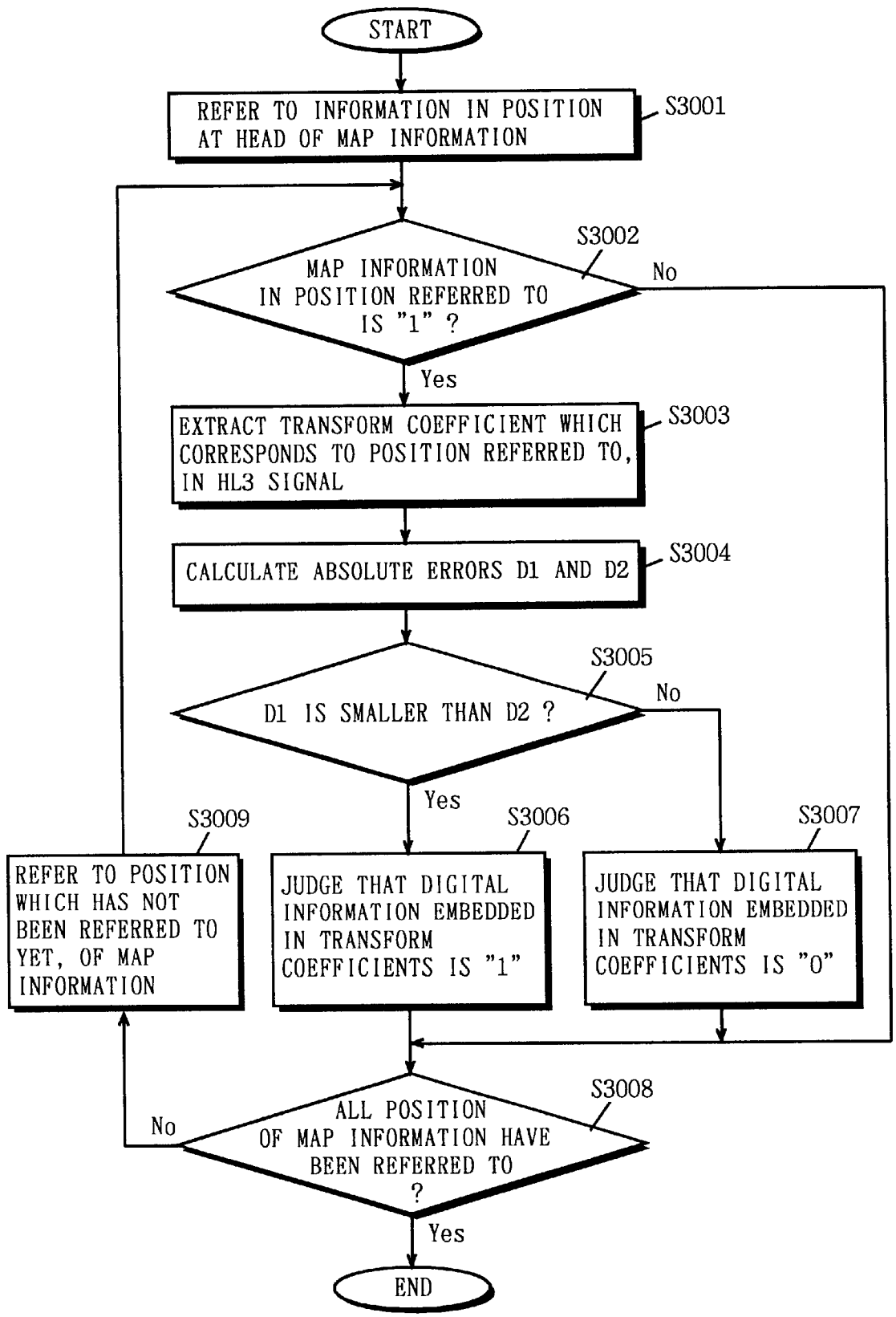
FIG. 30 is a flow chart showing processing performed in a map information analysis portion 64, an error calculation portion 65, and a digital information judgment portion 66 shown in FIG. 29.

Referring now to FIG. 30, description is made of a digital information extracting method carried out by the digital information extracting apparatus 5b. FIG. 30 is a flow chart showing processing performed in the map information analysis portion 64, the error calculation portion 65, and the digital information judgment portion 66. FIG. 30 shows as an example a case where map information relating to the HL3 signal which is high in its horizontal frequency component and is low in its vertical frequency component is analyzed, to extract digital information.

Referring to FIG. 30, the map information analysis portion 64 refers to information in a position at the head of the map information generated by the map information generation portion 61 (step S3001). It is judged whether the map information in a position referred to is "1" (step S3002). When the map information is "1" in the judgment at the step S3002, a transform coefficient, which corresponds to the map position, in the HL3 signal is extracted (step S3003). The error calculation portion 65 calculates the following absolute errors D1 and D2 from the absolute amplitude value C of the transfer coefficient extracted at the step S3003 and the transform values A and B designated in the signal transform portion 62 (step S3004):

$$D1=|C-A|, \text{ and } D2=|C-B|$$

The digital information judgment portion 66 compares the values of the absolute errors D1 and D2 calculated in the error calculation portion 65 (step S3005). In the comparison at the step S3005, when the value of D1 is smaller than the value of D2, it is judged that the digital information embedded in a position of the extracted transform coefficient is "1" (step S3006). Contrary to this, in the comparison at the step S3005, when the value of D2 is smaller than the value of D1, it is judged that the digital information embedded in the position is "0" (step S3007). On the other hand, when the map information is "0" in the judgment at the step S3002, no processing is performed Thereafter, it is judged whether all positions of the map information have been referred to. When there exists the position, which has not been referred to yet, of the map information, the position is referred to, after which the program is returned to the foregoing step S3002, to repeatedly perform the same processing (steps S3008 and S3009). Consequently, the digital information is extracted and reproduced.

As described in the foregoing, the digital information extracting apparatus 5b according to the tenth embodiment judges the logical value of the embedded digital information by the results of extracting a transform coefficient which has been embedded in a deep hierarchical signal which is not affected by data destruction in high frequency bands, calculating the absolute errors D1 and D2 of the transform coefficient using a previously determined method, and comparing the absolute errors with each other. Consequently, accurate digital information can be extracted without being affected by an attack from an unauthorized user.

(Eleventh Embodiment)

Figure 31:
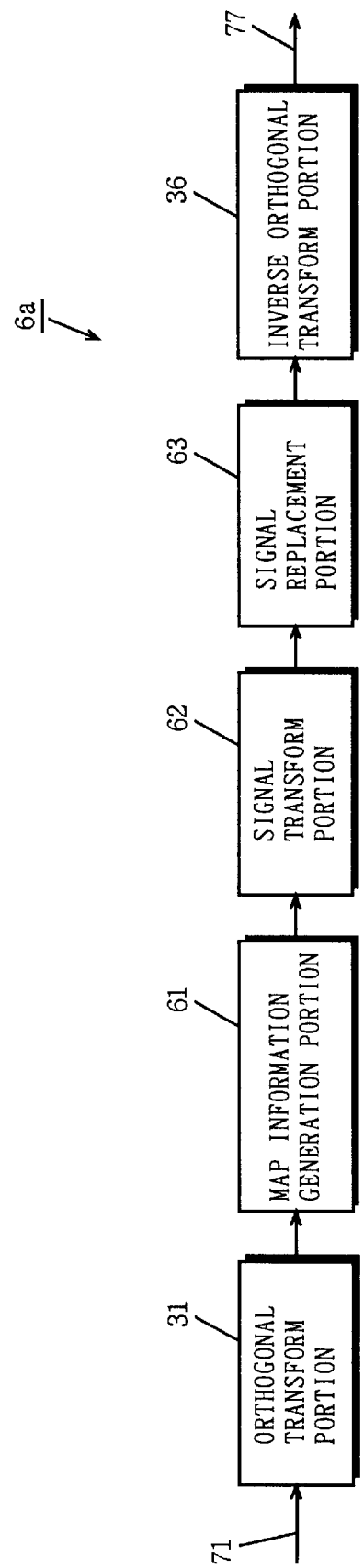
FIG. 31 is a block diagram showing the construction of a digital information embedding apparatus 6a according to an eleventh embodiment of the present invention.

FIG. 31 is a block diagram showing the construction of a digital information embedding apparatus 6a according to an eleventh embodiment of the present invention. In FIG. 31, the digital information embedding apparatus 6a comprises an orthogonal transform portion 31, a map information generation portion 61, a signal transform portion 62, a signal replacement portion 63, and an inverse orthogonal transform portion 36.

As shown in FIG. 31, the digital information embedding apparatus 6a according to the eleventh embodiment is so constructed that the band division portion 11 and the band synthesis portion 17 in the digital information embedding apparatus 5a according to the ninth embodiment are respectively replaced with the orthogonal transform portion 31 and the inverse orthogonal transform portion 36. The orthogonal transform portion 31 and the inverse orthogonal transform portion 36 respectively have the same structures as the orthogonal transform portion 31 and the inverse orthogonal transform portion 36 in the digital information embedding apparatus 2a according to the third embodiment, and are assigned the same reference numerals and hence, the description thereof is not repeated.

The orthogonal transform portion 31 receives an image signal 71, and divides the image signal 71 into a plurality of blocks in accordance with a previously determined block size, and then subjects the signal in each of the blocks to orthogonal transform, to respectively calculate transform coefficients in the block. The map information generation portion 61 generates the above-mentioned map information using respective transform coefficients having components other than DC components out of transform coefficients calculated in the orthogonal transform portion 31. It is desirable that the transform coefficients used herein are respective transform coefficients having lower frequency components in order to withstand an attack from a third person. The inverse orthogonal transform portion 36 subjects the transform coefficients after embedding processing to inverse orthogonal transform, and reconstructs an image signal 77, to output the image signal 77. As described in the foregoing, the digital information embedding apparatus 5b according to the eleventh embodiment can also perform the above-mentioned digital information embedding processing described in the ninth embodiment with respect to the input of the image signal 71 which has been subjected to discrete cosine transform, Fourier transform or Hadamard transform.

(Twelfth Embodiment)

Figure 32:
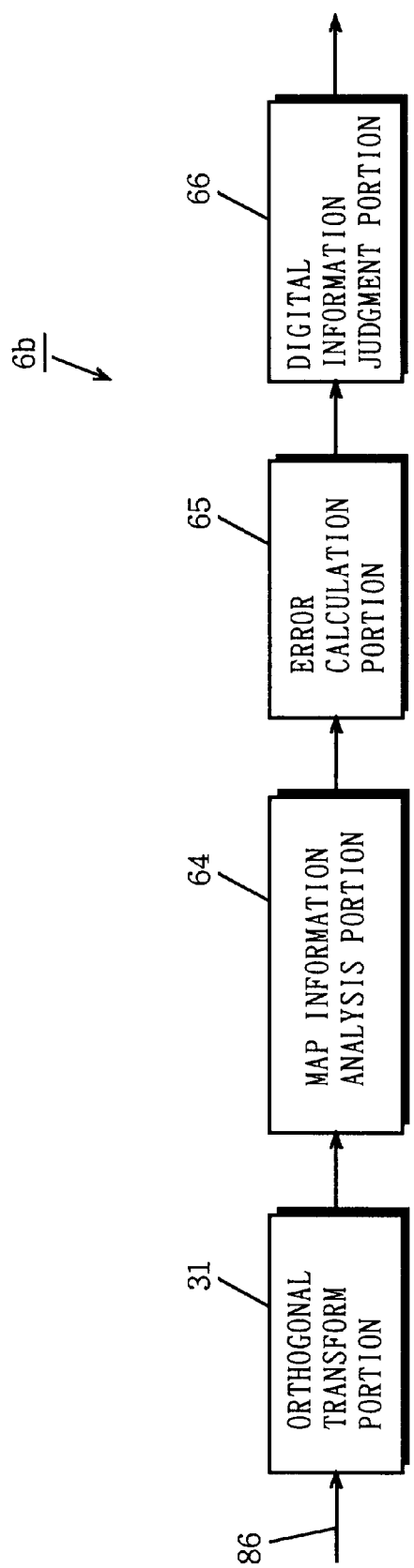
FIG. 32 is a block diagram showing the construction of a digital information extracting apparatus 6b according to a twelfth embodiment of the present invention.
Figure 33:
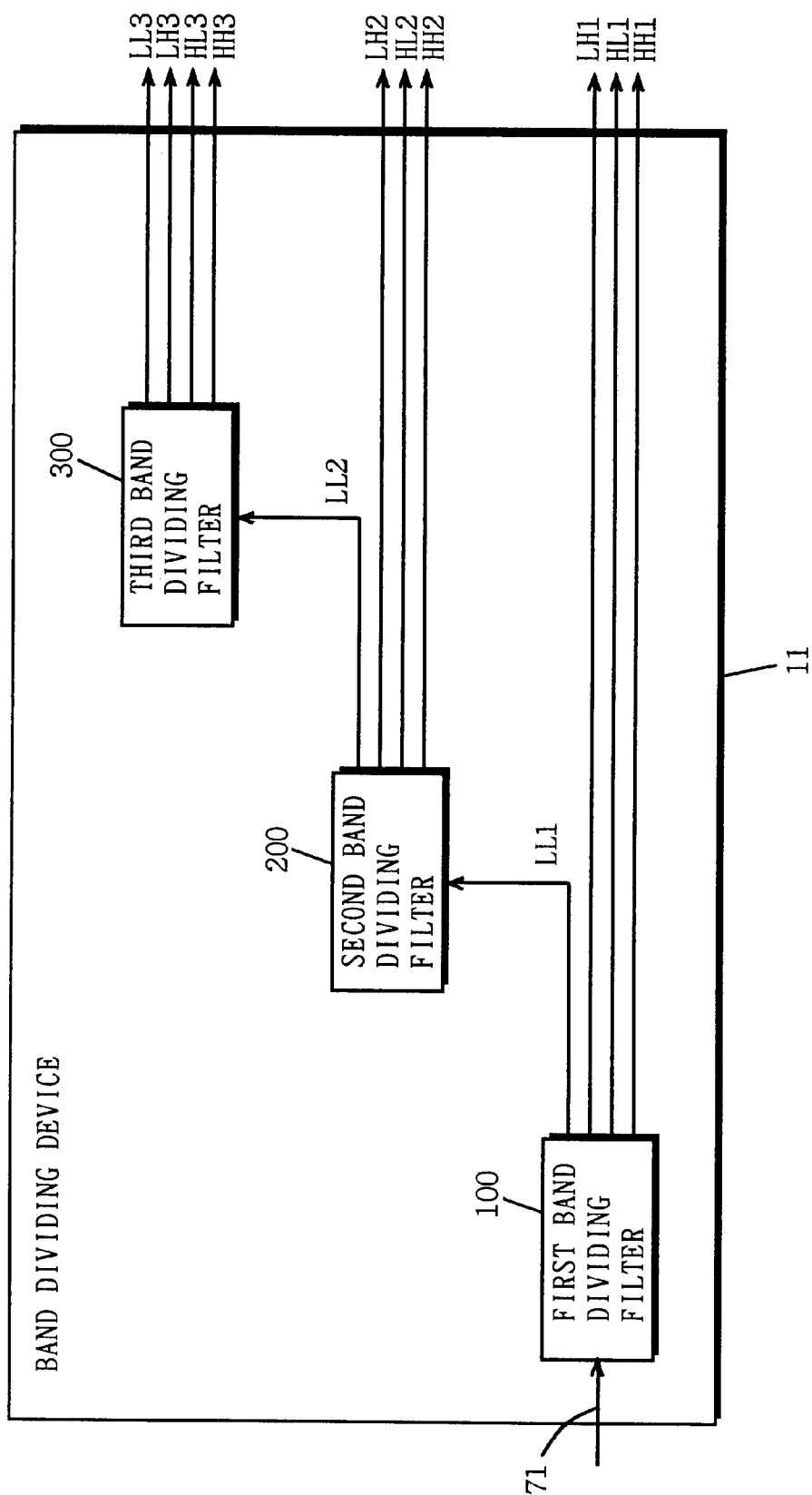
FIG. 33 is a block diagram showing an example of the structure of a conventional band dividing device 11.
Figure 34:
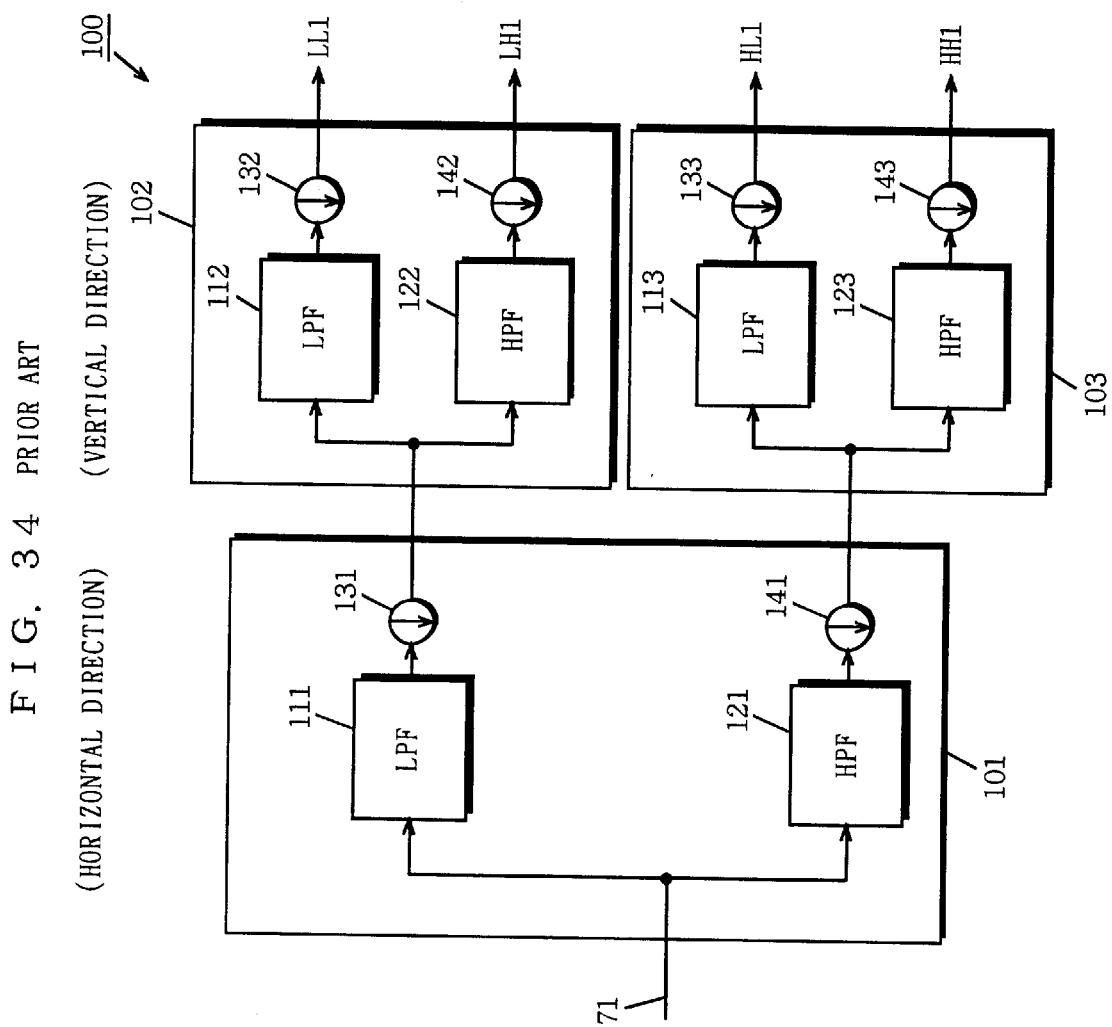
FIG. 34 is a block diagram showing an example of the structure of a first band dividing filter 100 shown in FIG. 33.
Figure 35:
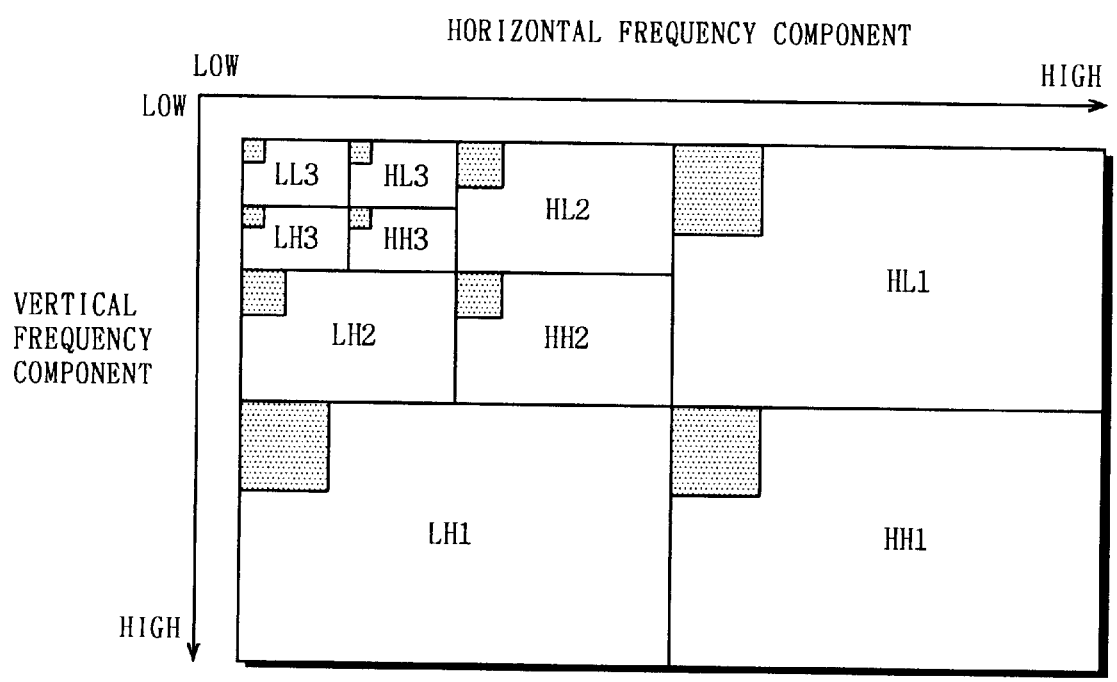
FIG. 35 is a diagram showing representation of signals which have been subjected to discrete wavelet transform by the band dividing device 11 shown in FIG. 33 by a two-dimensional frequency region.

FIG. 32 is a block diagram showing the construction of a digital information extracting apparatus 6b according to a twelfth embodiment of the present invention. The digital information extracting apparatus 6b according to the twelfth embodiment is an apparatus for extracting the digital information embedded by the above-mentioned digital information embedding apparatus 6a according to the eleventh embodiment. In FIG. 32, the digital information extracting apparatus 6b comprises an orthogonal transform portion 31, a map information analysis portion 64, an error calculation portion 65, and a digital information judgment portion 66.

As shown in FIG. 32, the digital information extracting apparatus 6b according to the twelfth embodiment is so constructed that the band division portion 11 in the digital information extracting apparatus 5b according to the tenth embodiment is replaced with the orthogonal transform portion 31 in the digital information embedding apparatus 6a according to the eleventh embodiment.

The orthogonal transform portion 31 receives an image signal 86. The image signal 86 includes, in addition to the image signal 77 outputted by the inverse orthogonal transform portion 36 in the digital information embedding apparatus 6a according to the eleventh embodiment, the map information generated by the map information generation portion 61 in the digital information embedding apparatus 6a, and the transform values A and B designated in the signal transform portion 62 in the digital information embedding apparatus 6a. The orthogonal transform portion 31 divides the inputted image signal 86 into a plurality of blocks in accordance with a previously determined block size, and then subjects the signal in each of the blocks to orthogonal transform, to respectively calculate transform coefficients in the block. The map information analysis portion 64 extracts, on the basis of the map information, a transform coefficient corresponding to a position where the value of the map information is "1". The error calculation portion 65 calculates errors between an absolute amplitude value C of the transform coefficient extracted in the map information analysis portion 64 and the transform values A and B. The digital information judgment portion 66 judges whether the logical value of a bit, in the digital information, embedded in the transform coefficient is "1" or "0" from the errors calculated in the error calculation portion 65, to extract the digital information.

By the above-mentioned construction, the digital information extracting apparatus 6b according to the twelfth embodiment can accurately extract the embedded digital information, as described in the tenth embodiment, even when the image signal 77 which has been subjected to discrete cosine transform, Fourier transform or Hadamard transform is subjected to the above-mentioned digital information embedding processing described in the ninth embodiment.

Typically, each of functions realized by the digital information embedding apparatuses and extracting apparatuses according to the first to twelfth embodiments is realized by a storage device (a ROM, a RAM, a hard disk, etc.) storing predetermined program data and a CPU (Central Processing Unit) for executing the program data. In this case, each of the program data may be introduced through a recording medium such as a CD-ROM or a floppy disk.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A digital information embedding apparatus for embedding inherent digital information in a digital image signal, comprising:

orthogonal transform means for dividing said digital image signal into a plurality of blocks each composed of a plurality of pixels previously determined, and subjecting, for each of the blocks, the block to orthogonal transform, to calculate transform coefficients;

block selection means for further classifying said plurality of blocks, obtained by the dividing, into groups each comprising one or two or more blocks in accordance with a previously determined number of blocks;

quantization means for extracting, for each of the blocks belonging to each of said groups, the transform coefficient having the lowest frequency component (hereinafter referred to as a DC component) out of the transform coefficients in the block and calculating a mean value M of the respective DC components in the blocks, and subjecting the mean value M to linear quantization using a previously determined quantization step-size Q (Q is an integer of not less than one), to calculate a quantization value;

signal replacement means for replacing for each of said groups, on the basis of said quantization value and said digital information to be embedded which correspond to the group, the quantization value;

mean difference addition means for subjecting for each of said groups said replaced quantization value to inverse linear quantization using said quantization step-size Q to calculate a mean value M', and adding a difference DM (=M'−M) between the mean value M' and said mean value M to all the DC components in the blocks belonging to the group;

inverse orthogonal transform means for subjecting the plurality of blocks after the addition of said difference DM to inverse orthogonal transform, to reconstruct a digital image signal in which said digital information has been embedded; and mean calculation means for calculating a mean value LM of the amplitude values of the pixels in said reconstructed digital image signal.

2. The digital information embedding apparatus according to claim 1, wherein said signal replacement means replaces said quantization value with an odd value closest to the value of M/Q when each of bits composing said digital information takes a logical value 1, while replacing the quantization value with an even value closest to the value of M/Q when said bit takes a logical value 0.

3. A digital information embedding method of embedding inherent digital information in a digital image signal, comprising the steps of:

dividing said digital image signal into a plurality of blocks each composed of a plurality of pixels previously determined, and subjecting for each of the blocks, the block to orthogonal transform, to calculate transform coefficients;

further classifying said plurality of blocks, obtained by the dividing, into groups each comprising one or two or more blocks in accordance with a previously determined number of blocks;

extracting, for each of blocks belonging to each of said groups, the transform coefficient having the lowest frequency component (hereinafter referred to as a DC component) out of the transform coefficients in the block and calculating a mean value M of the respective DC components in the blocks, and subjecting the mean value M to linear quantization using a previously determined quantization step-size Q (Q is an integer of not less than one), to calculate a quantization value;

replacing for each of said groups, on the basis of said quantization value and said digital information to be embedded which correspond to the group, the quantization value;

subjecting for each of said groups said replaced quantization value to inverse linear quantization using said quantization step-size Q to calculate a mean value M', and adding a difference DM (=M'−M) between the mean value M and said mean value M to all the respective DC components in the blocks belonging to the group; subjecting the plurality of blocks after the addition of said difference DM to inverse orthogonal transform, to reconstruct a digital image signal in which said digital information has been embedded; and calculating a mean value LM of the amplitude values of the pixels in said reconstructed digital image signal.

4. The digital information embedding method according to claim 3, wherein said step of replacing the quantization value replaces said quantization value with an odd value closest to the value of M/Q when each of bits composing said digital information takes a logical value 1, while replacing said quantization value with an even value closest to the value of M/Q when said bit takes a logical value 0.

5. A recording medium having a program executed in a computer recorded thereon, the program realizing on said computer an operational environment comprising the steps of:

dividing a digital image signal into a plurality of blocks each composed of a plurality of pixels previously determined, and subjecting, for each of the blocks, the block to orthogonal transform, to calculate transform coefficients;

further classifying said plurality of blocks, obtained by the dividing, into groups each comprising one or two or more blocks in accordance with a previously determined number of blocks;

extracting, for each of the blocks belonging to each of said groups, the transform coefficient having the lowest frequency component (hereinafter referred to as a DC component) out of the transform coefficients in the block and calculating a mean value M of the respective DC components in the blocks, and subjecting the mean value M to linear quantization using a previously determined quantization step-size Q (Q is an integer of not less than one), to calculate a quantization value; replacing for each of said groups, on the basis of said quantization value and said digital information to be embedded which correspond to the group, the quantization value;

subjecting for each of said groups said replaced quantization value to inverse linear quantization using said quantization step-size Q to calculate a mean value M', and adding a difference DM (=M'−M) between the mean value M' and said mean value M to all the DC components in the blocks belonging to the group;

subjecting the plurality of blocks after the addition of said difference DM to inverse orthogonal transform, to reconstruct a digital image signal in which said digital information has been embedded; and calculating a mean value LM of the amplitude values of the pixels in said reconstructed digital image signal.

6. The recording medium according to claim 5, wherein said step of replacing the quantization value replaces said quantization value with an odd value closest to the value of M/Q when each of bits composing said digital information takes a logical value 1, while replacing the quantization value with an even value closest to the value of M/Q when said bit takes a logical value 0.

* * * * *

UNITED STATES PATENT AND TRADEMARK OFFICE
CERTIFICATE OF CORRECTION

PATENT NO. : 6,728,409 B2
DATED : April 27, 2004
INVENTOR(S) : Hisashi Inque et al.

It is certified that error appears in the above-identified patent and that said Letters Patent is hereby corrected as shown below:

Column 60,
Line 50, insert paragraph break after "group;".

Column 61,
Line 19, insert paragraph break after "value;".

Signed and Sealed this

Twenty-first Day of September, 2004

JON W. DUDAS
*Director of the United States Patent and Trademark Office*

UNITED STATES PATENT AND TRADEMARK OFFICE
CERTIFICATE OF CORRECTION

PATENT NO. : 6,728,409 B2
DATED : April 27, 2004
INVENTOR(S) : Hisashi Inoue et al.

It is certified that error appears in the above-identified patent and that said Letters Patent is hereby corrected as shown below:

Column 60,
Line 50, insert paragraph break after "group;".

Column 61,
Line 19, insert paragraph break after "value;".

This certificate supersedes Certificate of Correction issued September 21, 2004.

Signed and Sealed this

Thirtieth Day of November, 2004

JON W. DUDAS
*Director of the United States Patent and Trademark Office*